US010827197B2

(12) United States Patent
Choi et al.

(10) Patent No.: US 10,827,197 B2
(45) Date of Patent: Nov. 3, 2020

(54) METHOD AND APPARATUS FOR ENCODING MULTILAYER VIDEO AND METHOD AND APPARATUS FOR DECODING MULTILAYER VIDEO

(71) Applicant: SAMSUNG ELECTRONICS CO., LTD., Suwon-si (KR)

(72) Inventors: Byeong-doo Choi, Suwon-si (KR); Min-woo Park, Yongin-si (KR); Jin-young Lee, Hwaseong-si (KR); Ho-cheon Wey, Seongnam-si (KR); Chan-yul Kim, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 363 days.

(21) Appl. No.: 15/138,755

(22) Filed: Apr. 26, 2016

(65) Prior Publication Data

US 2016/0241869 A1 Aug. 18, 2016

Related U.S. Application Data

(63) Continuation of application No. PCT/KR2014/010142, filed on Oct. 27, 2014.

(Continued)

(51) Int. Cl.

*H04N 19/52* (2014.01)
*H04N 19/70* (2014.01)
*H04N 19/30* (2014.01)

(Continued)

(52) U.S. Cl.

CPC ........... *H04N 19/52* (2014.11); *H04N 19/105* (2014.11); *H04N 19/187* (2014.11);

(Continued)

(58) Field of Classification Search

CPC ..... H04N 19/105; H04N 19/30; H04N 19/187

See application file for complete search history.

(56) References Cited

U.S. PATENT DOCUMENTS 8,588,313 B2 11/2013 Choi et al.
2009/0010331 A1 * 1/2009 Jeon .................... H04N 19/105 375/240.12

(Continued)

FOREIGN PATENT DOCUMENTS

KR 10-2009-0037689 A 4/2009
KR 10-2011-0019955 A 3/2011

(Continued)

OTHER PUBLICATIONS

Search Report dated Jan. 26, 2015, issued by the International Searching Authority in counterpart International Application No. PCT/KR2014/010142 (PCT/ISA/210 and PCT/ISA/220).

(Continued)

*Primary Examiner* — Zhubing Ren

(74) *Attorney, Agent, or Firm* — Sughrue Mion, PLLC

(57) ABSTRACT

Provided is a multilayer video decoding method including obtaining a multilayer video bitstream; determining, based on the obtained multilayer video bitstream, whether or not a default reference type, in which at least one layer is inter-layer predicted by using at least one reference layer by default, is used; and inter-layer predicting the at least one layer by using the at least one reference layer according to the default reference type, based on the determining of whether or not the default reference type is used, and decoding an image including the at least one layer.

2 Claims, 39 Drawing Sheets

Related U.S. Application Data

(60) Provisional application No. 61/896,038, filed on Oct. 26, 2013.

(51) Int. Cl.

| | |
|---|---|
| ***H04N 19/105*** | (2014.01) |
| ***H04N 19/187*** | (2014.01) |
| ***H04N 19/169*** | (2014.01) |
| ***H04N 19/537*** | (2014.01) |

(52) U.S. Cl.

CPC ........... *H04N 19/188* (2014.11); *H04N 19/30* (2014.11); *H04N 19/537* (2014.11); *H04N 19/70* (2014.11)

(56) References Cited

U.S. PATENT DOCUMENTS

| | | | | |
|---|---|---|---|---|
| 2012/0106634 | A1 | 5/2012 | Jeon et al. | |
| 2013/0107962 | A1* | 5/2013 | Sim | H04N 19/105 375/240.16 |
| 2014/0301441 | A1* | 10/2014 | Wang | H04N 19/597 375/240.02 |
| 2015/0092836 | A1 | 4/2015 | Kang et al. | |
| 2015/0382002 | A1 | 12/2015 | Park et al. | |

FOREIGN PATENT DOCUMENTS

| | | | |
|---|---|---|---|
| KR | 10-2012-0027194 | A | 3/2012 |
| KR | 10-2013-0004436 | A | 1/2013 |
| WO | 2013/157828 | A1 | 10/2013 |

OTHER PUBLICATIONS

Written Opinion dated Jan. 26, 2015, issued by the International Searching Authority in counterpart International Application No. PCT/KR2014/010142 (PCT/ISA/237).

* cited by examiner

FIG. 5A

Table 1. Dependency type gating flag proposed in VPS extension

| | vps_extension( ) { | Descriptor |
|---|---|---|
| | ... | ... |
| 510 | **default_all_ilp_enable_flag** | u(1) |
| 520 | if (!default_all_ilp_enable_flag) { | |
| | for( i = 1; i <= vps_max_layers_minus 1; i++ ) | |
| | for( j = 0; j < i; j++ ) | |
| | if(direct_dependency_flag[ i ][ j ]) | |
| | **direct_dependency_type[ i ][ j ]** | u(v) |
| | } | |
| | ... | ... |
| | } | |

default_all_ilp_enable_flag equal to 1 indicates that all direct dependent layers of the layer with nuh_layer_id equal to iNuhLId are used for inter-layer sample prediction and inter-layer motion prediction for the layer with nuh_layer_id equal to iNuhLId. default_all_ilp_enable_flag equal to 0 indicates that all direct dependent layers of the layer with nuh_layer_id equal to iNuhLId may or may not be used for inter-layer sample prediction or inter-layer motion prediction for the layer with nuh_layer_id equal to iNuhLId.

FIG. 5B

Table 2. Proposed default dependency type syntax elements in VPS extension

| vps_extension( ) { | Descriptor |
|---|---|
| ... | |
| **rep_format_idx_present_flag** | u(1) |
| if( rep_format_idx_present_flag ) | |
| **vps_num_rep_formats_minus1** | u(4) |
| for( i = 0; i <= vps_num_rep_formats_minus1; i++ ) | |
| rep_format( ) | |
| if( rep_format_idx_present_flag ) | |
| for( i = 1; i <= vps_max_layers_minus1; i++ ) | |
| if( vps_num_rep_formats_minus1 > 0 ) | |
| **vps_rep_format_idx[ i ]** | u(4) |
| **max_one_active_ref_layer_flag** | u(1) |
| **cross_layer_irap_aligned_flag** | u(1) |
| **direct_dep_type_len_minus2** | ue(v) |
| **default_direct_dependency_flag** | u(1) |
| if ( default_direct_dependency_flag ) | |
| **default_direct_dependency_type** | u(v) |
| else { | |
| for( i = 1; i <= vps_max_layers_minus1; i++ ) | |
| for( j = 0; j < i; j++ ) | |
| if( direct_dependency_flag[ i ][ j ] ) | |
| **direct_dependency_type[ i ][ j ]** | u(v) |
| } | |
| ... | |
| } | |

530 direct_dep_type_len_minus2 plus 2 specifies the number of bits of the default_direct_dependency_type syntax element and the direct_dependency_type[ i ][ j ] syntax element. In bitstreams conforming to this version of this Specification the value of direct_dep_type_len_minus2 shall be equal 0. Although the value of direct_dep_type_len_minus2 shall be equal to 0 in this version of this Specification, decoders shall allow other values of direct_dep_type_len_minus2 in the range of 0 to 30, inclusive, to appear in the syntax.

FIG. 5C default_direct_dependency_flag equal to 0 indicates that the syntax elements direct_dependency_type[ i ][ j ] are present in the VPS extension and the type of dependency between the layer with nuh_layer_id equal layer_id_in_nuh[ i ] and the layer with nuh_layer_id equal to layer_id_in_nuh[ j ] is specified by direct_dependency_type[ i ][ j ]. default_direct_dependency_flag equal to 1 indicates that the syntax elements direct_dependency_type[ i ][ j ] are not present in the VPS extension and that the type of dependency between the layer with nuh_layer_id equal layer_id_in_nuh[ i ] and the layer with nuh_layer_id equal to layer_id_in_nuh[ j ] is derived as follows.

default_direct_dependency_type specifies the default type of dependency. default_direct_dependency_type equal to 0 specifies that the default type of dependency is inter-layer sample prediction but not inter-layer motion prediction. default_direct_dependency_type equal to 1 indicates that the default type of dependency is inter-layer motion prediction but not inter-layer sample prediction. default_direct_dependency_type equal to 2 indicates that the default type of dependency is inter-layer sample motion prediction and inter-layer motion prediction. Although the value of default_direct_dependency_type shall be in the range of 0 to 2, inclusive, in this version of this Specification, decoders shall allow values of default_direct_dependency_type in the range of 3 to $2^{32}-2$, inclusive, to appear in the syntax.

direct_dependency_type[ i ][ j ] indicates the type of dependency between the layer with nuh_layer_id equal layer_id_in_nuh[ i ] and the layer with nuh_layer_id equal to layer_id_in_nuh[ j ]. direct_dependency_type[ i ][ j ] equal to 0 indicates that the layer with nuh_layer_id equal to layer_id_in_nuh[ j ] is used for inter-layer sample prediction but not for inter-layer motion prediction of the layer with nuh_layer_id equal layer_id_in_nuh[ i ]. direct_dependency_type[ i ][ j ] equal to 1 indicates that the layer with nuh_layer_id equal to layer_id_in_nuh[ j ] is used for inter-layer motion prediction but not for inter-layer sample prediction of the layer with nuh_layer_id equal layer_id_in_nuh[ i ]. direct_dependency_type[ i ][ j ] equal to 2 indicates that the layer with nuh_layer_id equal to layer_id_in_nuh[ j ] is used for both inter-layer sample motion prediction and inter-layer motion prediction of the layer with nuh_layer_id equal layer_id_in_nuh[ i ]. Although the value of direct_dependency_type[ i ][ j ] shall be in the range of 0 to 2, inclusive, in this version of this Specification, decoders shall allow values of direct_dependency_type[ i ][ j ] in the range of 3 to $2^{32} - 2$, inclusive, to appear in the syntax.

FIG. 6A

Table 4. rep_format() signaled in VPS

610 (bracket spanning rows from rep_format_idx_present_flag to ...)

| vps_extension( ) { | Descriptor |
|---|---|
| ... | |
| **rep_format_idx_present_flag** | u(1) |
| if( rep_format_idx_present_flag ) | |
| **vps_num_rep_formats_minus1** | u(4) |
| for( i = 0; i <= vps_num_rep_formats_minus1; i++ ) | |
| rep_format( ) | |
| if( rep_format_idx_present_flag ) | |
| for( i = 1; i <= vps_max_layers_minus1; i++ ) | |
| if( vps_num_rep_formats_minus1 > 0 ) | |
| **vps_rep_format_idx[ i ]** | u(4) |
| ... | |
| } | |

FIG. 6B

Table 3. Representation format syntax

| rep_format( ) { | Descriptor |
|---|---|
| **chroma_format_vps_idc** | u(2) |
| if( chroma_format_vps_idc == 3 ) | |
| **separate_colour_plane_vps_flag** | u(1) |
| **pic_width_vps_in_luma_samples** | u(16) |
| **pic_height_vps_in_luma_samples** | u(16) |
| **bit_depth_vps_luma_minus8** | u(4) |
| **bit_depth_vps_chroma_minus8** | u(4) |
| } | |

Table 5. Proposed representation format update syntax elements in SPS

| seq_parameter_set_rbsp( ) { | Descriptor |
| --- | --- |
| ... | ue(v) |
| if( nuh_layer_id > 0 ) | |
| **update_rep_format_flag** | u(1) |
| if( update_rep_format_flag ) { | |
| **update_rep_format_idx_present_flag** | u(1) |
| if (update_rep_format_idx_present_flag) | |
| **update_rep_format_idx** | u(4) |
| else { | |
| **chroma_format_idc** | ue(v) |
| if( chroma_format_idc == 3 ) | |
| **separate_colour_plane_flag** | u(1) |
| **pic_width_in_luma_samples** | ue(v) |
| **pic_height_in_luma_samples** | ue(v) |
| } | |
| } | |
| ... | u(1) |
| } | |

630 update_rep_format_idx_present_flag equal to 1 specifies that the syntax element, update_rep_format_idx, is explicitly signaled in the SPS. update_format_idx_present_flag equal to 0 specifies that the syntax element update_rep_format_idx is not present.

update_rep_format_idx specifies the index into the list of rep_format( ) syntax structures in the VPS. When not present, the value of update_rep_format_idx is inferred to be equal to 0. The value of update_rep_format_idx shall be in the range of 0 to vps_num_rep_formats_minus1, inclusive.

FIG. 6D

| | seq_parameter_set_rbsp( ) { | Descriptor |
|---|---|---|
| | **sps_video_parameter_set_id** | u(4) |
| | if( nuh_layer_id == 0 ) { | |
| 640 | **sps_max_sub_layers_minus1** | u(3) |
| | **sps_temporal_id_nesting_flag** | u(1) |
| | profile_tier_level( 1, sps_max_sub_layers_minus1 ) | |
| | } | |
| | **sps_seq_parameter_set_id** | ue(v) |
| | if( nuh_layer_id > 0 ) { | |
| | **update_rep_format_flag** | u(1) |
| | if( update_rep_format_flag ) { | |
| | **update_rep_format_index** | u(4) |
| 650 | } else { | |
| | **chroma_format_idc** | ue(v) |
| | if( chroma_format_idc == 3 ) | |
| | **separate_colour_plane_flag** | u(1) |
| | **pic_width_in_luma_samples** | ue(v) |
| | **pic_height_in_luma_samples** | ue(v) |
| | } | |
| | **conformance_window_flag** | u(1) |
| | if( conformance_window_flag ) { | |
| | **conf_win_left_offset** | ue(v) |
| | **conf_win_right_offset** | ue(v) |
| | **conf_win_top_offset** | ue(v) |
| | **conf_win_bottom_offset** | ue(v) |
| | } | |
| | if(~~update_rep_format_flag~~ nuh_layer_id == 0) { | |
| 660 | **bit_depth_luma_minus8** | ue(v) |
| | **bit_depth_chroma_minus8** | ue(v) |
| | } | |
| | **log2_max_pic_order_cnt_lsb_minus4** | ue(v) |
| | **sps_sub_layer_ordering_info_present_flag** | u(1) |
| | for( i = ( sps_sub_layer_ordering_info_present_flag ? 0 :<br>sps_max_sub_layers_minus1 );<br>i <= sps_max_sub_layers_minus1; i++ ) { | |

FIG. 6E

| | |
|---|---|
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| log2_min_luma_coding_block_size_minus3 | ue(v) |
| log2_diff_max_min_luma_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| max_transform_hierarchy_depth_intra | ue(v) |
| scaling_list_enabled_flag | u(1) |
| if( scaling_list_enabled_flag ) { | |
| if( nuh_layer_id > 0 ) | |
| sps_infer_scaling_list_flag | u(1) |
| if( sps_infer_scaling_list_flag ) | |
| sps_scaling_list_ref_layer_id | u(6) |
| else { | |
| sps_scaling_list_data_present_flag | u(1) |
| if( sps_scaling_list_data_present_flag ) | |
| scaling_list_data( ) | |
| } | |
| } | |
| amp_enabled_flag | u(1) |
| sample_adaptive_offset_enabled_flag | u(1) |
| pcm_enabled_flag | u(1) |
| if( pcm_enabled_flag ) { | |
| pcm_sample_bit_depth_luma_minus1 | u(4) |
| pcm_sample_bit_depth_chroma_minus1 | u(4) |
| log2_min_pcm_luma_coding_block_size_minus3 | ue(v) |
| log2_diff_max_min_pcm_luma_coding_block_size | ue(v) |
| pcm_loop_filter_disabled_flag | u(1) |
| } | |
| num_short_term_ref_pic_sets | ue(v) |
| for( i = 0; i < num_short_term_ref_pic_sets; i++) | |
| short_term_ref_pic_set( i ) | |

670 (brace spanning rows from scaling_list_enabled_flag to closing })

FIG. 6F

| | |
|---|---|
| **long_term_ref_pics_present_flag** | u(1) |
| if( long_term_ref_pics_present_flag ) { | |
| **num_long_term_ref_pics_sps** | ue(v) |
| for( i = 0; i < num_long_term_ref_pics_sps; i++ ) { | |
| **lt_ref_pic_poc_lsb_sps[ i ]** | u(v) |
| **used_by_curr_pic_lt_sps_flag[ i ]** | u(1) |
| } | |
| } | |
| **sps_temporal_mvp_enabled_flag** | u(1) |
| **strong_intra_smoothing_enabled_flag** | u(1) |
| **vui_parameters_present_flag** | u(1) |
| if( vui_parameters_present_flag ) | |
| vui_parameters( ) | |
| **sps_extension_flag** | u(1) |
| if( sps_extension_flag ) { | |
| sps_extension( ) | |
| **sps_extension2_flag** | u(1) |
| if( sps_extension2_flag ) | |
| while( more_rbsp_data( ) ) | |
| **sps_extension_data_flag** | u(1) |
| } | |
| rbsp_trailing_bits( ) | |
| } | |

680 (rows from sps_extension_flag to closing brace)

update_rep_format_idx specifies the index, into the list of rep_format( ) syntax structures in the VPS, of the rep_format() syntax structure that applies to the layers that refer to this SPS. When not present, the value of update_rep_format_idx is inferred to be equal to 0. The value of update_rep_format_idx shall be in the range of 0 to vps_num_rep_formats_minus1, inclusive.

update_rep_format_flag equal to 1 specifies that the syntax elements ~~chroma_format_idc, separate_colour_plane_flag, pic_width_in_luma_samples, pic_height_in_luma_samples, bit_depth_luma_minus8, and bit_depth_chroma_minus8 are explicitly signalled in the SPS and all the layers with nuh_layer_id greater than zero that refer to this SPS use these values instead of those signalled in the VPS when the nuh_layer_id of the SPS is greater than 0~~ update_rep_format_idx is present in the SPS. update_rep_format_flag equal to 0 specifies that the syntax elements ~~chroma_format_idc, separate_colour_plane_flag, pic_width_in_luma_samples, pic_height_in_luma_samples, bit_depth_luma_minus8, and bit_depth_chroma_minus8 are not signalled~~ update_rep_format_idx is not present in the SPS and all the layers that refer to this SPS use the values signaled in the VPS. When not present, the value of update_rep_format_flag is inferred to be equal to ~~1~~0.

FIG. 7A

Table 7. conditioning on max_one_active_ref_layer_flag proposed in VPS extension

| vps_extension( ) { | Descriptor |
|---|---|
| ... | ... |
| **all_ref_layers_active_flag** | u(1) |
| ... | |
| if (!all_ref_layers_active_flag) | |
| **max_one_active_ref_layer_flag** | u(1) |
| ... | ... |
| } | |

max_one_active_ref_layer_flag equal to 1 specifies that at most one picture is used for inter-layer prediction for each picture in the CVS. max_one_active_ref_layer_flag equal to 0 specifies that more than one picture may be used for inter-layer prediction for each picture in the CVS. When max_one_active_ref_layer_flag is not present, it is inferred as follows:

max_one_active_ref_layer_flag = (MaxNumDirectDependentRefLayers > 1)? 0:1

FIG. 7B

Table 8. conditioning on slice_pic_order_cnt_lsb proposed in slice header syntax

<table>
<tr><td>slice_segment_header( ) {</td><td>Descriptor</td></tr>
<tr><td>...</td><td></td></tr>
<tr><td>if( (nuh_layer_id > 0 && !cross_layer_irap_aligned_flag ) | |<br>( nal_unit_type != IDR_W_RADL && nal_unit_type != IDR_N_LP ) ) {</td><td></td></tr>
<tr><td>slice_pic_order_cnt_lsb</td><td>u(v)</td></tr>
<tr><td>...</td><td></td></tr>
<tr><td>}</td><td></td></tr>
</table>

CODING UNIT (1710)

PREDICTION UNIT (1760)

TRANSFORMATION UNIT (1770)

METHOD AND APPARATUS FOR ENCODING MULTILAYER VIDEO AND METHOD AND APPARATUS FOR DECODING MULTILAYER VIDEO

CROSS-REFERENCE TO RELATED APPLICATIONS

This application is a bypass continuation of International Application No. PCT/KR/2014/010142 filed on Oct. 27, 2014, which claims benefit from U.S. Provisional Application No. 61/896,038 filed on Oct. 26, 2013 at the U.S. Patent and Trademark Office, the disclosures of which are incorporated herein by reference in their entireties.

TECHNICAL FIELD

The present invention relates to methods and apparatus for encoding and decoding a multilayer video such as a scalable video and a multiview video, and more particularly, to a high-level syntax structure for signaling the multilayer video.

BACKGROUND ART

In general, video data is encoded by using a codec according to a predetermined data compression standard, e.g., the Moving Picture Experts Group (MPEG), and then the video data in the form of a bitstream is stored in a storage medium or is transmitted via a communication channel.

Scalable Video Coding (SVC) indicates a video compression technique for appropriately adjusting and transmitting an amount of data while being adapted to various communication networks and terminals. The SVC provides a video coding method that can be adaptively serviced by one videostream, according to various transmitting networks and various receiving terminals.

In addition, due to the recent supply of three-dimensional (3D) multimedia apparatuses and 3D multimedia contents, a multiview video coding technique for 3D video coding has become increasingly widely used.

According to scalable video coding or multiview video coding of the related art, a video is coded according to a limited coding method based on a macroblock having a predetermined size.

DETAILED DESCRIPTION OF THE INVENTION

Technical Problem

According to an aspect of the present invention, there is provided a multilayer video decoding method including obtaining a multilayer video bitstream; determining, based on the obtained multilayer video bitstream, whether or not a default reference type, in which at least one layer is inter-layer predicted by using at least one reference layer by default, is used; and inter-layer predicting the at least one layer by using the at least one reference layer according to the default reference type, based on the determining of whether or not the default reference type is used, and decoding an image including the at least one layer.

According to another aspect of the present invention, there is provided a multilayer video decoding method including obtaining a multilayer video bitstream; determining a representation format that is commonly used to encode a plurality of layers, from the multilayer video bitstream;

determining, based on the multilayer video bitstream, whether a representation format with respect to at least one layer included in the plurality of layers is changed; obtaining an index of the representation format with respect to the at least one layer, based on the determining of whether the representation format with respect to the at least one layer is changed; and changing the representation format with respect to the at least one layer, by using the obtained index, and decoding an image including the at least one layer, based on the changed representation format.

Advantageous Effects of the Invention

According to various embodiments, compression efficiency may be improved by using multilayer video encoding and decoding methods.

According to an embodiment, multilayer video encoding and decoding methods may generate a bitstream including information about a default reference type, whereby unnecessary signaling with respect to a reference type may be decreased and a waste of bits may be prevented.

According to another embodiment, multilayer video encoding and decoding methods may signal an index that specifies one representation format from a list of predetermined representation formats, as change information of a representation format with respect to a specific layer, and may not signal all information about the changed representation format, whereby unnecessary signaling may be decreased and a waste of bits may be prevented.

According to another embodiment, multilayer video encoding and decoding methods adjust a condition for obtaining a specific syntax element from a bitstream so as not to obtain redundant information, whereby unnecessary signaling may be decreased and a waste of bits may be prevented.

DESCRIPTION OF THE DRAWINGS

FIGS. 5A through 5C illustrate Video Parameter Set (VPS) extension syntax, according to an embodiment of the present invention.

FIGS. 6A and 6B illustrate VPS extension syntax, according to an embodiment of the present invention.

FIG. 6C illustrates Sequence Parameter Set (SPS) syntax, according to an embodiment of the present invention.

FIGS. 6D through 6F illustrate SPS syntax, according to another embodiment of the present invention.

FIG. 7A illustrates VPS extension syntax, according to an embodiment of the present invention.

FIG. 7B illustrates slice segment header syntax, according to an embodiment of the present invention.

BEST MODE

Figure 1A:
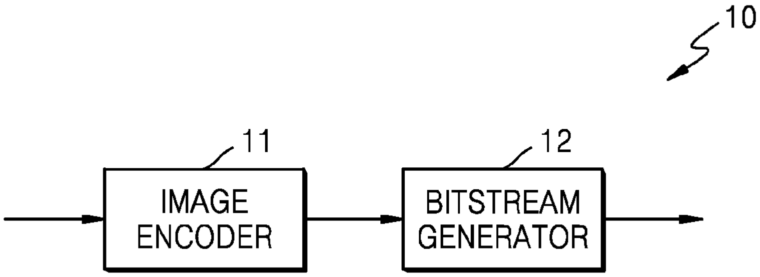
FIG. 1A is a block diagram illustrating a structure of a multilayer video encoding apparatus, according to an embodiment of the present invention.

According to an aspect of the present invention, there is provided a multilayer video decoding method including obtaining a multilayer video bitstream; determining, based on the obtained multilayer video bitstream, whether or not a default reference type, in which at least one layer is inter-layer predicted by using at least one reference layer by default, is used; and inter-layer predicting the at least one layer by using the at least one reference layer according to the default reference type, based on the determining of whether or not the default reference type is used, and decoding an image including the at least one layer.

The determining, based on the obtained multilayer video bitstream, of whether or not the default reference type, in which the at least one layer is inter-layer predicted by using the at least one reference layer by default, is used may include obtaining a flag which is included in the obtained multilayer video bitstream and indicates whether or not the default reference type, in which the at least one layer is inter-layer predicted by using the at least one layer by default, is used; and determining, based on the flag, whether or not the default reference type, in which the at least one layer is inter-layer predicted by using the at least one reference layer by default, is used.

The inter-layer predicting of the at least one layer by using the at least one reference layer according to the default reference type, based on the determining of whether or not the default reference type is used, and the decoding of the image including the at least one layer, may include, when it is determined that the default reference type is not used, determining at least one reference type of the at least one reference layer to be respectively referred to by the at least one layer; and inter-layer predicting the at least one layer by using the at least one reference layer, based on the at least one reference type of the at least one reference layer determined to be respectively referred to by the at least one layer, and decoding the image including the at least one layer.

The inter-layer predicting of the at least one layer by using the at least one reference layer according to the default reference type, based on the determining of whether or not the default reference type is used, and the decoding of the image including the at least one layer, may include obtaining an index indicating the default reference type from the obtained multilayer video bitstream; and determining the default reference type, based on the obtained index, inter-layer predicting the at least one layer by using the at least one reference layer according to the determined default reference type, and decoding the image including the at least one layer.

The obtaining of the index indicating the default reference type from the obtained multilayer video bitstream may include obtaining, from the multilayer video bitstream, a Video Parameter Set Network Abstraction Layer (VPS NAL) unit including the flag included in the obtained multilayer video bitstream indicates whether or not the default reference type, in which the at least one layer is inter-layer predicted by using the at least one layer by default, is used; and obtaining, by using the VPS NAL unit, the flag included in the obtained multilayer video bitstream and indicates whether or not the default reference type, in which the at least one layer is inter-layer predicted by using the at least one layer by default, is used.

According to another aspect of the present invention, there is provided a multilayer video decoding method including obtaining a multilayer video bitstream; determining a representation format that is commonly used to encode a plurality of layers, from the multilayer video bitstream; determining, based on the multilayer video bitstream, whether a representation format with respect to at least one layer included in the plurality of layers is changed; obtaining an index of the representation format with respect to the at least one layer, based on the determining of whether the representation format with respect to the at least one layer is changed; and changing the representation format with respect to the at least one layer, by using the obtained index, and decoding an image including the at least one layer, based on the changed representation format.

The obtaining of the index of the representation format with respect to the at least one layer, based on the determining whether the representation format with respect to the at least one layer is changed may include obtaining a flag indicating whether or not the index of the representation format with respect to the at least one layer is used, based on the determining of whether the representation format is changed; and obtaining, based on the obtained flag, the index of the representation format, wherein the index indicates the representation format from among representation formats that are related to the plurality of layers and include the representation format determined with respect to the at least one layer.

The changing of the representation format with respect to the at least one layer, by using the obtained index, and the decoding of the image including the at least one layer, based on the changed representation format, may include, when the representation format with respect to the at least one layer is not changed based on the multilayer video bitstream, decoding the image including the at least one layer, based on the representation format determined with respect to the at least one layer.

The obtaining of the index of the representation format with respect to the at least one layer, based on the determining of whether the representation format with respect to the at least one layer is changed may include obtaining, from the multilayer video bitstream, a Sequence Parameter Set Network Abstraction Layer (SPS NAL) unit including the index indicating the representation format from among the representation formats that are related to the plurality of layers and include the representation format determined with respect to the at least one layer; and obtaining the index by using the SPS NAL unit.

The determining of the representation format that is commonly used to encode the plurality of layers, from the multilayer video bitstream, may include obtaining, from the multilayer video bitstream, a Video Parameter Set Network Abstraction Layer (VPS NAL) unit indicating the representation formats; and determining the representation format that is commonly used to encode the plurality of layers, by using the obtained VPS NAL unit.

According to another aspect of the present invention, there is provided a multilayer video encoding method including inter-layer predicting at least one layer by using at least one reference layer included in image data; generating a multilayer encoded image by encoding an image including the at least one layer; determining, based on the generated multilayer encoded image, whether or not a default reference type, in which the at least one layer is inter-layer predicted by using the at least one reference layer by default, is used; and generating a bitstream including the generated multilayer encoded image and information indicating whether or not the default reference type is used.

The generating of the bitstream including the generated multilayer encoded image and the information indicating whether or not the default reference type is used may include generating a flag indicating whether or not the default reference type is used; and generating a bitstream including the generated multilayer encoded image and the flag indicating whether or not the default reference type is used.

The determining of, based on the generated multilayer encoded image, use or non-use of the default reference type in which the at least one layer is inter-layer predicted by using the at least one reference layer by default may further include, if the non-use of the default reference type is determined, determining at least one reference type of the at least one reference layer to be respectively referred to by the at least one layer, and the generating of the bitstream including the generated multilayer encoded image and the information specifying the use or non-use of the default reference type may include generating a bitstream that further includes information indicating the determined at least one reference type of the at least one reference layer to be respectively referred to by the at least one layer.

The generating of the bitstream including the generated multilayer encoded image and the information specifying the use or non-use of the default reference type may include generating an index specifying the default reference type from among a plurality of reference types; and generating a bitstream that further includes the index.

According to another aspect of the present invention, there is provided a multilayer video encoding method including encoding image data to a multilayer encoded image; determining a representation format that is commonly used to encode a plurality of layers; and determining, based on the determined representation format, whether a representation format with respect to at least one layer included in the plurality of layers is changed; and generating a bitstream including the multilayer encoded image and information indicating whether the representation format with respect to the at least one layer is changed.

The determining of, based on the determined representation format, whether the representation format with respect to the at least one layer included in the plurality of layers is changed may further include determining use or non-use of an index of the representation format with respect to the at least one layer; and if the use of the index of the representation format is determined, determining an index of a representation format which indicates the representation format from among a plurality of representation formats, and the generating of the bitstream including the generated multilayer encoded image and the information specifying whether the representation format with respect to the at least one layer is changed may further include generating a bitstream that further includes a flag specifying use or non-use of the determined index of the representation format and the determined index of the representation format.

According to another aspect of the present invention, there is provided a multilayer video decoding apparatus including a bitstream obtainer configured to obtain a multilayer video bitstream; and an image decoder configured to determine, based on the obtained multilayer video bitstream, whether or not a default reference type, in which at least one layer is inter-layer predicted by using at least one reference layer by default, is used, to inter-layer predict the at least one layer by using the at least one reference layer according to the default reference type, based on the determining of whether or not the default reference type is used, and to decode an image including the at least one layer.

According to another aspect of the present invention, there is provided a multilayer video decoding apparatus including a bitstream obtainer configured to obtain a multilayer video bitstream; and an image decoder configured to determine a representation format that is commonly used to encode a plurality of layers, from the multilayer video bitstream, to determine, based on the multilayer video bitstream, whether a representation format with respect to at least one layer included in the plurality of layers is changed, to obtain an index of the representation format with respect to the at least one layer, based on the determining of whether the representation format with respect to the at least one layer is changed, to change the representation format with respect to the at least one layer, by using the obtained index, and to decode an image including the at least one layer, based on the changed representation format.

According to another aspect of the present invention, there is provided a multilayer video encoding apparatus including an image encoder configured to inter-layer predict at least one layer by using at least one reference layer included in image data, to generate a multilayer encoded image by encoding an image including the at least one layer, and to determine, based on the generated multilayer encoded image, use or non-use of a default reference type in which the at least one layer is inter-layer predicted by using the at least one reference layer by default, and a bitstream generator configured to generate a bitstream including the generated multilayer encoded image and information specifying the use or non-use of the default reference type.

According to another aspect of the present invention, there is provided a multilayer video encoding apparatus including an image encoder configured to encode image data to a multilayer encoded image, to determine a representation format that is commonly used to encode a plurality of layers, and to determine, based on the determined representation format, whether a representation format with respect to at least one layer included in the plurality of layers is changed; and a bitstream generator configured to generate a bitstream including the generated multilayer encoded image and information specifying whether the representation format with respect to the at least one layer is changed.

According to an aspect of the present invention, there is provided a computer-readable recording medium having recorded thereon a program for executing the multilayer video decoding method, by using a computer.

According to an aspect of the present invention, there is provided a computer-readable recording medium having recorded thereon a program for executing the multilayer video encoding method, by using a computer.

MODE OF THE INVENTION

Hereinafter, a multilayer video encoding apparatus, a multilayer video decoding apparatus, a multilayer video encoding method, and a multilayer video decoding method according to various embodiments are provided with reference to FIGS. 1A through 7C. Also, a video encoding apparatus and a video decoding apparatus, and a video encoding method and a video decoding method based on coding units of a tree structure according to various embodiments are provided with reference to FIGS. 8 through 20. Also, various embodiments to which the multilayer video encoding method, a multilayer video decoding method, the video encoding method and the video decoding method according to the embodiments of FIGS. 1A through 20 may be applied are provided with reference to FIGS. 21 through 27. Hereinafter, an 'image' may correspond to a still image of a video or a moving image, i.e., the video itself.

First, with reference to FIGS. 1A through 7C, the multilayer video encoding apparatus and the multilayer video encoding method, and the multilayer video decoding apparatus and the multilayer video decoding method according to various embodiments are provided.

FIG. 1A is a block diagram illustrating a structure of a scalable video encoding apparatus, according to various embodiments.

Referring to FIG. 1A, a multilayer video encoding apparatus 10 according to an embodiment of the present invention includes an image encoder 11 and a bitstream generator 12.

The multilayer video encoding apparatus 10 according to various embodiments may divide a plurality of video streams according to layers and may encode each of them, according to a scalable video coding technique. The video stream encoding apparatus 10 may encode base layer images and enhancement layer images to different layers.

For example, a multiview video may be encoded according to the scalable video coding scheme. Left-view images may be encoded as the base layer images, and right-view images may be encoded as the enhancement layer images. Alternatively, center-view images, left-view images, and right-view images may be respectively encoded, and among these images, the center-view images may be encoded as the base layer images, the left-view images may be encoded as first enhancement layer images, and the right-view images may be encoded as second enhancement layer images. A result of encoding the base layer images may be output as a base layer stream, and results of encoding the first enhancement layer images and the second enhancement layer images may be respectively output as a first enhancement layer stream and a second enhancement layer stream.

When the number of enhancement layers is at least three, the base layer images, the first enhancement layer images, the second enhancement layer images, . . . , $K\text{-}_{th}$ enhancement layer images may be encoded. Accordingly, the result of encoding the base layer images may be output as the base layer stream, and results of encoding the first enhancement layer images, the second enhancement layer images, . . . , and the $K\text{-}_{th}$ enhancement layer images may be respectively output as the first enhancement layer stream, the second enhancement layer stream, . . . , and a $K\text{-}_{th}$ enhancement layer stream.

The multilayer video encoding apparatus 10 according to various embodiments may perform inter prediction by which a current image is predicted by referring to images of a same layer. Due to the inter prediction, a motion vector indicating motion information between the current image and a reference image, and a residual component between the current image and the reference image may be generated.

Also, the multilayer video encoding apparatus 10 according to various embodiments may perform inter-layer prediction by which the enhancement layer images are predicted by referring to the base layer images. The multilayer video encoding apparatus 10 may perform inter-layer prediction by which the second enhancement layer images are predicted by referring to the first enhancement layer images. Due to the inter-layer prediction, a position difference component between the current image and a reference image of another layer, and a residual component between the current image and the reference image of the other layer may be generated.

In a case where the multilayer video encoding apparatus 10 according to an embodiment allows at least two enhancement layers, the inter-layer prediction may be performed between base layer images and at least two enhancement layers according to a multilayer prediction structure.

An inter-layer prediction structure will be described in detail with reference to FIG. 7C.

The multilayer video encoding apparatus 10 according to various embodiments encodes each of blocks of each of images of a video according to layers. A type of a block may be a square, a rectangle, or a random geometric shape. The block is not limited to a data unit of a constant size. The block according to an embodiment may be a largest coding unit, a coding unit, a prediction unit, a transformation unit, etc. from among coding units of a tree structure. For example, the multilayer video encoding apparatus 10 may split, in each of layers, images based on the High Efficiency Video Coding (HEVC) standard into blocks in a quadtree structure, and may encode them. Video encoding and decoding methods using the coding units of the tree structure will be described with reference to FIGS. 8 through 20. The inter prediction and the inter-layer prediction may be performed by using a data unit in the form of the coding unit, the prediction unit, or the transformation unit.

The image encoder 11 according to various embodiments may encode an image sequence according to each of layers. The image encoder 11 may perform source coding operations including inter prediction or intra prediction on each of layers, and thus may generate symbol data. For example, the image encoder 11 may generate the symbol data by performing transformation and quantization on an image block including result data obtained by performing the inter prediction or the intra prediction on image samples, and may perform entropy encoding on the symbol data. The bitstream generator 12 may generate a bitstream including the symbol data on which the entropy encoding has been performed.

The image encoder 11 may encode an image sequence according to each of layers, and the bitstream generator 12 may generate each bitstream. As described above, the image encoder 11 may encode an image sequence of a current layer by referring to symbol data of another layer, due to the inter-layer prediction. Therefore, the image encoder 11 according to various embodiments may encode an image sequence of each layer by referring to an image sequence of another layer or referring to an image sequence of a same layer. For example, during an intra mode, a current sample may be predicted by using neighboring samples in a current image, and during an inter mode, the current image may be predicted by using another image of same layer. During an inter-layer prediction mode, the current image may be predicted by using a reference image from among images of another layer, the reference image having a same Picture Order Count (POC) as the current image.

The image encoder 11 may encode a multiview video, and may encode an image sequence at a different view in each of layers. In an inter-layer prediction structure for the multiview video, a current view image is encoded by referring to a different-view image, thus, the structure may be referred to as an inter-view prediction structure.

The image encoder 11 receives an input of image data including a multilayer video, encodes the image data, and generates a multilayer encoded image. The image encoder 11 corresponds to a video coding layer that directly involves a process of encoding an input video. As described layer with reference to FIGS. 8 through 20, the image encoder 11 may encode each of pictures included in the multilayer video, based on coding units of a tree structure.

The bitstream generator 12 corresponds to a Network Abstraction Layer (NAL) that adds the multilayer encoded image and auxiliary information which are generated by the image encoder 11 to a transmission data unit according to a predetermined format, and outputs the transmission data unit. The transmission data unit may be an NAL unit. The bitstream generator 12 allows the NAL unit to include the multilayer encoded image and the auxiliary information, and outputs the NAL unit. The bitstream generator 12 may output a bitstream generated by using the NAL unit.

The multilayer video encoding apparatus 10 according to an embodiment of the present invention inter-layer predicts at least one layer by using at least one reference layer included in image data, generates a multilayer encoded image, determines whether or not a default reference type, in which the at least one layer is inter-layer predicted by using the at least one reference layer, is used, and generates a bitstream including information indicating whether or not the default reference type is used, therefore, when the default reference type is used, the multilayer video encoding apparatus 10 does not signal a reference type of each reference layer for each layer, and thus may prevent an unnecessary waste of bits.

The image encoder 11 generates the multilayer encoded image by encoding an image including the at least one inter-layer predicted layer with respect to the image data. The image encoder 11 may inter-layer predict the at least one layer by using the at least one reference layer included in the image data, and may generate the multilayer encoded image by encoding the image including the at least one inter-layer predicted layer.

The image encoder 11 determines, based on a generated multilayer video encoded image, whether or not the default reference type, in which the at least one layer is inter-layer predicted by using the at least one reference layer, is used.

The image encoder 11 may generate the bitstream that includes the generated multilayer encoded image and the information indicating whether or not the default reference type is used.

In more detail, the image encoder 11 generates a flag indicating whether or not the default reference type is used. Then, the bitstream generator 12 generates the bitstream including the generated multilayer encoded image and the flag indicating whether or not the default reference type is used.

When the image encoder 11 determines that the default reference type is not used, the image encoder 11 may determine at least one reference type of at least one reference layer to be respectively referred to by the at least one layer. The bitstream generator 12 may generate a bitstream that further includes information indicating the at least one reference type of the at least one reference layer to be respectively referred to by the at least one layer.

The bitstream generator 12 may generate an index indicating the default reference type from among a plurality of reference types, and may generate a bitstream that further includes the generated index.

Figure 1B:
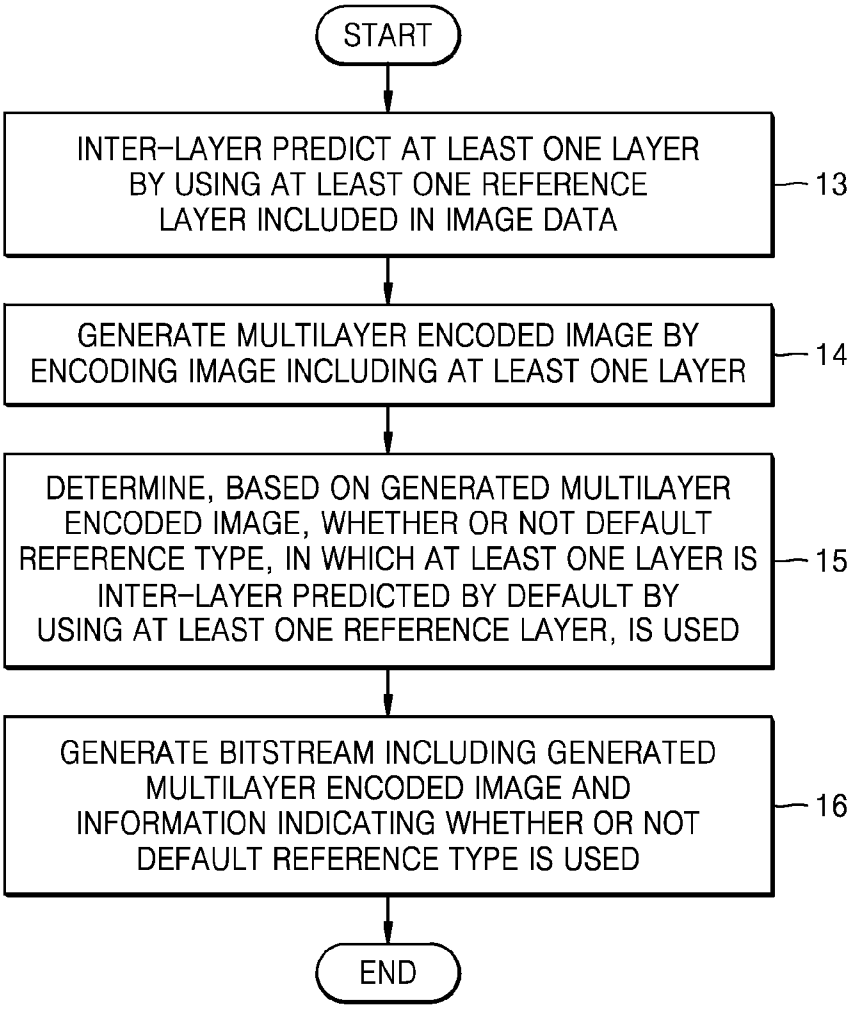
FIG. 1B is a flowchart illustrating a method of encoding a multi layer video, according to an embodiment of the present invention.

FIG. 1B is a flowchart illustrating a multilayer video encoding method, according to an embodiment of the present invention.

Referring to FIG. 1B, in operation 13, the multilayer video encoding apparatus 10 inter-layer predicts at least one layer by using at least one reference layer included in image data.

In operation 14, the multilayer video encoding apparatus 10 generates a multilayer encoded image by encoding an image including the at least one layer. The multilayer video encoding apparatus 10 may generate the multilayer encoded image by encoding residue information indicating a residue between a sample value of at least one original layer and a sample value of the at least one inter-layer predicted layer.

In operation 15, the multilayer video encoding apparatus 10 determines, based on the generated multilayer encoded image, whether or not a default reference type, in which the at least one layer is inter-layer predicted by using the at least one reference layer by default, is used In more detail, when the multilayer video encoding apparatus 10 generates the multilayer encoded image, the multilayer video encoding apparatus 10 encodes an image by using various prediction methods by taking into account rate-distortion optimization (RDO) so as to increase encoding efficiency, and determines the multilayer encoded image having optimal RDO. The multilayer video encoding apparatus 10 may determine, based on the generated multilayer encoded image, whether or not the default reference type, in which the at least one layer is inter-layer predicted by using the at least one reference layer by default, is used. However, it is not limited thereto, and when the multilayer video encoding apparatus 10 generates the multilayer encoded image, the multilayer video encoding apparatus 10 determines the multilayer encoded image having optimal encoding efficiency by taking into account the various prediction methods and a change in the number of bits depending on whether or not the default reference type is used.

When the multilayer video encoding apparatus 10 determines that the default reference type is not used, the multilayer video encoding apparatus 10 may determine at least one reference type of at least one reference layer to be respectively referred to by the at least one layer.

In operation 16, the multilayer video encoding apparatus 10 may generate a bitstream including the generated multilayer encoded image and information indicating whether or not the default reference type is used. The multilayer video encoding apparatus 10 may generate a flag indicating whether or not the default reference type is used, and may generate a bitstream including the generated multilayer encoded image and the flag indicating whether or not the determined default reference type is used.

When the multilayer video encoding apparatus 10 determines the at least one reference type of the at least one reference layer to be respectively referred to by the at least one layer, the multilayer video encoding apparatus 10 may generate a bitstream that further includes information indicating the determined at least one reference type of the at least one reference layer to be respectively referred to by the at least one layer.

Figure 1C:
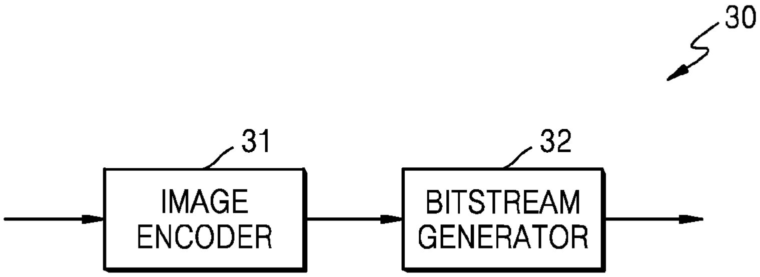
FIG. 1C is a block diagram illustrating a structure of a multilayer video encoding apparatus, according to another embodiment of the present invention.

FIG. 1C is a block diagram illustrating a structure of a multilayer video encoding apparatus, according to an embodiment of the present invention.

Referring to FIG. 1C, a multilayer video encoding apparatus 30 according to an embodiment of the present invention includes an image encoder 31 and a bitstream generator 32 as in FIG. 1A. Each element of the multilayer video encoding apparatus 30 may perform each corresponding element of the multilayer video encoding apparatus 10, thus, descriptions about overlapping details are omitted.

The image encoder 31 encodes image data to a multilayer encoded image. The image encoder 31 may determine a representation format that is commonly used to encode a plurality of layers.

The image encoder 31 may determine whether or not to change a representation format with respect to at least one layer included in the plurality of layers, based on the determined representation format. For example, when a different representation format is used for only one layer among the plurality of layers, the image encoder 31 cannot determine a representation format commonly used for the rest of layers, due to the one layer. However, even if the different representation format is used for only one layer among the plurality of layers, the image encoder 31 may first determine a representation format that is commonly used for the rest of layers, and may change the commonly-used representation format to a different representation format for the only layer.

Therefore, the image encoder 31 may not transmit a bitstream including information about the representation format commonly used for the rest of layers but may additionally include, in a bitstream, information indicating that the commonly-used representation format is changed with respect to the one layer and information about the changed representation format, so that encoding efficiency may be increased.

The image encoder 31 may determine whether or not to use a representation format index with respect to at least one layer. When the image encoder 31 determines use of the representation format index, the image encoder 31 may determine a representation format index indicating one representation format from among a plurality of representation formats. Information about the plurality of representation formats may be included in a VPS NAL unit.

In addition, when the image encoder 31 determines the representation format index, the bitstream generator 32 may generate a bitstream that further includes a flag indicating whether or not the determined representation format index and the determined representation format index. The flag indicating whether or not the representation format index is used and the representation format index may be included in an SPS NAL unit.

Figure 1D:
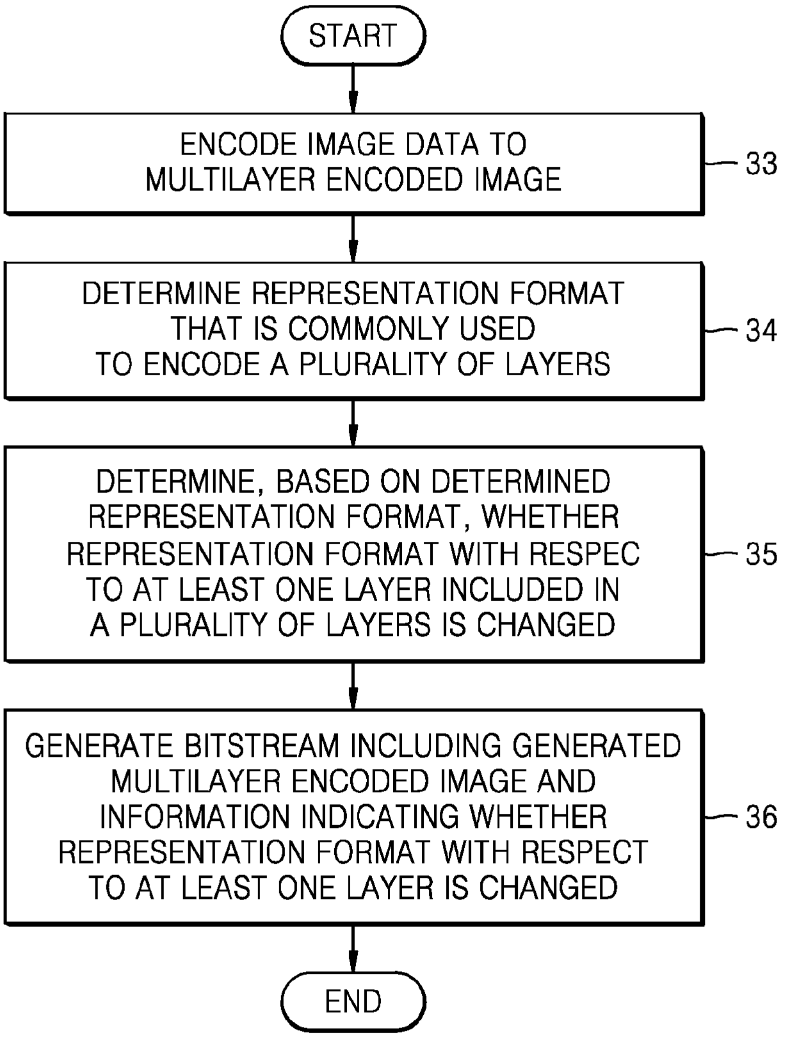
FIG. 1D is a flowchart illustrating a multilayer video encoding method, according to another embodiment of the present invention.

FIG. 1D is a flowchart illustrating a multilayer video encoding method, according to another embodiment of the present invention.

In operation 33, the multilayer video encoding apparatus 30 encodes image data to a multilayer encoded image.

In operation 34, the multilayer video encoding apparatus 30 determines a representation format that is commonly used to encode a plurality of layers.

In operation 35, the multilayer video encoding apparatus 30 may determine, based on the determined representation format, whether a representation format with respect to at least one layer included in a plurality of layers is changed. Whether or not a representation format index with respect to the at least one layer may be determined. When the multilayer video encoding apparatus 30 determines that the representation format index is used, the multilayer video encoding apparatus 30 may determine the representation format index indicating one representation format from among a plurality of representation formats.

In operation 36, the multilayer video encoding apparatus 30 may generate a bitstream including the generated multilayer encoded image and information indicating whether the representation format with respect to the at least one layer is changed. Also, when the multilayer video encoding apparatus 30 determines the representation format index, the multilayer video encoding apparatus 30 may generate a bitstream that further includes a flag indicating whether or not the representation format index is used and the representation format index.

Figure 2A:
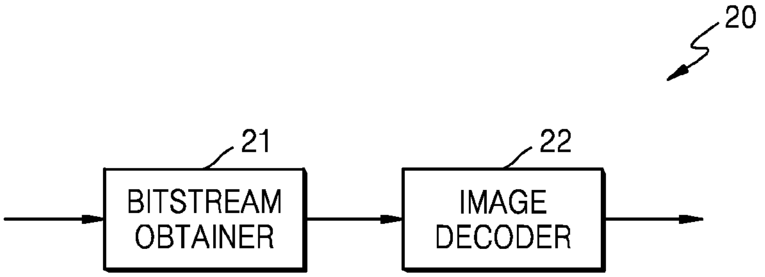
FIG. 2A is a block diagram illustrating a structure of a multilayer video decoding apparatus, according to an embodiment of the present invention.

FIG. 2A is a block diagram illustrating a structure of a multilayer video decoding apparatus, according to an embodiment of the present invention.

Referring to FIG. 2A, a multilayer video decoding apparatus 20 may include a bitstream obtainer 21 and an image decoder 22.

The multilayer video decoding apparatus 20 may receive a base layer stream and an enhancement layer stream. According to a scalable video coding technique, the multilayer video decoding apparatus 20 may receive, as the base layer stream, a base layer stream including encoded data of base layer images, and may receive, as the enhancement layer stream, an enhancement layer stream including encoded data of enhancement layer images.

The multilayer video decoding apparatus 20 may decode a plurality of layer streams according to a scalable video coding scheme. The multilayer video decoding apparatus 20 may reconstruct base layer images by reconstructing the base layer stream, and may reconstruct enhancement layer images by reconstructing the enhancement layer stream.

For example, a multiview video may be encoded according to the scalable video coding scheme. For example, left-view images may be reconstructed by decoding the base layer stream, and right-view images may be reconstructed by decoding the enhancement layer stream. As another example, center-view images may be reconstructed by decoding the base layer stream. Left-view images may be reconstructed by further decoding a first enhancement layer stream in addition to the base layer stream. Right-view images may be reconstructed by further decoding a second enhancement layer stream in addition to the base layer stream.

In a case where there are at least three enhancement layers, first enhancement layer images with respect to a first enhancement layer may be reconstructed from a first enhancement layer stream, and second enhancement layer images may be further reconstructed by further reconstructing a second enhancement layer stream. K-th enhancement layer images may be further reconstructed by further decoding a K-th enhancement layer stream in addition to the first enhancement layer stream.

The multilayer video decoding apparatus 20 may obtain encoded data of the base layer images and the enhancement layer images from the base layer stream and the enhancement layer stream, and may further obtain a motion vector generated by inter prediction, and disparity information generated by inter-layer prediction.

For example, the multilayer video decoding apparatus 20 may decode inter-predicted data of each of layers, and may decode data that is inter-layer predicted between a plurality of layers. The reconstruction may be performed by motion compensation and inter-layer decoding, based on a coding unit or a prediction unit according to an embodiment.

Images of each layer stream may be reconstructed by performing motion compensation for a current image by referring to reconstructed images that are predicted via inter prediction using a same layer. The motion compensation means an operation of reconstructing a reconstructed image of the current image by synthesizing a reference image and a residual component of the current image, wherein the reference image is determined by using a motion vector of the current image.

Also, the multilayer video decoding apparatus 20 according to the embodiment may perform the inter-layer decoding by referring to the base layer images, so as to reconstruct the enhancement layer image predicted via the inter-layer prediction. The inter-layer decoding means an operation of reconstructing a reconstructed image of the current image by synthesizing a reference image of another layer and the residual component of the current image, wherein the reference image is determined by using disparity information of the current image.

The multilayer video decoding apparatus 20 according to the embodiment may perform inter-layer decoding so as to reconstruct the second enhancement layer images that are predicted by referring to the first enhancement layer images.

The multilayer video decoding apparatus 20 decodes each of blocks of each of images of a video. The block according to the embodiment may be a largest coding unit, a coding unit, a prediction unit, a transformation unit, etc. from among coding units of a tree structure. For example, the multilayer video decoding apparatus 20 may decode each layer stream, based on blocks in a quadtree structure determined according to the HEVC standard, and may reconstruct image sequences.

The image decoder 22 may obtain symbol data reconstructed by performing entropy decoding on each layer. The image decoder 22 may perform inverse-quantization and inverse-transformation by using the symbol data and thus may reconstruct quantized transform coefficients of the residual component. The image decoder 22 according to another embodiment may receive a bitstream of the quantized transform coefficients. As a result of the inverse-quantization and the inverse-transformation that are performed on the quantized transform coefficients, the residual component of images may be reconstructed.

The image decoder 22 according to various embodiments may reconstruct a received bitstream according to each of layers and may reconstruct an image sequence according to each of the layers.

The image decoder 22 may generate reconstructed images of the image sequence according to each of the layers by performing motion compensation between images of a same layer or by performing inter-layer prediction between images of different layers.

Therefore, the image decoder 22 according to various embodiments may decode an image sequence of each layer by referring to an image sequence of a same layer or an image sequence of different layer, according to a prediction mode. For example, during an intra prediction mode, a current block may be reconstructed by using neighboring samples in a same image, and during an inter prediction mode, the current block may be reconstructed by referring to another image of the same layer. During an inter-layer prediction mode, the current block may be reconstructed by using a reference image that has a same POC as the current image and is from among images of another layer.

The bitstream obtainer 21 according to the embodiment of the present invention obtains a multilayer video stream of an encoded image. The bitstream obtainer 21 may include a receiver and thus may perform a function of the receiver.

The image decoder 22 according to the embodiment of the present invention may determine whether or not a default reference type, in which at least one layer is inter-layer predicted by using at least one reference layer by default, is used, based on the multilayer video bitstream obtained by the bitstream obtainer 21. Based on the determination with respect to whether or not the default reference type is used, the image decoder 22 inter-layer predicts the at least one layer by using the at least one reference layer, according to the default reference type. The image decoder 22 decodes an image including the at least one layer.

The image decoder 22 obtains a flag indicating whether or not the default reference type, in which at least one layer included in the multilayer video bitstream is inter-layer predicted by using a reference layer by default, is used.

The image decoder 22 determines, based on the obtained flag, whether or not the default reference type, in which the at least one layer is inter-layer predicted by using at least one reference layer by default, is used.

When the image decoder 22 determines that the default reference type is not used, the image decoder 22 may determine at least one reference type of at least one reference layer to be respectively referred to by the at least one layer. The image decoder 22 may inter-layer predict the at least one layer by using the at least one reference layer, based on the determined at least one reference type of the at least one reference layer to be respectively referred to by the at least one layer, and may decode the image including the at least one layer.

The image decoder 22 obtains an index indicating the default reference type from the multilayer video bitstream. The image decoder 22 may determine the default reference type, based on the obtained index, may inter-layer predict the at least one layer by using the at least one reference layer according to the determined default reference type, and may decode the image including the at least one layer.

The image decoder 22 may obtain, from the multilayer video bitstream, a Video Parameter Set Network Abstraction Layer (VPS NAL) unit that includes the flag indicating whether or not the default reference type, in which the at least one layer is inter-layer predicted by using the reference layer by default, is used. Here, a Video Parameter Set (VPS) includes information of a parameter to be applied to multilayer image sequences included in a multilayer video.

The image decoder 22 may obtain, by using the obtained VPS NAL unit, the flag indicating whether or not the default reference type, in which the at least one layer is inter-layer predicted by using the reference layer by default, is used.

Figure 2B:
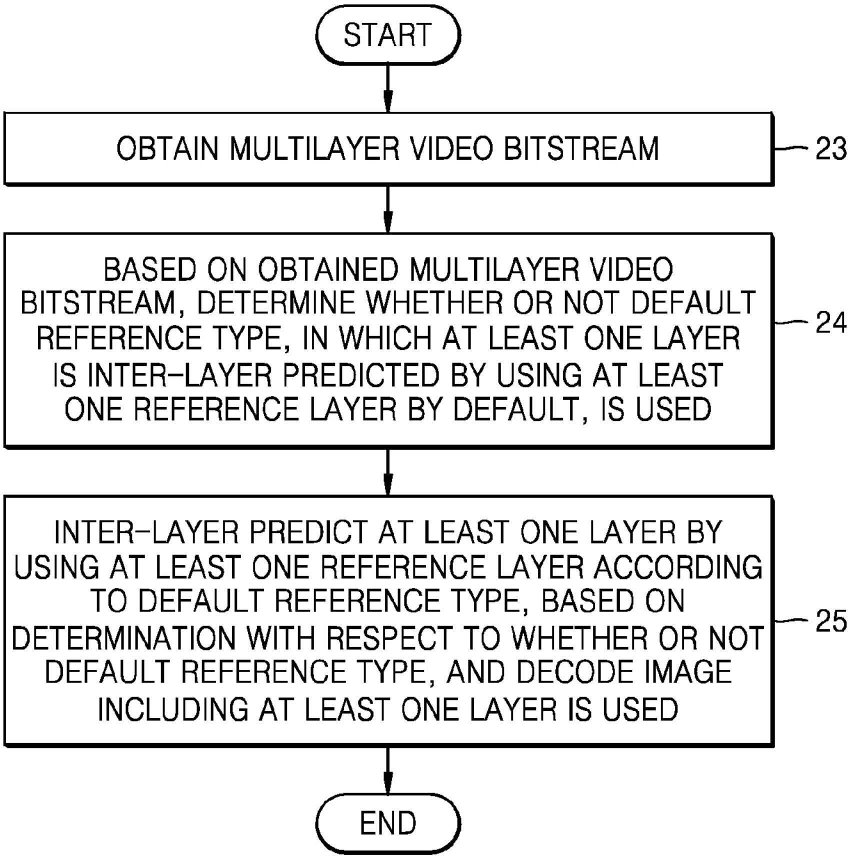
FIG. 2B is a flowchart illustrating a multilayer video decoding method, according to an embodiment of the present invention.

FIG. 2B is a flowchart illustrating a multilayer video decoding method, according to an embodiment of the present invention.

In operation 23, the multilayer video decoding apparatus 20 may obtain a multilayer video bitstream.

In operation 24, based on the obtained multilayer video bitstream, the multilayer video decoding apparatus 20 determines whether or not a default reference type, in which at least one layer is inter-layer predicted by using at least one reference layer by default, is used. For example, the multilayer video decoding apparatus 20 obtains a flag indicating whether or not the default reference type, in which the at least one layer included in the multilayer video bitstream is inter-layer predicted by using a reference layer by default, is used.

The multilayer video decoding apparatus 20 may determine, based on the obtained flag, whether or not the default reference type, in which the at least one layer is inter-layer predicted by using at least one reference layer by default, is used.

In operation 25, the multilayer video decoding apparatus 20 may inter-layer predict the at least one layer by using the at least one reference layer according to the default reference type, based on the determination with respect to whether or not the default reference type is used, and may decode an image including the at least one layer. When the multilayer video decoding apparatus 20 determines that the default reference type is not used, the multilayer video decoding apparatus 20 determines at least one reference type of at least one reference layer to be respectively referred to by the at least one layer. The multilayer video decoding apparatus 20 may inter-layer predict the at least one layer by using the at least one reference layer, based on the determined at least one reference type of at least one reference layer to be respectively referred to by the at least one layer, and may decode the image including the at least one layer.

Figure 2C:
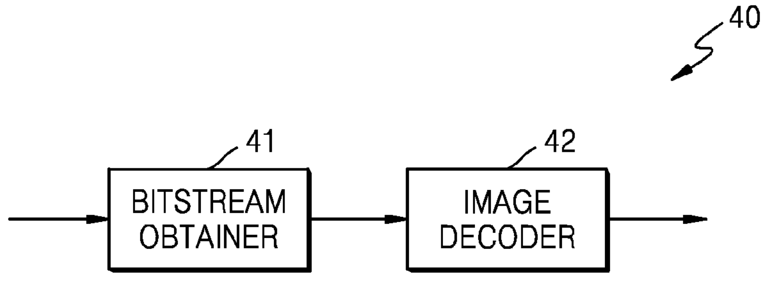
FIG. 2C is a block diagram illustrating a structure of a multilayer video decoding apparatus, according to another embodiment of the present invention.

FIG. 2C is a block diagram illustrating a structure of a multilayer video decoding apparatus, according to an embodiment of the present invention.

Referring to FIG. 2C, a multilayer video decoding apparatus 40 according to the embodiment of the present invention includes a bitstream obtainer 41 and an image decoder 42 as in FIG. 2A. Each element of the multilayer video decoding apparatus 40 may perform each corresponding element of the multilayer video decoding apparatus 20, thus, descriptions about overlapping details are omitted.

The bitstream obtainer 41 obtains a multilayer video bitstream.

The image decoder 42 determines a representation format that is commonly used to decode a plurality of pieces of layer encoded data from the multilayer video bitstream.

The image decoder 42 determines, based on the obtained multilayer video bitstream, whether a representation format with respect to at least one layer included in a plurality of layers is changed. The image decoder 42 obtains a VPS NAL unit indicating a plurality of representation formats from the multilayer video bitstream. The image decoder 42 may determine, by using the obtained VPS NAL unit, the representation format that is commonly used to decode the plurality of pieces of layer encoded data.

The image decoder 42 obtains an index of a representation format with respect to the at least one layer, based on whether or not the at least one layer is changed. In more detail, the image decoder 42 may obtain, from the multilayer video bitstream, a Sequence Parameter Set Network Abstraction Layer (SPS NAL) unit including an index indicating one of the determined representation formats with respect to a plurality of layers, the determined representation formats including the representation format with respect to the at least one layer. Here, a Sequence Parameter Set (SPS) includes information of a parameter to be applied to multilayer image sequences.

The image decoder 42 may change the representation format with respect to the at least one layer by using the obtained index, and may decode an image including the at least one layer, based on the changed representation format.

The image decoder 42 obtains a flag indicating whether or not the index of the representation format with respect to the at least one layer is used, based on whether or not the representation format for the at least one layer is changed.

The image decoder 42 may obtain, based on the obtained flag, the index indicating one of the determined representation formats with respect to the plurality of layers, the determined representation formats including the representation format with respect to the at least one layer.

When the image decoder 42 does not change the representation format with respect to the at least one layer, based on the obtained multilayer video bitstream, the image decoder 42 may decode the image including the at least one layer, based on a representation format determined with respect to the at least one layer.

Figure 2D:
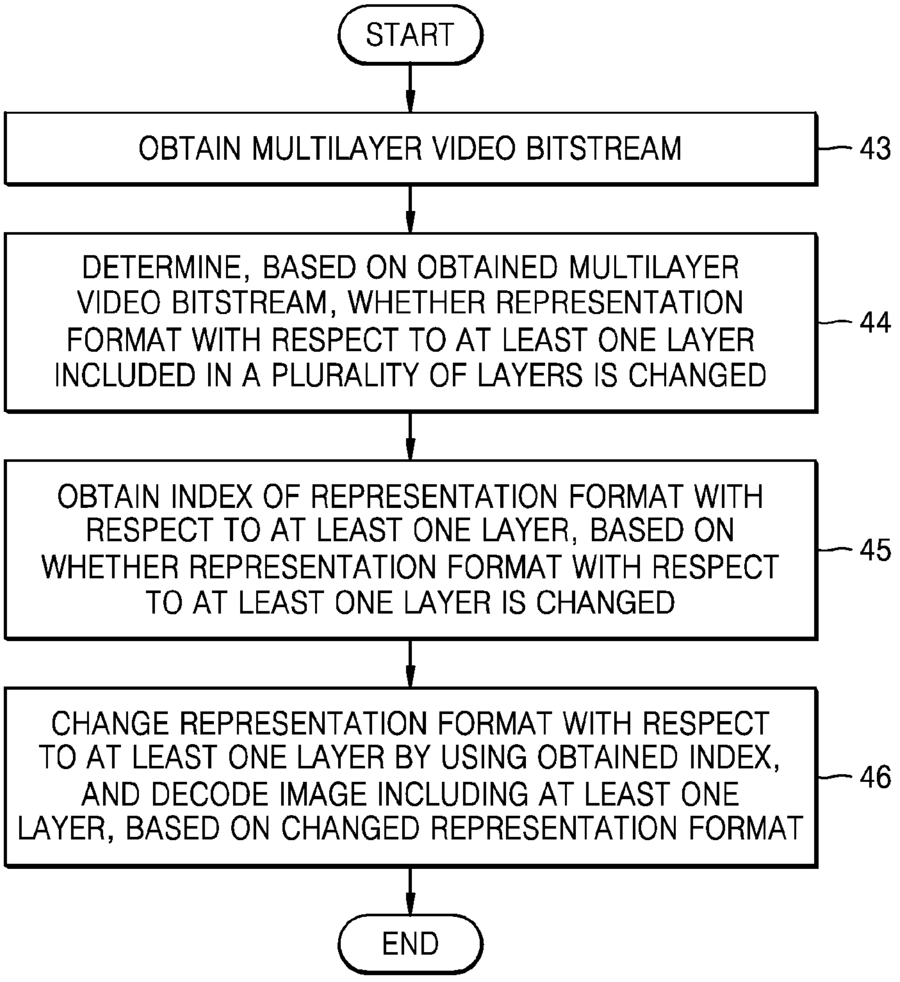
FIG. 2D is a flowchart illustrating a multilayer video decoding method, according to another embodiment of the present invention.

FIG. 2D is a flowchart illustrating a multilayer video decoding method, according to another embodiment of the present invention.

In operation 43, the multilayer video decoding apparatus 40 obtains a multilayer video bitstream.

In operation 44, the multilayer video decoding apparatus 40 determines, based on the obtained multilayer video bitstream, whether a representation format with respect to at least one layer included in a plurality of layers is changed.

In operation 45, the multilayer video decoding apparatus 40 obtains an index of a representation format with respect to the at least one layer, based on whether or not the representation format with respect to the at least one layer is changed. The multilayer video decoding apparatus 40 may obtain a flag indicating whether or not the index of the representation format with respect to the at least one layer is used, based on the determination with respect to whether or not the representation format for the at least one layer is changed. The multilayer video decoding apparatus 40 may obtain, based on the obtained flag, the index indicating one of the determined representation formats with respect to the plurality of layers, the determined representation formats including the representation format with respect to the at least one layer.

In operation 46, the multilayer video decoding apparatus 40 may change the representation format with respect to the at least one layer by using the obtained index, and may decode an image including the at least one layer, based on the changed representation format.

When the multilayer video decoding apparatus 40 does not change the representation format with respect to the at least one layer, based on the obtained multilayer video bitstream, the multilayer video decoding apparatus 40 may decode the image including the at least one layer, based on the representation format determined with respect to the at least one layer.

Figure 3:
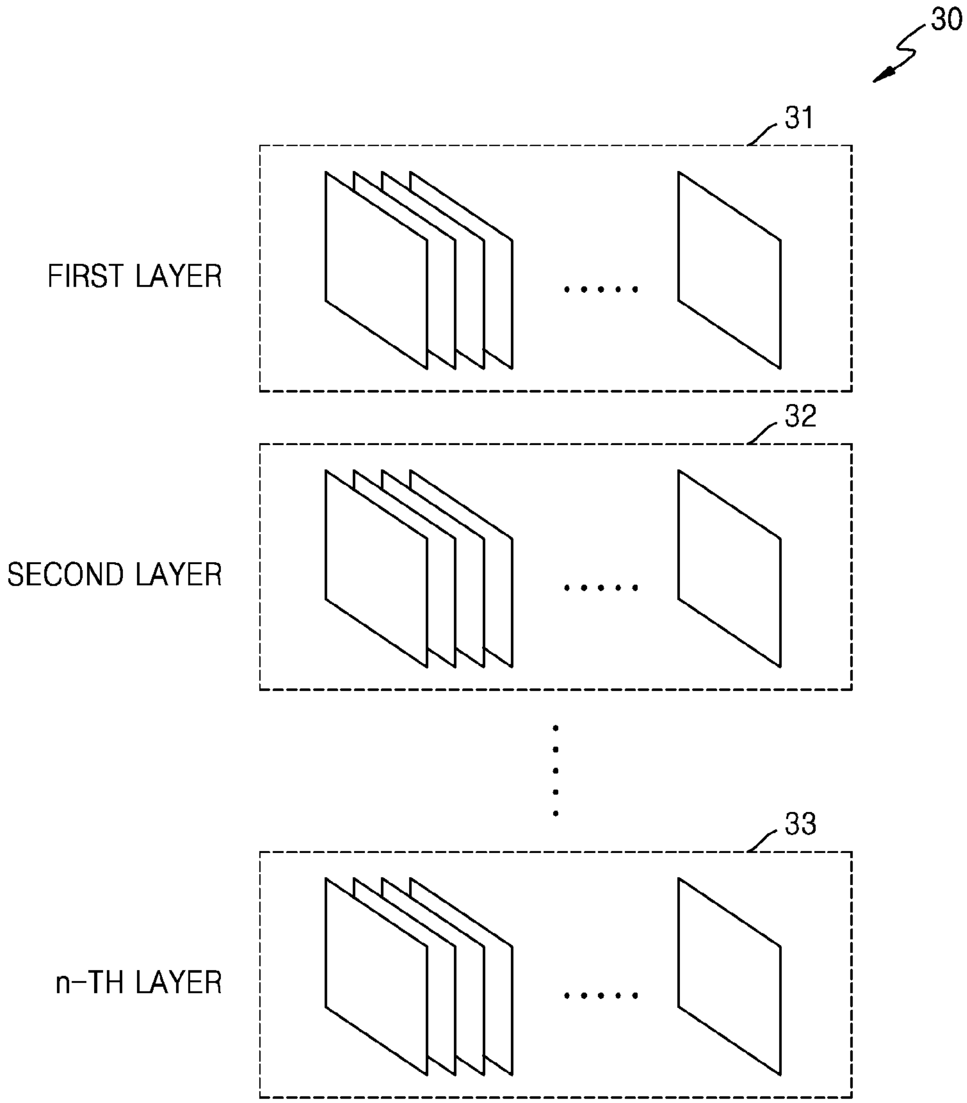
FIG. 3 illustrates a multilayer video, according to an embodiment of the present invention.

FIG. 3 illustrates a multilayer video, according to an embodiment of the present invention.

In order to provide an optimal service in various network environments and various terminals, the multilayer video encoding apparatus 10 may output a scalable bitstream by encoding multilayer image sequences having various spatial resolutions, various qualities, various frame-rates, and different views. That is, the multilayer video encoding apparatus 10 may generate a video bitstream by encoding an input image according to various scalability types and may output the video bitstream. Scalability includes temporal scalability, spatial scalability, quality scalability, multiview scalability, and combinations thereof. The scalabilities may be classified according to types. Also, the scalabilities may be identified as dimension identifiers in the types.

For example, scalability has scalability types including temporal scalability, spatial scalability, quality scalability, multiview scalability, or the like. According to the types, the scalabilities may be identified as dimension identifiers. For example, when they have different scalabilities, they may have different dimension identifiers. For example, when a scalability type corresponds to high-dimensional scalability, a higher scalability dimension may be assigned thereto.

When a bitstream is dividable into valid substreams, the bitstream is scalable. A spatially scalable bitstream includes substreams having various resolutions. In order to distinguish between different scalabilities in a same scalability type, a scalability dimension is used. The scalability dimension may be referred to as a scalability dimension identifier.

For example, the spatially-scalable bitstream may be divided into substreams having different resolutions such as a quarter video graphics array (QVGA), a video graphics array (VGA), a wide video graphics array (WVGA), or the like. For example, layers respectively having different resolutions may be distinguished therebetween by using dimension identifiers. For example, a QVGA substream may have 0 as a value of a spatial scalability dimension identifier, a VGA substream may have 1 as a value of the spatial scalability dimension identifier, and a WVGA substream may have 2 as a value of the spatial scalability dimension identifier.

A temporally-scalable bitstream includes substreams having various frame-rates. For example, the temporally-scalable bitstream may be divided into substreams that respectively have a frame-rate of 7.5 Hz, a frame-rate of 15 Hz, a frame-rate of 30 Hz, and a frame-rate of 60 Hz. A quality-scalable bitstream may be divided into substreams having different qualities according to a Coarse-Grained Scalability (CGS) scheme, a Medium-Grained Scalability (MGS) scheme, and a Fine-Grained Scalability (FGS) scheme. The temporally-scalable bitstream may also be divided into different dimensions according to different frame-rates, and the quality-scalable bitstream may also be divided into different dimensions according to the different schemes.

A multiview scalable bitstream includes substreams having different views in one bitstream. For example, a bitstream of a stereoscopic video includes a left-view image and a right-view image. Also, a scalable bitstream may include substreams with respect to encoded data of a multiview image and a depth map. View-scalability may be divided into different dimensions according to views.

Different scalable extension types may be combined with each other. That is, a scalable video bitstream may include substreams obtained by encoding image sequences of multiple layers including images where one or more of temporal, spatial, quality, and multiview scalabilities are different therebetween.

FIG. 3 illustrates image sequences 31, 32, and 33 having different scalability extension types. The image sequence 31 corresponds to a first layer, the image sequence 32 corresponds to a second layer, and the image sequence 33 corresponds to an n-th layer (where n denotes an integer). The image sequences 31, 32, and 33 may be different from each other in at least one of a resolution, a quality, and a view. Also, an image sequence of one layer among the image sequence 31 of the first layer, the image sequence 32 of the second layer, and the image sequence 33 of the n-th layer may be an image sequence of a base layer, and image sequences of the other layers may be image sequences of enhancement layers.

For example, the image sequence 31 of the first layer may be images at a first view, the image sequence 32 of the second layer may be images at a second view, and the image sequence 33 of the n-th layer may be images at an n-th view. As another example, the image sequence 31 of the first layer may be left-view images of a base layer, the image sequence 32 of the second layer may be right-view images of the base layer, and the image sequence 33 of the n-th layer may be right-view images of an enhancement layer. The image sequences 31, 32, and 33 having different scalability extension types are not limited thereto, and the image sequences 31, 32, and 33 may be image sequences having image attributes that are different from each other.

Figure 4:
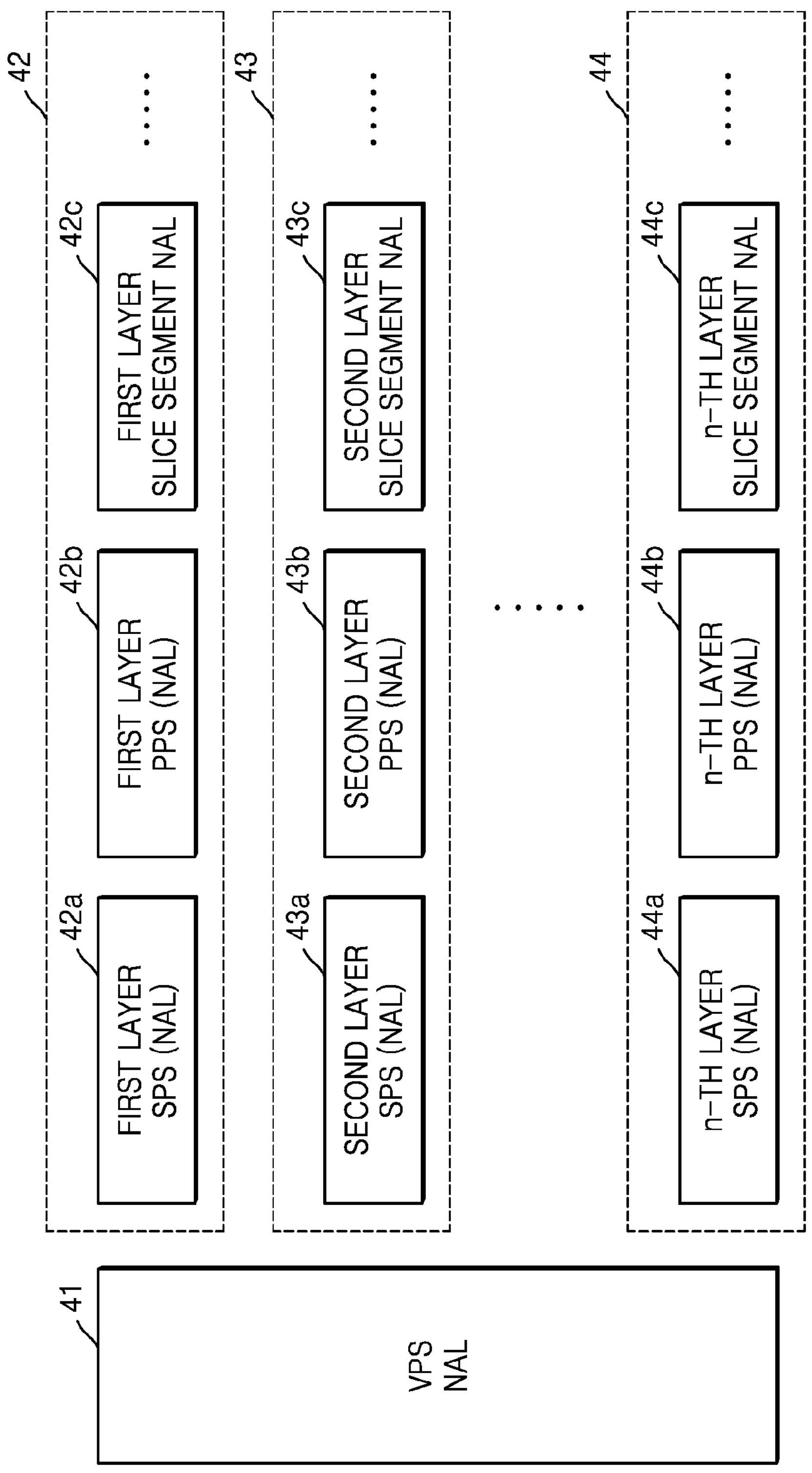
FIG. 4 illustrates Network Abstraction Layer (NAL) units including encoded data of a multilayer video, according to an embodiment of the present invention.

FIG. 4 illustrates NAL units including encoded data of a multilayer video, according to an embodiment of the present invention.

As described above, the bitstream generator 12 outputs the NAL units including encoded multilayer video data and auxiliary information.

A Video Parameter Set (VPS) includes information to be applied to multilayer image sequences 42, 43, and 44 included in the multilayer video. A NAL unit including information about the VPS is referred to as a VPS NAL unit 41.

The VPS NAL unit 41 includes a common syntax element shared by the multilayer image sequences 42, 43, and 44, information about an operation point to prevent transmission of unnecessary information, required information about an operation point which is required in a session negotiation step such as a profile or a level, or the like. In particular, the VPS NAL unit 41 according to an embodiment includes scalability information related to a scalability identifier to implement scalability in the multilayer video. The scalability information is information for determining scalability to be applied to the multilayer image sequences 42, 43, and 44 included in the multilayer video.

The scalability information includes a type of the scalability to be applied to the multilayer image sequences 42,

43, and 44 included in the multilayer video, and a dimension of the scalability. The scalability information in encoding and decoding methods according to a first embodiment of the present invention may be directly obtained from a value of a layer identifier included in an NAL unit header. Layer identifiers may be identifiers for identifying a plurality of layers included in the VPS. The VPS may signal the layer identifiers for the layers via VPS extension. The layer identifier for each layer of the VPS may be signaled in a manner that the layer identifier is included in the VPS NAL unit. For example, a layer identifier of NAL units included in a particular layer of the VPS may be included in the VPS NAL unit. For example, a layer identifier of a NAL unit included in the VPS may be signaled due to VPS extension. Therefore, the encoding and decoding methods according to an embodiment of the present invention may obtain scalability information about a layer of NAL units included in a corresponding VPS, by using a layer identifier of the NAL units.

FIG. 5A illustrates VPS extension syntax, according to an embodiment of the present invention.

Referring to a syntax part 510 according to the embodiment of the present invention in FIG. 5A, the multilayer video decoding apparatus 20 obtains a syntax element default_all_ilp_enable_flag from a bitstream. Here, the syntax element default_all_ilp_enable_flag indicates a flag specifying if a layer with a layer ID value (nuh_layer_id) equal to iNuhLId is inter-layer sample predicted and inter-layer motion predicted by using all direct dependent layers of the layer with the layer ID value (nuh_layer_id) equal to iNuhLId.

A direct dependent layer means a layer that is directly referred to by a specific layer. For example, in a case where a layer whose layer ID value is 2 refers to a layer whose layer ID value is 1, and the layer whose layer ID value is 1 refers to a layer whose layer ID value is 0, a dependent layer of the layer whose layer ID value is 2 may include a direct dependent layer (the layer whose layer ID value is 1). The dependent layer of the layer whose layer ID value is 2 may include a layer (the layer whose layer ID value is 0 which is referred to by the layer whose layer ID value is 1 which is a direct dependent layer) that is indirectly referred to.

For example, when the syntax element default_all_ilp_enable_flag is 1, it may mean that the layer with the layer ID value (nuh_layer_id) equal to iNuhLId is inter-layer sample predicted and inter-layer motion predicted by using all direct dependent layers of the layer with the layer ID value (nuh_layer_id) equal to iNuhLId.

On the other hand, when the syntax element default_all_ilp_enable_flag is 0, it may mean that the layer with the layer ID value (nuh_layer_id) equal to iNuhLId is not inter-layer sample predicted nor inter-layer motion predicted by using all direct dependent layers of the layer with the layer ID value (nuh_layer_id) equal to iNuhLId.

Referring to a syntax part 520 according to the embodiment of the present invention, if it is determined (if(!default_all_ilp_enable_flag)) that all direct dependent layers of the layer with the layer ID value (nuh_layer_id) equal to iNuhLId are not used for inter-layer sample prediction and inter-layer motion prediction with respect to the layer with the layer ID value (nuh_layer_id) equal to iNuhLId, the multilayer video decoding apparatus 20 obtains, from the bitstream, an index (direct_dependency_type[i][j]) indicating a type where, if a layer whose index is i is directly dependent on a layer whose index is j (if(direct_dependency_flag[i][j]), the layer whose index is i is inter-layer predicted by using the layer whose index is j by repeating a syntax structure until a value of i becomes from 1 to the maximum number of layers minus 1 (for(i=1; i<=vps_max_layers_minus1;i++)), and until a value of j becomes from 0 to i−1 at each i.

If it is determined that all direct dependent layers of the layer with the layer ID value (nuh_layer_id) equal to iNuhLId are used for inter-layer sample prediction and inter-layer motion prediction with respect to the layer with the layer ID value (nuh_layer_id) equal to iNuhLId, the multilayer video decoding apparatus 20 may determine that all direct dependent layers of the layer with the layer ID value (nuh_layer_id) equal to iNuhLId are used for inter-layer sample prediction and inter-layer motion prediction with respect to the layer with the layer ID value (nuh_layer_id) equal to iNuhLId, and may inter-layer sample predict and motion predict the layer with the layer ID value (nuh_layer_id) equal to iNuhLId by using all direct dependent layers.

Table 1 corresponds to pseudo codes by which the multilayer video decoding apparatus 20 determines whether inter-layer sample prediction or inter-layer motion prediction with respect to the layer with the layer ID value (nuh_layer_id) equal to iNuhLId is available.

TABLE 1

```
The variables NumDirectRefLayers[ i ], RefLayerId[ i ][ j ] SamplePredEnabledFlag[ i ][ j ],
MotionPredEnabledFlag[ i ][ j ] and DirectRefLayerIdx[ i ][ j ] are derived as follows:
  for( i = 0; i    <=    vps_max_layers_minus1; i++ ) {
    iNuhLId = layer_id_in_nuh[ i ]
    NumDirectRefLayers[ iNuhLId ] = 0
    for( j = 0; j < i; j++ )
      if( direct_dependency_flag[ i ][ j ] ) {
        RefLayerId[ iNuhLId ][ NumDirectRefLayers[ iNuhLId ]++ ] = layer_id_in_nuh[ j ]
        SamplePredEnableFlag[ iNuhLid ][ j ] = (default_all_ilp_enable_flag) ? 1 :
   ( ( direct_dependency_type[ i ][ j ] + 1 ) & 1 )
        MotionPredEnableFlag[ iNuhLid ][ j ] = (default_all_ilp_enable_flag) ? 1 :
  ( ( ( direct_dependency_type[ i ][ j ] + 1 ) & 2 ) >> 1 )
        DirectRefLayerIdx[ iNuhLid ][ layer_id_in_nuh[ j ] ] =
  NumDirectRefLayers[ iNuhLId ] −1            }
  }
```

Referring to Table 1, the multilayer video decoding apparatus 20 may determine an $i_{th}$ layer ID value (layer_id_in_nuh[i]) as iNuhLId by repeating a syntax structure (for (i=1; i<=vps_max_layers_minus1;i++)) until a value of i becomes from 0 to the maximum number of layers minus 1 (vps_max_layers_minus1), may initialize (NumDirectRefLayers[iNuhId]=0) the number of direct reference layers referred to by the layer with the layer ID value (nuh_layer_id) equal to iNuhLId, may repeat a syntax structure (for(j=0;j<i;j++)) until a value of j becomes 0 to i−1 at each i, and if a layer whose index is i is directly dependent on a layer whose index is j (if(direct_dependency_flag[i][j]), may determine an ID value of the layer whose index is j as a layer ID value to be referred to by the layer with the layer ID value (nuh_layer_id) equal to iNuhLId (RefLayerId[iNuhLId][NumDirectRefLayers[iNuhLId]++]=layer_id_innuh[j]).

When the multilayer video decoding apparatus 20 inter-layer predicts the layer with the layer ID value (nuh_layer_id) equal to iNuhLId by using the layer whose index is j, the multilayer video decoding apparatus 20 may determine a flag (SamplePredEnableFlag[iNuhId][j]) specifying whether inter-layer sample prediction is available. If a syntax element default_all_ilp_enable_flag is 1, the multilayer video decoding apparatus 20 may determine a value of the flag as 1, the flag specifying that inter-layer sample prediction is available. If the syntax element default_all_ilp_enable_flag is 0, the value of the flag specifying that inter-layer sample prediction is available may be determined by using obtained direct_dependency_type[i][j] (SamplePredEnabledFlag[iNuhLiId] [j](default_all_ilp_enable_flag)? 1: ((direct_dependency_type[i][j]+1)&1).

When the multilayer video decoding apparatus 20 inter-layer predicts the layer with the layer ID value equal to iNuhLId by using a $j_{th}$ layer, the multilayer video decoding apparatus 20 may determine a flag (MotionPredEnableFlag [iNuhId][j]) specifying whether inter-layer motion prediction is available.

If a syntax element default_all_ilp_enable_flag is 1, the multilayer video decoding apparatus 20 may determine a value of the flag as 1, the flag specifying that inter-layer motion prediction is available. If default_all_ilp_enable_flag is 0, the value of the flag specifying that inter-layer motion prediction is available may be determined by using obtained direct_dependency_type[i][j] (MotionPredEnabledFlag[iNuhLiId][j]=(default_all_ilp_enable_flag)? 1: ((direct_dependency_type[i][j]+1)&2)>>1).

An index (DirectRefLayerIdx[iNuhLId][layer_id_in_nuh [j]]) of a direct reference layer whose layer ID value is layer_id_nuh[j] to be referred to by the layer with the layer ID value equal to iNuhLId may be determined as the number of direct reference layers of the layer with the layer ID value equal to iNuhLId minus−1 (DirectRefLayerIdx[iNuhLId] [layer_id_in_nuh[j]]=NumDirectRefLayers[iNuhLId]-1)).

While it is described that the multilayer video decoding apparatus 20 according to the embodiment of the present invention may perform, when the syntax element default_all_ilp_enable_flag is 1, inter-layer motion prediction and inter-layer sample prediction on the layer with the layer ID value (nuh_layer_id) equal to iNuhLId by using all dependent layers, it is not limited thereto, and it is possible to set by default which inter-layer prediction from among inter-layer motion prediction and inter-layer sample prediction can be performed by using a dependent layer, and whether inter-layer motion prediction or inter-layer sample prediction is available may be determined according to the setting. While it is described that the multilayer video decoding apparatus 20 according to the embodiment of the present invention performs inter-layer sample prediction and inter-layer motion prediction as inter-layer prediction types, it is not limited thereto, and when inter-layer prediction is performed, a prediction target (a sample, a motion, and the like) may vary.

FIG. 5B illustrates VPS extension syntax, according to an embodiment of the present invention.

Referring to a syntax part 530 according to the embodiment of the present invention in FIG. 5B, the multilayer video decoding apparatus 20 obtains syntax elements default_direct_dependency_type and direct_dep_type_len_minus2 indicating the number of bits of direct_dependency_type[i][j] minus 2.

The multilayer video decoding apparatus 20 obtains the syntax element default_direct_dependency_type from a bitstream. Here, the syntax element default_direct_dependency_type indicates whether a syntax element direct_dependency_type[i][j] that is present in a VPS extension syntax structure vps_extension( ) is present and if a dependency type of a layer whose layer ID value is layer_id_in_nuh[i] is specified by direct_dependency_type[i][j], the dependency type being with respect to the layer whose layer ID value is layer_id_in_nuh[i].

If it is determined that the syntax element direct_dependency_type[i][j] that is present in the VPS extension syntax is not present or if it is determined that the dependency type of the layer whose layer ID value is layer_id_in_nuh[i] is not specified by direct_dependency_type[i][j] (if(default_direct_dependency_flag)), the dependency type being with respect to the layer whose layer ID value is layer_id_in_nuh [i], the multilayer video decoding apparatus 20 obtains the syntax element default_direct_dependency_type from the bitstream.

Here, the syntax element default_direct_dependency_type means an index indicating an inter-layer prediction type where the layer with the layer ID value equal to iNuhLId is inter-layer predicted by using all direct dependent layers.

For example, if the syntax element default_direct_dependency_type according to the embodiment of the present invention is 0, a default dependency type may indicate inter-layer sample prediction and may not indicate inter-layer motion prediction, if the syntax element default_direct_dependency_type is 1, the default dependency type may indicate inter-layer motion prediction and may not indicate inter-layer sample prediction, and if the syntax element default_direct_dependency_type is 2, the default dependency type may indicate both inter-layer motion prediction and inter-layer sample prediction. In addition, the syntax element default_direct_dependency_type may have a value in the range of 0 to 2, but it is not limited thereto, the multilayer video decoding apparatus 20 may allow the value of default_direct_dependency_type to be a value in the range of 3 to 2^32-2.

If it is determined that the syntax element direct_dependency_type[i][j] that is present in the VPS extension syntax is present, and the dependency type of the layer whose layer ID value is layer_id_in_nuh[i] is specified by direct_dependency_type[i][j], the dependency type being with respect to the layer whose layer ID value is layer_id_in_nuh[i], the multilayer video decoding apparatus 20 obtains, from the bitstream, an index (direct_dependency_type[i][j]) indicating a type where, if a layer whose index is i is directly dependent on a layer whose index is j (if(direct_dependency_flag[i][j]), the layer whose index is i is inter-layer predicted by using the layer whose index is j by repeating a syntax structure until a value of i becomes from 0 to the maximum number of layers minus 1, and until a value of j becomes from 0 to i−1 at each i. For example, if a value of direct_dependency_type[i][j] is 0, a dependency type may indicate inter-layer sample prediction and may not indicate inter-layer motion prediction, if the value is 1, the dependency type may indicate inter-layer motion prediction and may not indicate inter-layer sample prediction, and if the value is 2, the dependency type may indicate both inter-layer motion prediction and inter-layer sample prediction.

In addition, the syntax element direct_dependency_type [i][j] may have a value in the range of 0 to 2, but it is not limited thereto, the multilayer video decoding apparatus 20 may allow the value of direct_dependency_type[i][j] to be a value in the range of 3 to 2^32-2.

Table 2 corresponds to pseudo codes by which the multilayer video decoding apparatus 20 determines whether inter-layer sample prediction or inter-layer motion prediction with respect to the layer with the layer ID value equal to iNuhLId is available.

TABLE 2

The variables NumDirectRefLayers[ i ], RefLayerId[ i ][ j ], SamplePredEnabledFlag[ i ][ j ], MotionPredEnabledFlag[ i ][ j ] and DirectRefLayerIdx[ i ][ j ] are derived as follows:
```
    for( i = 0; i   <=   vps_max_layers_minus1; i++ ) {
        iNuhLId = layer_id_in_nuh[ i ]
        NumDirectRefLayers[ iNuhLId ] = 0
        for( j = 0; j < i; j++ )
            if( direct_dependency_flag[ i ][ j ] ) {
                RefLayerId[ iNuhLId ][ NumDirectRefLayers[ iNuhLId ]++ ] = layer_id_in_nuh[ j ]
                SamplePredEnableFlag[ iNuhId ][ j ] = (default_direct_dependency_flag) ?
    ( ( default_direct_dependency_type + 1 ) & 1) ( ( direct_dependency_type[ i ][ j ] + 1 ) &
1 )
                MotionPredEnableFlag[ iNuhLId ][ j ] = (defalut_direct_dependency_flag) ?
    ( ( ( default_direct_dependency_type + 1 ) & 2) >> 1) ( ( ( direct_dependency_type[ i ][ j ]
+ -
    1 ) & 2 ) >> 1 )
                DirectRefLayerIdx[ iNuhLId ][ layer_id_in_nuh[ j ] ] =
        NumDirectRefLayers[ iNuhLId ] -1            }
    }
```

Referring to Table 2, the multilayer video decoding apparatus 20 may determine a layer whose layer ID value is i (layer_id_in_nuh[i]) as iNuhLId by repeating a syntax structure (for(i=1; i<=vps_max_layers_minus1;i++)) until a value of i becomes from 0 to the maximum number of layers minus 1 (vps_max_layers_minus1), may initialize (NumDirectRefLayers[iNuhId]=0) the number of direct reference layers referred to by the layer with the layer ID value equal to iNuhLId, may repeat a syntax structure (for(j=0;j<i;j++)) until a value of j becomes 0 to i−1 at each i, and if an $i_{th}$ layer is directly dependent on a $j_{th}$ layer, may determine an ID value of the layer whose index is j as a layer ID value to be referred to by the layer with the layer ID value equal to iNuhLId (RefLayerId[iNuhLId][NumDirectRefLayers[iNuhLId]]++]=layer_id_in_nuh[j]).

When the multilayer video decoding apparatus 20 inter-layer predicts the layer with the layer ID value (nuh_layer_id) equal to iNuhLId by using the layer whose index is j, the multilayer video decoding apparatus 20 may determine a flag (SamplePredEnableFlag[iNuhId][j]) specifying whether inter-layer sample prediction is available.

If default_direct_dependency_flag is 1, the multilayer video decoding apparatus 20 may determine a value of the flag specifying that inter-layer sample prediction is available, by using the obtained default_direct_dependency_flag. If the default_direct_dependency_flag is 0, the value of the flag specifying that inter-layer sample prediction is available may be determined by using obtained direct_dependency_type[i][j] (SamplePredEnabledFlag[iNuhLiId][j]=(default_direct_dependency_flag)? (default_direct_dependency_type+1)&1:((direct_dependency_type[i][j]+1)&1).

When the multilayer video decoding apparatus 20 inter-layer predicts the layer with the layer ID value equal to iNuhLId by using the layer whose index is j, the multilayer video decoding apparatus 20 may determine a flag (MotionPredEnableFlag[iNuhId][j]) specifying whether inter-layer motion prediction is available.

If default_direct_dependency_flag is 1, the multilayer video decoding apparatus 20 may determine a value of a flag specifying that inter-layer motion prediction is available, by using the obtained default_direct_dependency_flag. If the default_direct_dependency_flag is 0, the multilayer video decoding apparatus 20 may determine the value of the flag specifying that inter-layer motion prediction is available, by using obtained direct_dependency_type[i][j] (MotionPredEnabledFlag[iNuhLiId][j]=(default_all_ilp_enable_flag)? ((default_direct_dependency_type+1)&2)>>1: ((direct_dependency_type[i][j]+1)&2)>>1).

An index (DirectRefLayerIdx[iNuhLId][layer_id_in_nuh[j]]) of a direct reference layer whose layer ID value is layer_id_nuh[j] to be referred to by the layer with the layer ID value equal to iNuhLId may be determined as the number of direct reference layers of the layer with the layer ID value equal to iNuhLId minus 1(DirectRefLayerIdx[iNuhLId][layer_id_in_nuh[j]]=NumDirectRefLayers[iNuhLId]−1).

FIGS. 6A and 6B illustrate VPS extension syntax, according to an embodiment of the present invention.

Referring to a syntax part 610 according to the embodiment of the present invention in FIG. 6A, the multilayer video decoding apparatus 40 obtains a syntax element rep_format_idx_present_flag.

Here, the syntax element rep_format_idx_present_flag is a flag specifying if an index indicating representation formats of layers is present.

If it is determined that the index indicating the representation formats of the layers is present (if(rep_format_idx_present_flag)), based on the obtained rep_format_idx_present_flag, the multilayer video decoding apparatus 40 obtains vps_num_rep_formats_minus1 indicating the number of the representation formats of the layers.

The multilayer video decoding apparatus 40 repeatedly performs a syntax structure rep_format( ) until a value of i becomes from 0 to vps_num_rep_formats_minus1.

Referring to FIG. 6B, the multilayer video decoding apparatus 40 obtains various syntax elements of the syntax structure rep_format( ). Referring to a syntax part 620, the multilayer video decoding apparatus 40 first obtains an index chroma_format_vps_idc specifying a chroma format.

If the index chroma_format_vps_idc specifying the chroma format specifies a 4:4:4 chroma format (if(chorma_format_vps_idc==3)), the multilayer video decoding apparatus 40 obtains a flag separate_colour_plane_vps_flag specifying if each of color components is separately encoded.

The multilayer video decoding apparatus 40 obtains pic_width_vps_in_luma_samples indicating a width of a picture including a luma sample, and obtains pic_height_vps_in_luma_samples indicating a height of the picture including the luma sample. The multilayer video decoding apparatus 40 obtains bit_depth_vps_luma_minus8 indicating a bit depth of luma, and obtains bit_depth_chroma_minus8 indicating a bit depth of chroma.

Referring back to the syntax part 610 of FIG. 6A, if it is determined that the index indicating the representation formats of the layers is present (if(rep_format_idx_present_flag)), based on the obtained rep_format_idx_present_flag, the multilayer video decoding apparatus 40 repeats the syntax structure rep_format( ) until the value of i becomes from 0 to vps_num_rep_formats_minus1 (for (i=1;i<=vps_max_layers_minus1;i++)), and if it is determined that vps_num_formats_minus1 is greater than 0 (if (vps_num_rep_formats_minus1>0)), the multilayer video decoding apparatus 40 obtains an index vps_rep_format_idx [i] specifying a representation format of a layer whose index is i.

If a syntax structure rep_format( ) of a specific layer does not match with an initial syntax structure rep_format( ) specified by VPS extension syntax, update_rep_format_flag that is an update flag set in a SPS is obtained, and all parameters of the syntax structure rep_format( ) are signaled in the SPS, based on the obtained update_rep_format_flag.

Even if an initial representation format assigned to a layer in a VPS is different from an updated representation format, the multilayer video decoding apparatus 40 according to the embodiment of the present invention may determine the updated representation format from a list including various representation formats obtained from the VPS extension syntax. Therefore, the multilayer video decoding apparatus 40 according to the embodiment of the present invention may determine a representation format, which is updated with respect to the specific layer, from the list of the syntax structure rep_format( ) obtained from the VPS extension syntax.

In more detail, the multilayer video decoding apparatus 40 does not obtain all syntax elements of the syntax structure rep_format( ) from the SPS but obtains an index indicating one representation format from the list of the representation formats obtained from the VPS extension syntax.

Therefore, compared to a case where all syntax elements are obtained from the SPS, the multi layer video decoding apparatus 40 may not waste an overhead bit of about 50 bits.

In addition, the number of syntax structure rep_format( ) which is determined by vps_num_rep_formats_minus1 may be greater than vps_num_max_layers_minus1 (i.e., the number of the layers). Thus, when the multilayer video encoding apparatus 10 encodes a multilayer video, the multilayer video encoding apparatus 10 may generate a bitstream in which all available syntax structures rep_format( ) in the VPS extension syntax are included in a representation format list.

FIG. 6C illustrates SPS syntax, according to an embodiment of the present invention.

According to a syntax part 630 of FIG. 6C, if a layer ID value is greater than 0 (if(nuh_layer_id>0)), the multilayer video decoding apparatus 40 obtains a flag (update_rep_format_flag) specifying whether or not to update a representation format of a specific layer.

If the multilayer video decoding apparatus 40 determines to update the representation format of the specific layer (if(update_rep_format_flag)), the multilayer video decoding apparatus 40 obtains a flag update_rep_format_idx_present_flag. Here, the flag update_rep_format_idx_present_flag indicates a flag specifying if an index ((update_rep_format_idx)) indicating one representation format is present, wherein the one representation format is from a list of representation formats obtained by VPS extension syntax so as to update the representation format.

If it is determined (if(update_rep_format_idx_present_flag)), based on a flag update_rep_format_idx_present_flag, that the index ((update_rep_format_idx)) indicating one representation format is present, wherein the one representation format is from the list of representation formats obtained by the VPS extension syntax so as to update the representation format, the multilayer video decoding apparatus 40 obtains an index update_rep_format_idx. Here, the index update_rep_format_idx means an index specifying one rep_format( ) from the list of syntax structures rep_format( ) in the VPS.

When if the index update_rep_format_idx is not present, the multilayer video decoding apparatus 20 may determine its value as 0, and the index update_rep_format_idx may have a value in the range of 0 to vps_num_rep_formats_minus1 indicating the number of representation formats minus 1.

Therefore, the multilayer video decoding apparatus 40 may determine, based on the obtained index update_rep_format_idx, one of the syntax structures rep_format( ) with respect to the representation formats, which are obtained from the VPS, may update a representation format with respect to a specific layer, according to the determined rep_format( ) and may decode the specific layer, based on the updated representation format.

If the index update_rep_format_idx is not present, an index chroma_format_idc specifying a chroma format is obtained. If the chroma format is a 4:4:4 chroma format (if(chormaformat_idc==3)), the multilayer video decoding apparatus 40 obtains a syntax element pic_width_in_luma_samples indicating a width of a picture including a luma sample. The multilayer video decoding apparatus 40 obtains a syntax element pic_height_in_chroma_samples indicating a height of the picture including the luma sample.

FIGS. 6D through 6F illustrate SPS syntax, according to another embodiment of the present invention.

Referring to a syntax part 640 of FIG. 6D, the multilayer video decoding apparatus 40 obtains sps_video_parameter_set_id indicating an ID value of a VPS referred to by a current SPS.

If a layer ID value indicated by the SPS is 0 (if(nuh_layer_id==0)), the multi layer video decoding apparatus 40 obtains sps_max_sub_layers_minus1 that is a syntax element indicating the maximum number of temporal sublayers existing in each of coded video sequences (CVSs) that refer to the current SPS. Also, the multilayer video decoding apparatus 40 obtains a syntax element sps_temporal_id_nesting_flag.

Here, the syntax element sps_temporal_id_nesting_flag means a flag specifying if inter prediction with respect to the CVSs that refer to the current SPS is additionally constrained. The multilayer video decoding apparatus 40 may perform a syntax structure profile_tier_level( ) including syntax elements with respect to a profile, a tier, and a level. As described above, the multilayer video decoding apparatus 40 according to the embodiment of the present invention obtains the syntax elements sps_max_sub_layers_minus1 and sps_temporall_id_nesting_flag only when the layer ID value indicated by the SPS is 0, and performs profile_tier_level( ) so that an unnecessary obtaining operation and an unnecessary waste of bits may be prevented.

Referring to a syntax part 650 of FIG. 6D, the multilayer video decoding apparatus 40 obtains a syntax element sps_seq_parameter_set_id. Here, the syntax element sps_seq_parameter_set_id means an ID value of an SPS that is currently decoded. If a layer ID value of a layer that refers to the current SPS is greater than 0 (if(nuh_layer_id>0)), the multilayer video decoding apparatus 40 obtains a flag update_rep_format_flag specifying whether or not to update a representation format determined in the VPS. In more detail, if a value of the flag update_rep_format_flag is equal to 1, it means that a syntax element update_rep_format_idx is present in the current SPS, and if the value is equal to 0, it means that the syntax element update_rep_format_idx is not present in the current SPS and a value signaled in the VPS is used in all layers that refer to the SPS.

When a current picture having a layer with a layer ID value layerIdCurr greater than 0 refers to the SPS, the multilayer video decoding apparatus 40 may determine syntax elements such as chroma_format_idc, separate_colour_plane_flag, pic_width_in_luma_samples, pic_height_in_luma_samples, bit_depth_luma_minus8, bit_depth_chroma_minus8, etc. by referring to pseudo codes of Table 3 below.

TABLE 3

When a current picture with nuh_layer_id layerIdCurr greater than 0 refers to an SPS, the values of chroma_format_idc, separate_ colour_ plane_flag, pic_width_in_luma_samples, pic_height_in_luma_samples, bit_depth_luma_minusB, and bit_depth_chroma_minus8 are inferred or constrained as follows:

If the nuh_layer_id of the active layer SPS is equal to 0, the values of chroma_format_idc, separate_colour_plane_flag, pic_width_in_luma_samples, pic_height_in_luma_samples, bit_depth_luma_minus8, and bit_depth_chroma_minus8 are inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively of the vps_rep_format_idx[ j ]-th rep_format( ) syntax structure in the active VPS where j is equal to LayerIdxInVps[ layerIdCurr ] and the values of chroma_format_idc, separate_colour_plane_flag, pic_width_in_luma_samples, pic_height_in_luma_samples, bit_depth_luma_minus8, and bit_depth_chroma_minus8 of the active layer SPS are ignored.

NOTE 1-The values are inferred from the VPS when an active non-base layer references an SPS which is also used by the base layer, in which case the SPS has nuh_layer_id equal to 0. For an active base layer, the values in the active SPS apply.

Otherwise (the nuh_layer_id of the active layer SPS is greater than zero), the following applies:

If update_rep_format_flag is equal to 0, the values of chroma_format_idc, separate_colour_plane_flag, pic_width_in_luma_samples, pic_height_in_luma_samples, bit_depth_luma_minus8, and bit_depth_chroma_minus8 are inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, respectively, of the vps_rep_format_idx[ j ]-th rep_format( ) syntax structure in the active VPS, where j is equal to LayerIdxInVps[ layerIdCurr ].

Otherwise (update_rep_format_flag is equal to 1), the values of chroma_format_idc, separate_colour_plane_flag, pic_width_in_luma_samples, pic_height_in_luma_samples, bit_depth_luma_minus8, and bit_depth_chroma_minus8 are inferred to be equal to chroma_format_vps_idc, separate_colour_plane_vps_flag, pic_width_vps_in_luma_samples, pic_height_vps_in_luma_samples, bit_depth_vps_luma_minus8, and bit_depth_vps_chroma_minus8, repectively, of the vps_rep_format_idx[ update_rep_format_idx ]-th rep_format( ) syntax structure in the active VPS. it is a requirement of bitstream conformance that the value of chroma_format_idc, separate_colour_plane_flag, pic_width_in_luma_samples, pic_height_in_luma_samples, bit_depth_luma_minus8, or bit_depth_chroma_minus8 shall be less than or equal to chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8, respectively, of the vps_rep_format_idx[ j ]-th rep_format( ) syntax structure in the active VPS, where j is equal to LayerIdxInVps[ layerIdCurr ].

Referring to Table 3, if a layer ID value (nuh_layer_id) of an active layer SPS is equal to 0, the multilayer video decoding apparatus 40 may infer the syntax elements chroma_format_idc, separate_colour_plane_flag, pic_width_in_luma_samples, pic_height_in_luma_samples, bit_depth_vps_luma_minus8, and bit_depth_vps_chroma_minus8 from a vps_rep_format_idx[j]$_{th}$ rep_format( ) syntax structure including chroma_format_vps_idc, separate_colour_plane_vps_flag, pic_height_vps_in_luma_samples, pic_width_vps_in_luma_samples, bit_depth_vps_luma_minus8, and bit_depth_vps_chroma_minus8 in an active VPS. Here, j means LayerIdxInVps[layerIdCurr] indicating a layer index with respect to layerIdCurr in the VPS. In this case, each syntax element of the active layer SPS may be ignored.

If the layer ID value (nuh_layer_id) of the active layer SPS is greater than 0, and a syntax element update_rep_format_flag is equal to 0, chroma_format_idc, separate_colour_plane_flag, pic_width_in_luma_samples, pic_height_in_luma_samples, bit_depth_luma_minus8, and bit_depth_chroma_minus8 may be inferred from the vps_rep_format_idx[j]$_{th}$ rep_format( ) syntax structure including chroma_format_vps_idc, separate_colour_plane_vps_flag, pic_height_vps_in_luma_samples, pic_width_vps_in_luma_samples, bit_depth_vps_luma_minus8 and bit_depth_vps_chroma_minus8 in the active VPS. Here, j means LayerIdxInVps[layerIdCurr] indicating the layer index with respect to layerIdCurr in the VPS.

If the layer ID value (nuh_layer_id) of the active layer SPS is greater than 0, and the syntax element update_rep_format_flag is equal to 1, chroma_format_idc, separate_colour_palne_flag, pic_width_in_luma_samples, pic_height_in_luma_samples, bit_depth_luma_minus8, and bitdepth_chroma_minus8 may be inferred from a vps_rep_format_idx[update_rep_format_idx]$_{th}$ rep_format( ) syntax structure including chroma_format_vps_idc, separate_colour_plane_vps_flag, pic_height_vps_in_luma_samples, pic_width_vps_in_luma_samples, bit_depth_vps_luma_minus8, and bit_depth_vps_chroma_minus8 in an active VPS.

If it is determined the representation format determined in the VPS is updated (if(update_rep_format_flag)), the multilayer video decoding apparatus 40 obtains an index update_rep_format_index indicating one representation format in the list of the representation formats obtained from the VPS extension syntax.

If it is determined the representation format determined in the VPS is not updated, the multilayer video decoding apparatus 40 obtains an index chroma_format_idc specifying a chroma format of a layer that refers to the current SPS, and if it is determined that the chroma format is a 4:4:4 format (if(chorma_foramt_idc=3)), the multilayer video decoding apparatus 40 obtains separate_colour_plane_flag specifying if each of color components is included in another CVS.

The multilayer video decoding apparatus 40 obtains pic_width_in_luma_samples indicating a width of a picture including luma samples. Also, the multilayer video decoding apparatus 40 obtains pic_height_in_luma_samples indicating a height of the picture including the luma samples.

Referring to a syntax part 660 of FIG. 6D, if the layer ID value of the layer that is referred to by the SPS is equal to 0 (if(nuh_layer_id==0)), the syntax element bit_depth_iuma_minus8 indicating a bit depth of luma, and the syntax element indicating a bit depth of chroma are obtained. According to the above descriptions, when the multilayer video decoding apparatus 40 according to the embodiment of the present invention attempts to update the representation format obtained from the VPS, the multilayer video decoding apparatus 40 may not always signal a bit depth but may signal the bit depth only when the layer ID value of the layer referred to by the SPS is equal to 0, so that unnecessary signaling and a waste of bits may be prevented.

Referring to a syntax part 670 of FIG. 6E, the multilayer video decoding apparatus 40 obtains a syntax element scaling_list_enabled_flag specifying if a scaling process with respect to a transform coefficient is used. In particular, if it is determined that the scaling process with respect to the transform coefficient is used (if(scaling_list_enabled_flag)), the multilayer video decoding apparatus 40 may obtain a syntax element sps_scaling_list_flag. Here, the sps_scaling_list_flag indicates a syntax element specifying if a syntax element of a scaling list data syntax structure of an SPS is inferred from a syntax element of a scaling list data syntax structure of the SPS that is active with respect to a layer with a layer ID value (nuh_layer_id) corresponding to sps_scaling_list_ref_layer_id.

If it is determined (if(sps_infer_scaling_list_flag)) that the syntax element of the scaling list data syntax structure is inferred from the syntax element of the scaling list data syntax structure of the SPS that is active with respect to the layer with the layer ID value (nuh_layer_id) corresponding to sps_scaling_list_ref_layer_id, the multilayer video decoding apparatus 40 obtains a syntax element sps_scaling_list_ref_layer_id. Here, the syntax element sps_scaling_list_ref_layer_id means the active SPS is same as a layer ID value (nuh_layer_id) of a layer associated with scaling list data of a current SPS.

If it is determined that the syntax element of the scaling list data syntax structure is not inferred from the syntax element of the scaling list data syntax structure of the SPS that is active with respect to the layer with the layer ID value (nuh_layer_id) corresponding to sps_scaling_list_ref_layer_id, the multilayer video decoding apparatus 40 obtains a flag sps_scaling_list_data_present_flag specifying if the scaling list data is present.

If it is determined (if(sps_scaling_list_data_present_flag)) that the scaling list data is present, the multilayer video decoding apparatus 40 performs a syntax structure scaling_list_data( ). As described above, the multilayer video decoding apparatus 40 according to the embodiment of the present invention does not perform a scaling list data syntax structure scaling_list_data( ) but infers a syntax element of a scaling list data syntax structure of a current SPS from a syntax element of a scaling list data syntax structure determined in another SPS, so that unnecessary signaling and a waste of bits may be prevented.

Referring to a syntax part 680 of FIG. 6F, the multilayer video decoding apparatus 40 obtains sps_extension_flag specifying whether or not to perform a SPS extension syntax structure sps_extension( ). If it is determined (if(sps_extension_flag)) that the SPS extension syntax structure sps_extension( ) is performed, based on the obtained sps_extension_flag, the multilayer video decoding apparatus 40 performs the SPS extension syntax structure sps_extension( ). The multilayer video decoding apparatus 40 obtains a syntax element sps_extension2_flag specifying if sps_extension_flag is present. If it is determined (if(sps_extension_flag)) that a syntax element sps_extension_flag is present, the multilayer video decoding apparatus 40 obtains a syntax element sps_extension_data_flag by repeating until data is present in the current SPS (while(more_rbsp_data( ))).

FIG. 7A illustrates VPS extension syntax, according to an embodiment of the present invention.

Referring to a syntax part 710 according to the embodiment of the present invention in FIG. 7A, the multilayer video decoding apparatus 20 according to the embodiment of the present invention obtains a syntax element all_ref_layers_active_flag. Here, all_ref_layers_active_flag specifies that for each picture in a current enhancement layer, all reference pictures of all its direct dependent layers available in current access units are used for inter-layer prediction.

Referring to FIG. 7A, if it is determined (if(!all_ref_layers_active_flag)) that for each picture in the current enhancement layer, all reference pictures of all its direct dependent layers available in the current access units are not used for inter-layer prediction, the multilayer video decoding apparatus 20 obtains a syntax element max_one_active_ref_layer_flag. Here, max_one_active_ref_layer_flag corresponds to a flag specifying if only one picture may be used for inter-layer prediction with respect to each picture in a CVS.

The multilayer video decoding apparatus 20 may determine the maximum number of direct dependent layers MaxNumDirectDependentRefLayers of all enhancement layers, according to pseudo codes of Table 4.

TABLE 4

```
The derivation of maximum number of direct dependent layers of all
enhancement layers is specified below:
The variable MaxNumDirectDependentRefLayers is derived as follows:
MaxNumDirectDependentRefLayers = 0
for (i=1; i <= vps_max_layers_minus1; i++)
   MaxNumDirectDependentRefLayers =
      (MaxNumDirectDependentRefLayers <
NumDirectRefLayers[i]) ? NumDirectRefLayers[i] :
MaxNumDirectDependentRefLayers
```

The semantic of max_one_active_ref_layer_flag is modified as below:

The multilayer video decoding apparatus 20 initializes MaxNumDirectDependentRefLayers (MaxNumDirecDependentRefLayers=0), and repeats a syntax structure until a value of i becomes from 0 to the maximum number of layers minus 1(for(i=1, i<=vps_max_layers_minus1;i++)), then, if the number of direct dependent reference layers of an $i_{th}$ layer is greater than MaxNumDirectDependentRefLayers, the multilayer video decoding apparatus 20 determines MaxNumDirectDependentRefLayers as NumDirectRefLayers[i], and if the number of direct dependent reference layers of a layer whose layer ID value is i is equal to or less than MaxNumDirectDependentRefLayers, the multilayer video decoding apparatus 20 maintains a value of MaxNumDirectDependentRefLayers (MaxNumDirectDependentRefLayers=(MaxNumDirectDependentRefLayers<NumDirectRefLayers[i])?NumDirectRefLayers[i]: MaxNumDirectDependentRefLayers).

If it is determined that for each picture in the current enhancement layer, all reference pictures of all its direct dependent layers available in the current access units are used for inter-layer prediction, the multilayer video decoding apparatus 20 may not obtain max_one_active_ref_layer_flag, and in this case, if MaxNumDirectDependentRefLayers is greater than 0, max_one_active_ref_layers may be derived as 0, and if MaxNumDirectDependentRefLayers is equal to or less than 1, max_one_active_ref_layers may be derived as 1.

FIG. 7B illustrates slice segment header syntax, according to an embodiment of the present invention.

Referring to FIG. 7B, if the number of layer IDs is greater than 0, and cross_layer_irap_aligned_flag specifying if intra random access point (IRAP) pictures across layers are aligned is equal to 0, or if nal_unit_type indicating a NAL unit type is not IDR_W_RADL nor IDR_N_LP, slice_pic_order_cnt_lsb indicating a least significant bit (LSB) of a POC with respect to a current picture is obtained from a slice header not from an IDR slice. In particular, if a layer ID is greater than 0, the multilayer video decoding apparatus 20 according to another embodiment of the present invention obtained slice_pic_order_cnt_lsb indicating the LSB of the POC with respect to the current picture from the slice header not from the IDR slice, and if cross_layer_irap_aligned_flag is equal to 1, slice_pic_order_cnt_lsb with respect to an IRAP picture is redundant information, i.e., a POC value with respect to an IDR picture shall be 0, thus, if cross_layer_irap_aligned_flag is equal to 0 and the layer ID is greater than 0, the multilayer video decoding apparatus 20 according to the embodiment of the present invention obtains slice_pic_order_cnt_lsb and thus is not required to redundantly signal information, so that an unnecessary waste of bits may be prevented.

Hereinafter, with reference to FIG. 7C, an inter-layer prediction structure that may be performed in the image encoder 11 of the multilayer video encoding apparatus 10 according to various embodiments, is described in detail.

Figure 7C:
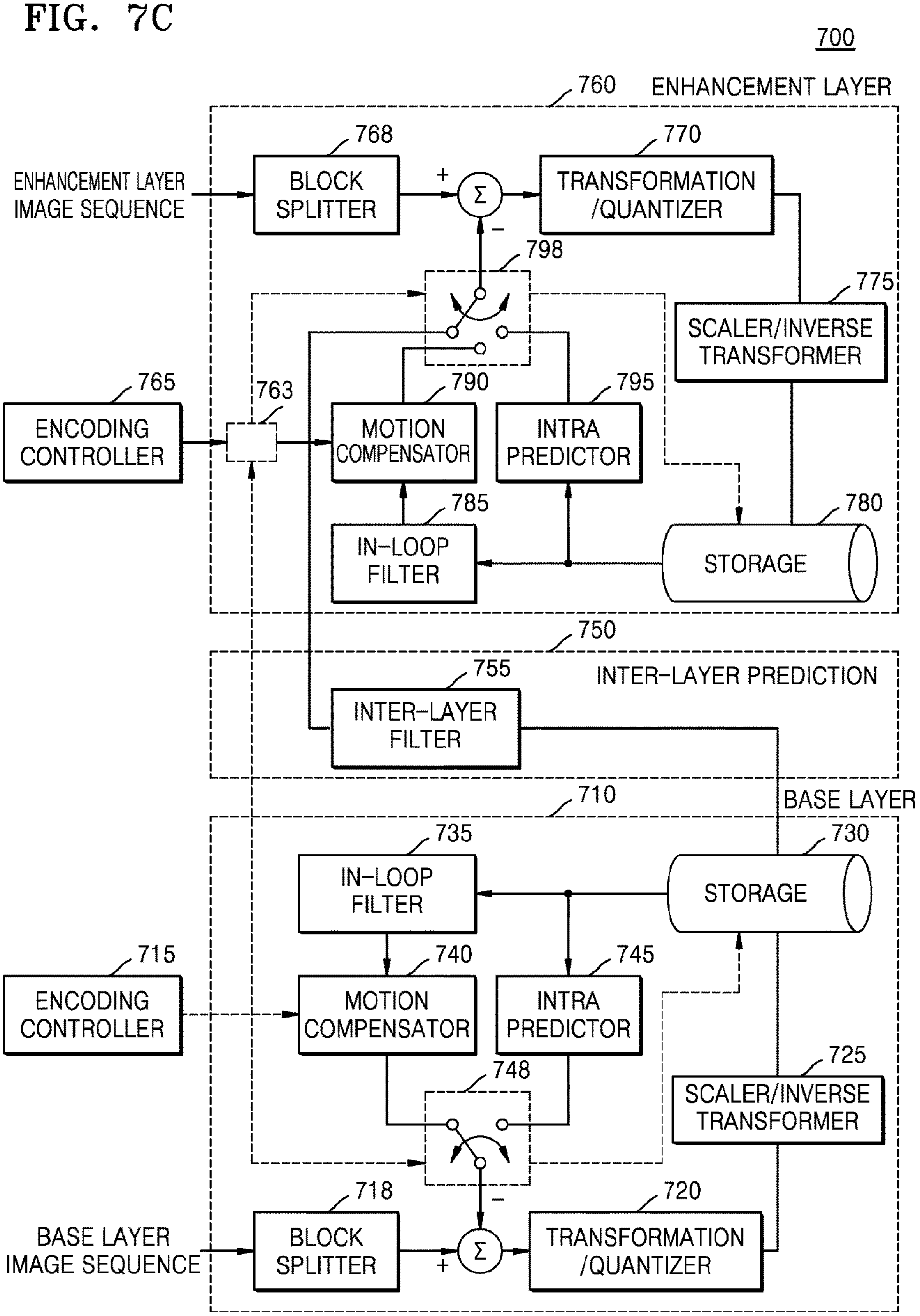
FIG. 7C illustrates an inter-layer prediction structure, according to an embodiment.

FIG. 7C illustrates an inter-layer prediction structure, according to an embodiment.

An inter-layer encoding system 700 includes a base layer encoding terminal 710, an enhancement layer encoding terminal 760, and an inter-layer prediction terminal 750 between the base layer encoding terminal 710 and the enhancement layer encoding terminal 760. The base layer encoding terminal 710 and the enhancement layer encoding terminal 760 may be included in the image encoder 11.

The base layer encoding terminal 710 receives an input of a base layer image sequence and encodes each image. The enhancement layer encoding terminal 760 receives an input of an enhancement layer image sequence and encodes each image. Operations that overlap in operations of the base layer encoding terminal 710 and operations of the enhancement layer encoding terminal 760 are simultaneously described below.

A block splitter 718 or 768 splits an input image (a low-resolution image or a high-resolution image) to a largest coding unit, a coding unit, a prediction unit, a transformation unit, etc. In order to encode the coding unit that is output from the block splitter 718 or 768, intra prediction or inter prediction may be performed with respect to each prediction unit of the coding unit. A prediction switch 748 or 798 may perform the inter prediction by referring to a reconstructed previous image output from a motion compensator 740 or 790 or may perform the intra prediction by using a neighbouring prediction unit of a current prediction unit in a current input image output from an intra predictor 745 or 795, based on whether a prediction mode of the prediction unit is an intra prediction mode or an inter prediction mode. Residual information may be generated with respect to each prediction unit due to the inter prediction.

The residual information between the prediction unit and a neighbouring image is input to a transformer/quantizer 720 or 770, according to each prediction unit of the coding unit. The transformer/quantizer 720 or 770 may perform transformation and quantization with respect to each transformation unit, based on the transformation unit of the coding unit, and may output a quantized transformation coefficient.

A scaler/inverse transformer 725 or 775 may perform scaling and inverse-transformation on the quantized transformation coefficient, according to each transformation unit of the coding unit, and may generate the residual information of a spatial domain. When it is controlled to an inter mode due to the prediction switch 748 or 798, the residual information may be synthesized with the reconstructed previous image or the neighbouring prediction unit, so that a reconstructed image including the current prediction unit may be generated and a reconstructed current image may be stored in a storage 730 or 780. The reconstructed current image may be transferred to the intra predictor 745 or 795/the motion compensator 740 or 790, according to a prediction mode of a prediction unit to be next encoded.

In particular, during the inter mode, an in-loop filter 735 or 785 may perform at least one of de-blocking filtering and Sample Adaptive Offset (SAO) filtering on the reconstructed image stored in the storage 730 or 780, according to each coding unit. At least one of the de-blocking filtering and the SAO filtering may be performed on the coding unit and at least one of a prediction unit and a transformation unit included in the coding unit.

The de-blocking filtering is filtering for smoothing a blocking phenomenon of a data unit, and the SAO filtering is filtering for compensating for a pixel value that has been corrupted while data is encoded and decoded. Data that is filtered by the in-loop filter 735 or 785 may be transferred to the motion compensator 740 or 790, according to each prediction unit. In order to encode a next coding unit output from the block splitter 718 or 768, residual information between the reconstructed current image and the next coding unit may be generated, wherein the reconstructed current image is output from the motion compensator 740 or 790 and the next coding unit is output from the block splitter 718 or 768.

In this manner, the aforementioned encoding procedure may be repeated with respect to each coding unit of the input image.

Also, for inter-layer prediction, the enhancement layer encoding terminal 760 may refer to the reconstructed image stored in the storage 730 of the base layer encoding terminal 710. An encoding controller 715 of the base layer encoding terminal 710 may control the storage 730 of the base layer encoding terminal 710, and may transfer the reconstructed image of the base layer encoding terminal 710 to the enhancement layer encoding terminal 760. In the inter-layer prediction terminal 750, an inter-layer filter 755 may perform de-blocking filtering or SAO filtering on a reconstructed base layer image output from the storage 730 of the base layer encoding terminal 710.

When the base layer and the enhancement layer have different resolutions, the inter-layer prediction terminal 750 may upsample the reconstructed base layer image and may transfer an upsampled reconstructed base layer image to the enhancement layer encoding terminal 760. When the inter-layer prediction is performed according to a control of the switch 798 of the enhancement layer encoding terminal 760, the enhancement layer image may be inter-layer predicted by referring to the reconstructed base layer image that is transferred via the inter-layer prediction terminal 750.

In order to encode an image, various encoding modes for a coding unit, a prediction unit, and a transformation unit may be set. For example, as an encoding mode for the coding unit, a depth, split information (e.g., a split flag), or the like may be set. As an encoding mode for the prediction unit, a prediction mode, a partition type, intra direction information, reference list information, or the like may be set. As an encoding mode for the prediction unit, a transformation depth, split information or the like may be set.

The base layer encoding terminal 710 may perform encoding by using each of various depths for the coding unit, each of various modes for the prediction unit, each of various partition types, each of various intra directions, each of various reference lists, and each of various transformation depths for the transformation unit, and according to results of the performances, the base layer encoding terminal 710 may determine an encoding depth, a prediction mode, a partition type, intra direction/reference list, a transformation depth, etc. that have the highest encoding efficiency. However, an encoding mode determined by the base layer encoding terminal 710 is not limited to the aforementioned encoding modes.

The encoding controller 715 of the base layer encoding terminal 710 may control various encoding modes to be appropriately applied to operations of each configuring element. Also, for inter-layer encoding in the enhancement layer encoding terminal 760, the encoding controller 715 may control the enhancement layer encoding terminal 760 to determine an encoding mode or residual information by referring to the encoding results from the base layer encoding terminal 710.

For example, the enhancement layer encoding terminal 760 may use an encoding mode of the base layer encoding terminal 710 as an encoding mode for the enhancement layer image, or may determine the encoding mode for the enhancement layer image by referring to an encoding mode of the base layer encoding terminal 710. The encoding controller 715 of the base layer encoding terminal 710 may use a current encoding mode from the encoding mode of the base layer encoding terminal 710 so as to determine a current encoding mode of the enhancement layer encoding terminal 760 by controlling a control signal of the encoding controller 765 of the enhancement layer encoding terminal 760.

Similar to the inter-layer encoding system 700 shown in FIG. 7C, an inter-layer decoding system based on the inter-layer prediction technique may be embodied. That is, the inter-layer decoding system for a multilayer video may receive a base layer bitstream and an enhancement layer bitstream. A base layer decoding terminal of the inter-layer decoding system may reconstruct base layer images by decoding the base layer bitstream and. An enhancement layer decoding terminal of the inter-layer decoding system for a multilayer video may decode the enhancement layer bitstream by using a reconstructed base layer image and parsed encoding information and may reconstruct enhancement layer images.

When the image encoder 11 of the multilayer video encoding apparatus 10 according to various embodiments performed inter-layer prediction, the image decoder 22 of the multilayer video decoding apparatus 20 may reconstruct multilayer images according to the aforementioned inter-layer decoding system.

The multilayer video encoding apparatus 10 according to FIG. 1A may generate samples by performing intra prediction, inter prediction, inter-layer prediction, transformation, and quantization on each of image blocks, may perform entropy encoding on the samples, and thus may output the samples in the form of a bitstream. In order to output a video encoding result of a videostream encoding apparatus 10 according to an embodiment, i.e., in order to output a base layer videostream and an enhancement layer videostream, the videostream encoding apparatus 10 may operate in connection with an internal video encoding processor or an external video encoding processor so as to perform a video encoding operation including transformation and quantization. The internal video encoding processor of the videostream encoding apparatus 10 according to an embodiment may be a separate processor or may be implemented in a manner that a video encoding apparatus, a central processing unit (CPU) or a graphics processing unit (GPU) includes a video encoding processing module and thus performs a basic video encoding operation.

A videostream decoding apparatus 20 according to FIG. 2A performs decoding on each of the received base layer videostream and the received enhancement layer videostream. That is, inverse-quantization, inverse-transformation, intra prediction, and motion compensation (motion compensation between images, inter-layer disparity compensation) may be performed on each of the image blocks of the base layer videostream and the enhancement layer videostream, so that samples of a base layer images may be reconstructed from the base layer videostream, and samples of enhancement layer images may be reconstructed from the enhancement layer videostream. In order to output a reconstructed image generated by performing the decoding, the multilayer video decoding apparatus 20 according to an embodiment may operate in connection with an internal video decoding processor or an external video decoding processor so as to perform a video reconstructing operation including the inverse-quantization, the inverse-transformation, and the prediction/compensation. The internal video decoding processor of the multilayer video decoding apparatus 20 according to an embodiment may be a separate processor or may be implemented in a manner that a video decoding apparatus, a CPU or a GPU includes a video decoding processing module and thus performs a basic video reconstructing operation.

As described above, the multilayer video encoding apparatus 10 and the multilayer video decoding apparatus 20 according to embodiments split blocks of divided video data into coding units of a tree structure, and encoding units, prediction units, and transformation units are used for inter-layer prediction or inter-prediction with respect to the coding units. Hereinafter, with reference to FIGS. 8 through 20, a video encoding method and apparatus therefor, and a video decoding method and apparatus therefor based on coding units of a tree structure and transformation units according to embodiments are described.

Basically, in an encoding/decoding procedure for a multilayer video, an encoding/decoding procedure for base layer images, and an encoding/decoding procedure for enhancement layer images are separately performed. That is, when inter-layer prediction occurs in the multilayer video, encoding/decoding results with respect to a single layer video may be mutually referred to, but an encoding/decoding procedure is performed for each of single layer videos.

Therefore, for convenience of description, a video encoding procedure and a video decoding procedure based on coding units of a tree structure that are described later with reference to FIGS. 8 through 20 are a video encoding procedure and a video decoding procedure for a single layer video, thus, inter-prediction and motion compensation are described in detail. However, as described above with reference to FIGS. 1A through 7C, for encoding/decoding a video stream, inter-layer prediction and compensation between base layer images and enhancement layer images are performed.

Figure 8:
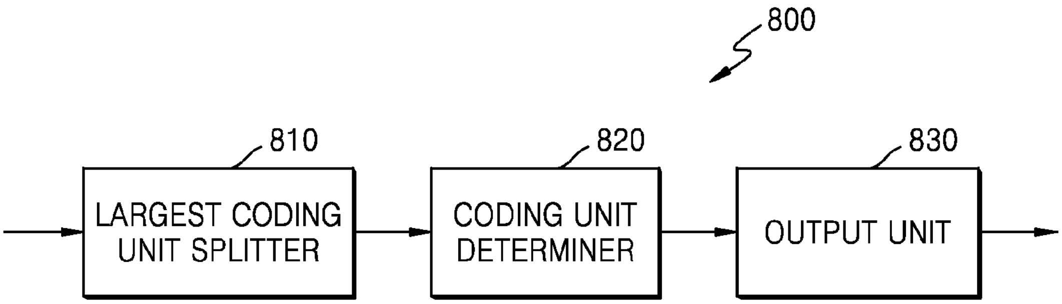
FIG. 8 illustrates a block diagram of a video encoding apparatus based on coding units of a tree structure, according to various embodiments.

Therefore, in order for the image encoder 11 of the multilayer video encoding apparatus 10 according to an embodiment to encode a multi layer video, based on coding units of a tree structure, the multilayer video encoding apparatus 10 may include video encoding apparatuses 800 of FIG. 8 corresponding to the number of layers of the multilayer video so as to perform video encoding on each of single layer videos, and may control the video encoding apparatuses 800 to encode the single layer videos, respectively. Also, the multilayer video encoding apparatus 10 may perform inter-view prediction by using encoding results with respect to discrete single views obtained by the video encoding apparatuses 800. Accordingly, the image encoder 11 of the multilayer video encoding apparatus 10 may generate a base layer video stream and an enhancement layer video stream that include an encoding result of each layer.

Figure 9:
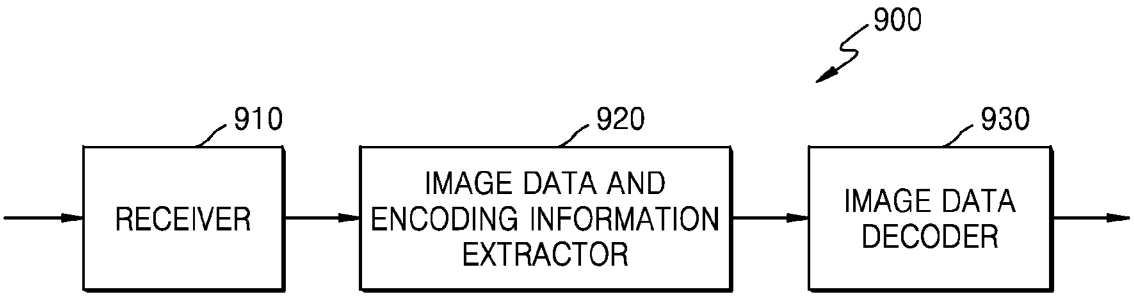
FIG. 9 illustrates a block diagram of a video decoding apparatus based on coding units of a tree structure, according to various embodiments.

Similarly, in order for the image decoder 22 of the multilayer video decoding apparatus 20 to decode a multilayer video, based on coding units of a tree structure, the multilayer video decoding apparatus 20 may include video decoding apparatuses 900 of FIG. 9 corresponding to the number of layers of a multilayer video so as to perform video decoding on each of layers of a received base layer videostream and a received enhancement layer videostream, and may control the video decoding apparatuses 900 to decode single layer videos, respectively. Then, the multilayer video decoding apparatus 20 may perform inter-layer compensation by using decoding results with respect to discrete single layers obtained by the video decoding apparatuses 900. Accordingly, the image decoder 22 of the multilayer video decoding apparatus 20 may generate base layer images and enhancement layer images that are reconstructed for each of the layers.

FIG. 8 illustrates a block diagram of a video encoding apparatus based on coding units of a tree structure 800, according to an embodiment of the present invention.

The video encoding apparatus involving video prediction based on coding units of the tree structure 800 includes a coding unit determiner 820 and an output unit 830. Hereinafter, for convenience of description, the video encoding apparatus involving video prediction based on coding units of the tree structure 800 is referred to as the 'video encoding apparatus 800'.

The coding unit determiner 820 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a final encoding result according to the at least one split region. That is, the coding unit determiner 820 determines a final depth by encoding the image data in the deeper coding units according to depths, according to the largest coding unit of the current picture, and selecting a depth having the least encoding error. The determined final depth and image data according to largest coding units are output to the output unit 830.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to an embodiment may determine coding units having a tree structure included in a current largest coding unit. The 'coding units having a tree structure' according to an embodiment include coding units corresponding to a depth determined to be the final depth, from among all deeper coding units included in the current largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 800 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of a final depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions obtained by symmetrically splitting a height or width of the prediction unit, partitions obtained by asymmetrically splitting the height or width of the prediction unit, such as 1:n or n:1, partitions obtained by geometrically splitting the prediction unit, or partitions having arbitrary shapes.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode having a least encoding error.

The video encoding apparatus 800 according to an embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 820 may determine not only a depth generating a least encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs, in bitstreams, the image data of the largest coding unit, which is encoded based on the at least one depth determined by the coding unit determiner 820, and information according to depths.

The encoded image data may correspond to a result obtained by encoding residual data of an image.

The split information according to depths may include depth information, partition mode information of the prediction unit, prediction mode information, and the split information of the transformation unit.

Final depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 830 according to an embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 830 may encode and output reference information, prediction information, and slice type information, which are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The inter-layer video encoding apparatus including configuration described above with reference to FIG. 1A may include the video encoding apparatuses 800 corresponding to the number of layers so as to encode single layer images in each of the layers of a multilayer video. For example, a first layer encoder may include one video encoding apparatus 800, and a second layer encoder may include the video encoding apparatuses 800 corresponding to the number of second layers.

When the video encoding apparatuses 800 encode first layer images, the coding unit determiner 820 may determine a prediction unit for inter-image prediction according to each of coding units of a tree structure in each largest coding unit, and may perform the inter-image prediction on each prediction unit.

When the video encoding apparatuses 800 encode the second layer images, the coding unit determiner 820 may determine prediction units and coding units of a tree structure in each largest coding unit, and may perform inter-prediction on each of the prediction units.

The video encoding apparatuses 800 may encode a luminance difference so as to compensate for the luminance difference between the first layer image and the second layer image. However, whether to perform luminance compensation may be determined according to an encoding mode of a coding unit. For example, the luminance compensation may be performed only on a prediction unit having a size of 2N×2N.

FIG. 9 illustrates a block diagram of a video decoding apparatus based on coding units of a tree structure 900, according to various embodiments.

The video decoding apparatus involving video prediction based on coding units of the tree structure 900 according to the embodiment includes a receiver 910, an image data and encoding information extractor 920, and an image data decoder 930. Hereinafter, for convenience of description, the video decoding apparatus involving video prediction based on coding units of the tree structure 900 according to the embodiment is referred to as the 'video decoding apparatus 900'.

Definitions of various terms, such as a coding unit, a depth, a prediction unit, a transformation unit, and various types of split information for decoding operations by the video decoding apparatus 900 according to the embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts, from the parsed bitstream, a final depth and split information about the coding units having a tree structure according to each largest coding unit. The extracted final depth and the extracted split information are output to the image data decoder 930. That is, the image data in a bit stream is split into the largest coding unit so that the image data decoder 930 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 800, repeatedly performs encoding for each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 930 reconstructs the current picture by decoding the image data in each largest coding unit based on the depth and the split information according to each of the largest coding units. That is, the image data decoder 930 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 930 may perform intra prediction or motion compensation according to a partition and a prediction mode of each coding unit, based on the information about the partition type and the prediction mode of the prediction unit of the coding unit according to depths.

In addition, for inverse transformation for each largest coding unit, the image data decoder 930 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 930 may determine a depth of a current largest coding unit by using split information according to depths. If the split information specifies that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The inter-layer video decoding apparatus including configuration described above with reference to FIG. 2A may include the video decoding apparatuses 900 corresponding to the number of views, so as to reconstruct first layer images and second layer images by decoding a received first layer imagestream and a received second layer imagestream.

When the first layer imagestream is received, the image data decoder 930 of the video decoding apparatus 900 may split samples of the first layer images, which are extracted from the first layer imagestream by an extractor 920, into coding units according to a tree structure of a largest coding unit. The image data decoder 930 may perform motion compensation, based on prediction units for the inter-image prediction, on each of the coding units according to the tree structure of the samples of the first layer images, and may reconstruct the first layer images.

When the second layer imagestream is received, the image data decoder 930 of the video decoding apparatus 900 may split samples of the second layer images, which are extracted from the second layer imagestream by the extractor 920, into coding units according to a tree structure of a largest coding unit. The image data decoder 930 may perform motion compensation, based on prediction units for the inter-image prediction, on each of the coding units of the samples of the second layer images, and may reconstruct the second layer images.

The extractor 920 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
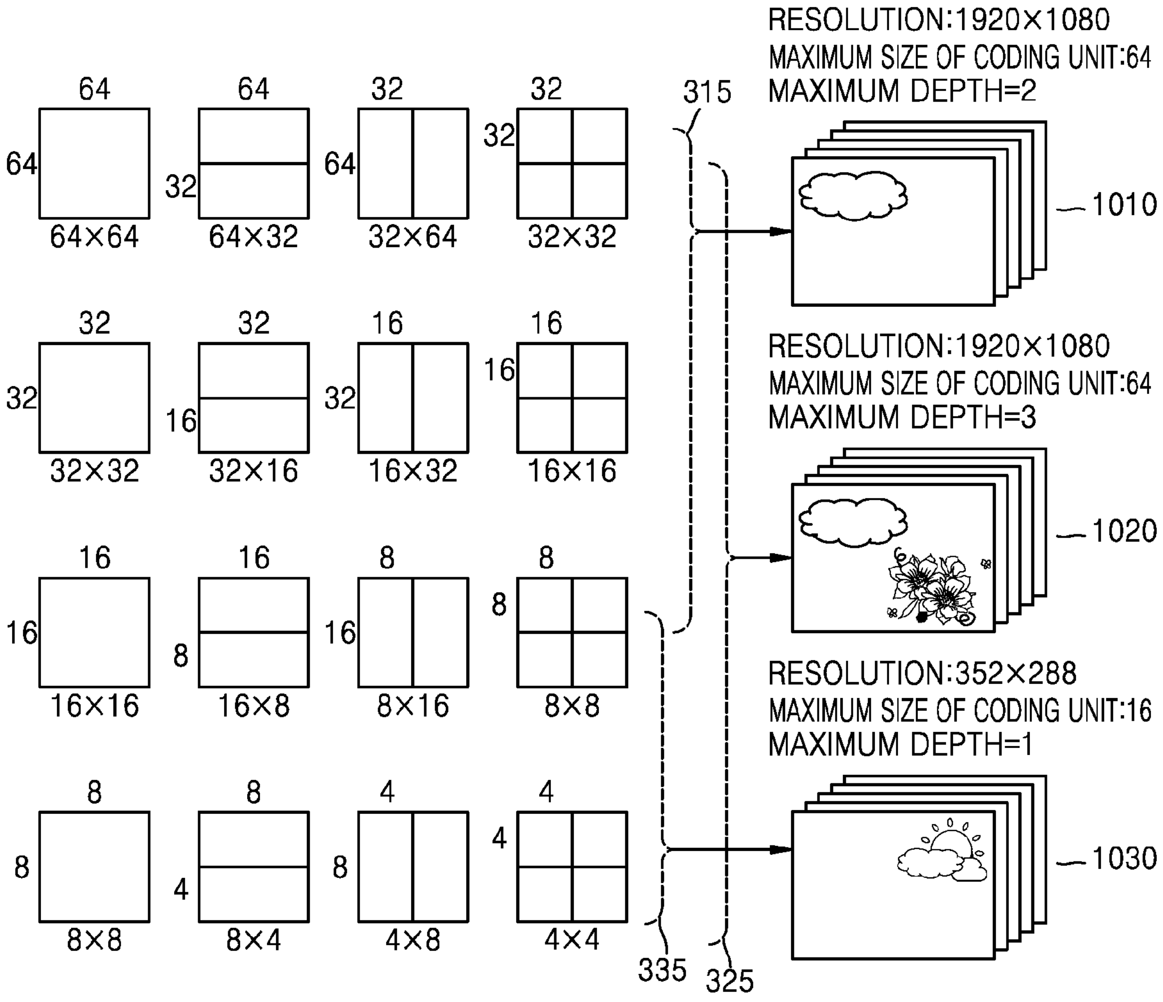
FIG. 10 illustrates a concept of coding units, according to various embodiments.

FIG. 10 illustrates a concept of coding units, according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 1010 and 1020 having a higher resolution than the video data 1030 may be selected to 64.

Since the maximum depth of the video data 1010 is 2, coding units 1015 of the vide data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
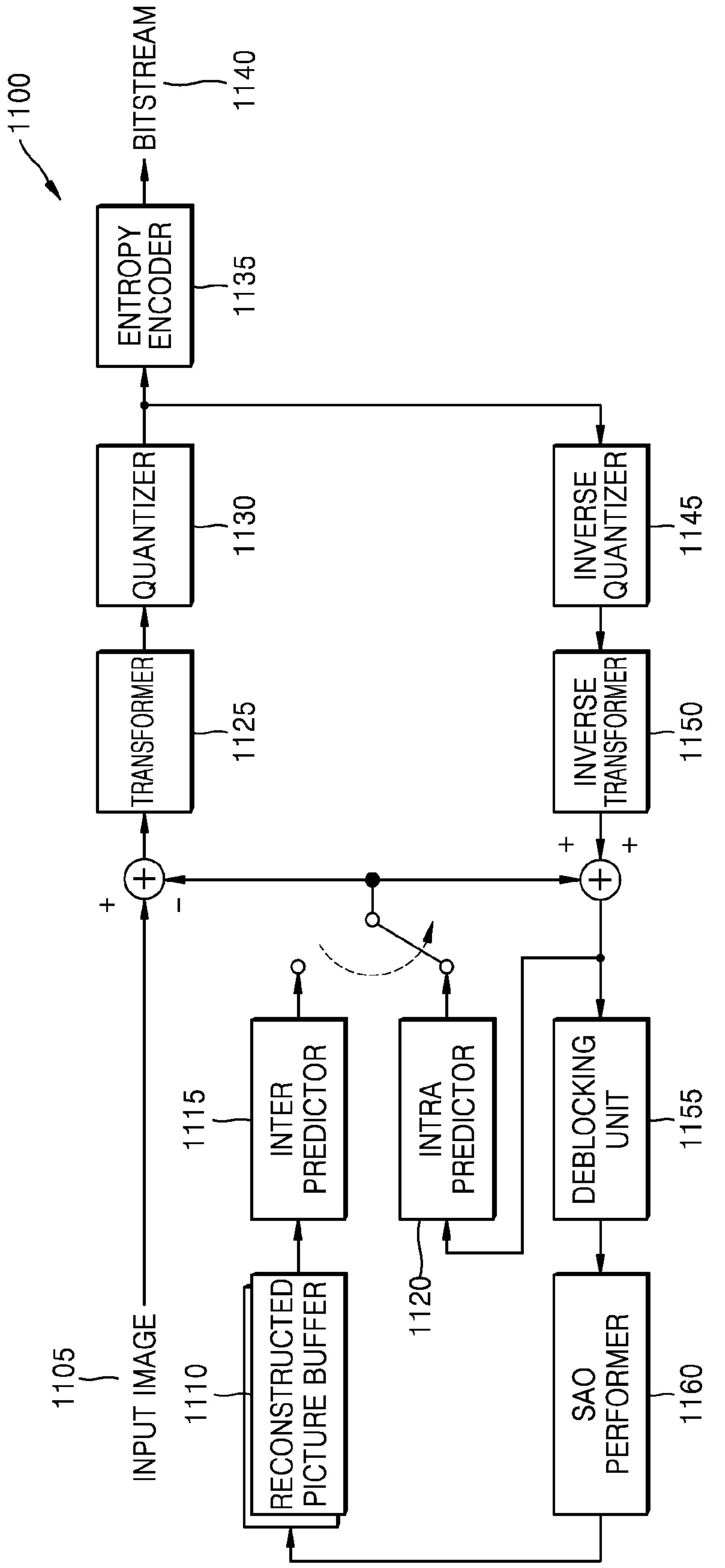
FIG. 11 illustrates a block diagram of an image encoder based on coding units, according to various embodiments.

FIG. 11 illustrates a block diagram of a video encoder 1100 based on coding units, according to various embodiments.

The video encoder 1100 according to an embodiment performs operations of a picture encoder 1520 of the video encoding apparatus 800 so as to encode image data. That is, an intra predictor 1120 performs intra prediction on coding units in an intra mode, from among a current image 1105, and an inter predictor 1115 performs inter prediction on coding units in an inter mode by using the current image 1105 and a reference image obtained from a reconstructed picture buffer 1110 according to prediction units. The current image 1105 may be split into largest coding units and then the largest coding units may be sequentially encoded. In this regard, the largest coding units that are to be split into coding units having a tree structure may be encoded.

Residue data is generated by subtracting prediction data regarding a coding unit of each mode which is output from the intra predictor 1120 or the inter predictor 1115 from data regarding an encoded coding unit of the current image 1105, and the residue data is output as a quantized transformation coefficient according to transformation units through a transformer 1125 and a quantizer 1130. The quantized transformation coefficient is reconstructed as the residue data in a spatial domain through an inverse-quantizer 1145 and an inverse-transformer 1150. The reconstructed residual image data in the spatial domain is added to prediction data for the coding unit of each mode which is output from the intra predictor 1120 or the inter predictor 1115 and thus is reconstructed as data in a spatial domain for a coding unit of the current image 1105. The reconstructed data in the spatial domain is generated as a reconstructed image through a de-blocking unit 1155 and an SAO performer 1160 and the reconstructed image is stored in the reconstructed picture buffer 1110. The reconstructed images stored in the reconstructed picture buffer 1110 may be used as reference images for inter predicting another image. The transformation coefficient quantized by the transformer 1125 and the quantizer 1130 may be output as a bitstream 1140 through an entropy encoder 1135.

In order for the video encoder 1100 to be applied in the video encoding apparatus 800, all elements of the video encoder 1100, i.e., the inter predictor 1115, the intra predictor 1120, the transformer 1125, the quantizer 1130, the entropy encoder 1135, the inverse-quantizer 1145, the inverse-transformer 1150, the de-blocking unit 1155, and the SAO performer 1160, may perform operations based on each coding unit among coding units having a tree structure according to each largest coding unit.

In particular, the intra predictor 1120 and the inter predictor 1115 may determine a partition mode and a prediction mode of each coding unit from among the coding units having a tree structure, by taking into account the maximum size and the maximum depth of a current largest coding unit, and the transformer 1125 may determine whether to split a transformation unit according to a quadtree in each coding unit from among the coding units having a tree structure.

Figure 12:
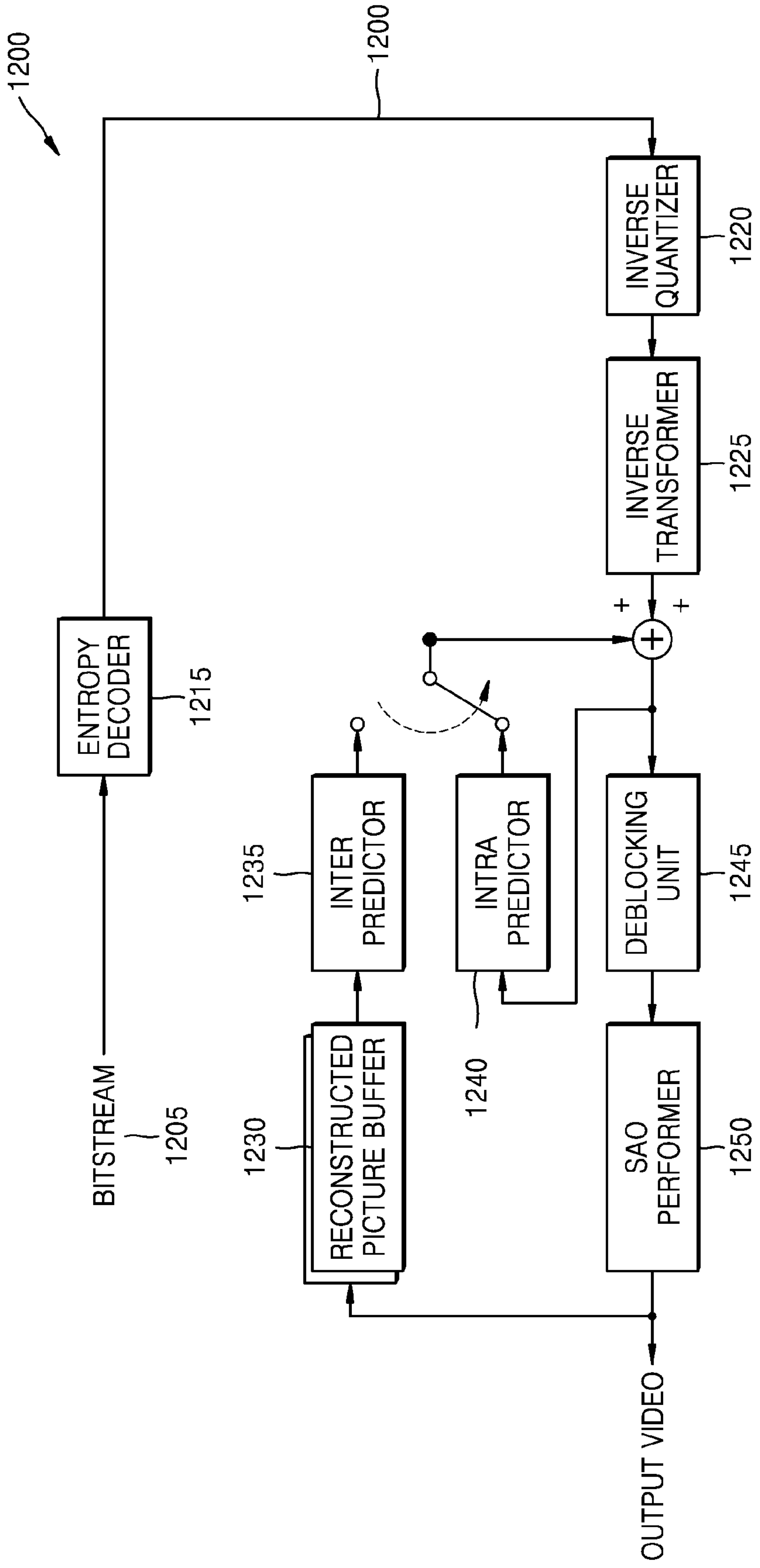
FIG. 12 illustrates a block diagram of an image decoder based on coding units, according to various embodiments.

FIG. 12 illustrates a block diagram of a video decoder 1200 based on coding units, according to various embodiments.

An entropy decoder 1215 parses, from a bitstream 1205, encoded image data to be decoded and encoding information required for decoding. The encoded image data corresponds to a quantized transformation coefficient, and an inverse-quantizer 1220 and an inverse-transformer 1225 reconstruct residue data from the quantized transformation coefficient.

An intra predictor 1240 performs intra prediction on a coding unit in an intra mode according to prediction units. An inter predictor 1235 performs inter prediction by using a reference image with respect to a coding unit in an inter mode from among a current image, wherein the reference image is obtained by a reconstructed picture buffer 1230 according to prediction units.

Prediction data and residue data regarding coding units of each mode, which passed through the intra predictor 1240 or the inter predictor 1235, are summed, so that data in a spatial domain regarding coding units of the current image 1205 may be reconstructed, and the reconstructed data in the spatial domain may be output as a reconstructed image 1260 through a de-blocking unit 1245 and an SAO performer 1250. Reconstructed images stored in the reconstructed picture buffer 30 may be output as reference images.

In order for a picture decoder 930 of the video decoding apparatus 900 to decode the image data, operations after the entropy decoder 1215 of the video decoder 1200 according to an embodiment may be performed.

In order for the video decoder 1200 to be applied in the video decoding apparatus 900 according to an embodiment, all elements of the video decoder 1200, i.e., the entropy decoder 1215, the inverse-quantizer 1220, the inverse-transformer 1225, the intra predictor 1240, the inter predictor 1235, the de-blocking unit 1245, and the SAO performer 1250 may perform operations based on coding units having a tree structure for each largest coding unit.

In particular, the intra predictor 1240 and the inter predictor 1235 may determine a partition mode and a prediction mode of each coding unit from among the coding units according to a tree structure, and the inverse-transformer 1225 may determine whether or not to split a transformation unit according to a quadtree in each coding unit.

The encoding operation of FIG. 10 and the decoding operation of FIG. 11 are described as a videostream encoding operation and a videostream decoding operation, respectively, in a single layer. Thus, if the encoder of FIG. 1A encodes a videostream of two or more layers, the video encoder 1100 may be provided for each layer. Similarly, if the decoder of FIG. 2A decodes a videostream of two or more layers, the video decoder 1200 may be provided for each layer.

Figure 13:
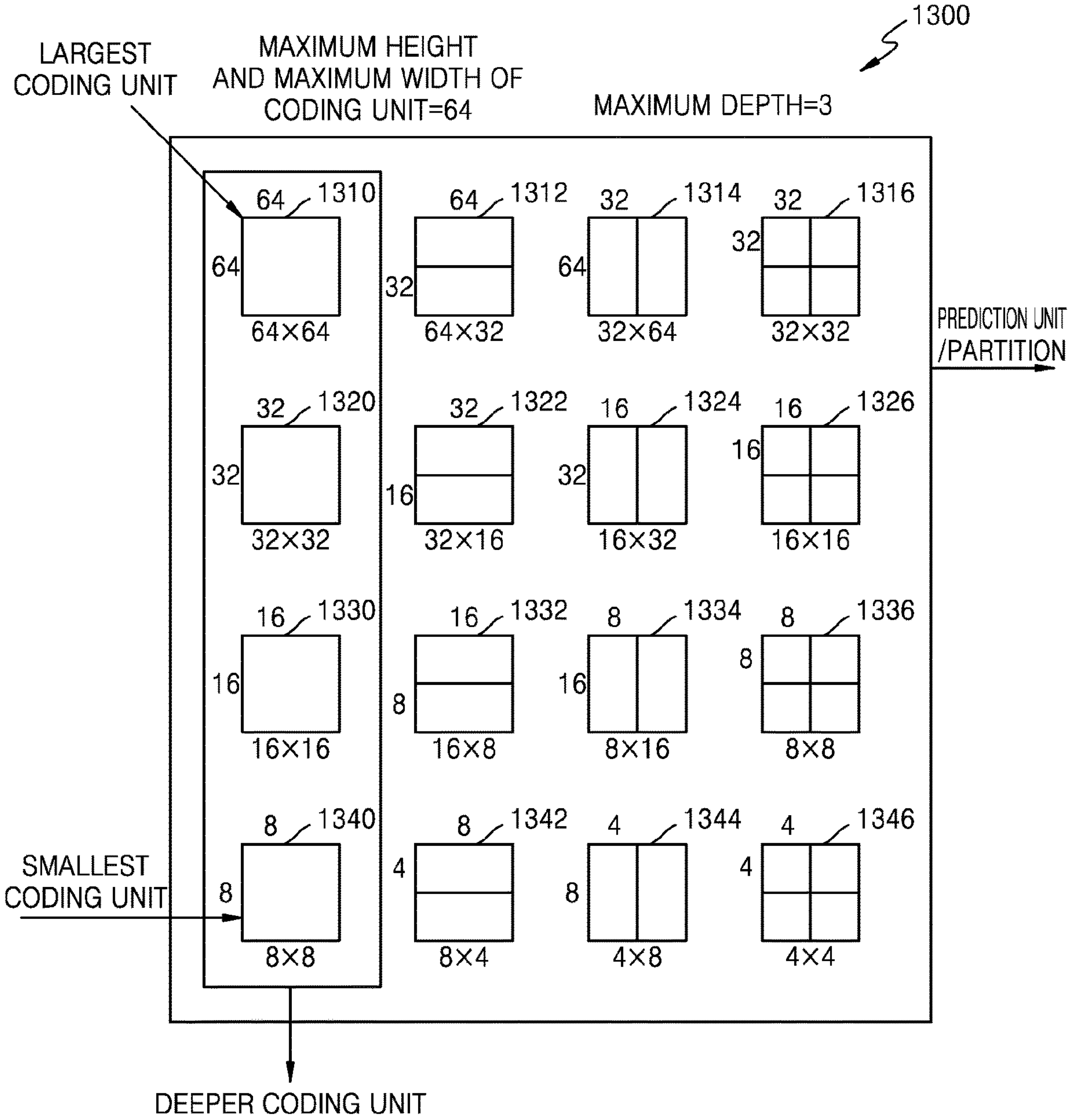
FIG. 13 illustrates deeper coding units according to depths, and partitions, according to various embodiments.

FIG. 13 illustrates deeper coding units according to depths, and partitions, according to various embodiments.

The video encoding apparatus 800 according to an embodiment and the video decoding apparatus 900 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having the size of 8×8 and the depth of 3 is a smallest coding unit.

The prediction unit and the partitions of a coding unit are arranged along the horizontal axis according to each depth. That is, if the coding unit 1310 having a size of 64×64 and a depth of 0 is a prediction unit, the prediction unit may be split into partitions included in the coding unit 1310 having the size of 64×64, i.e. a partition 1310 having a size of 64×64, partitions 1312 having the size of 64×32, partitions 1314 having the size of 32×64, or partitions 1316 having the size of 32×32.

Equally, a prediction unit of the coding unit 1320 having the size of 32×32 and the depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Equally, a prediction unit of the coding unit 1330 having the size of 16×16 and the depth of 2 may be split into partitions included in the coding unit 1330 having the size of 16×16, i.e. a partition 1330 having a size of 16×16, partitions 1332 having a size of 16×8, partitions 1334 having a size of 8×16, and partitions 1336 having a size of 8×8.

Equally, a prediction unit of the coding unit 1340 having the size of 8×8 and the depth of 3 may be split into partitions included in the coding unit 1340 having the size of 8×8, i.e. a partition 1340 having a size of 8×8, partitions 1342 having a size of 8×4, partitions 1344 having a size of 4×8, and partitions 1346 having a size of 4×4.

In order to determine a depth of the largest coding unit 1310, the coding unit determiner 820 of the video encoding apparatus 800 has to perform encoding on coding units respectively corresponding to depths included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1300. Also, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
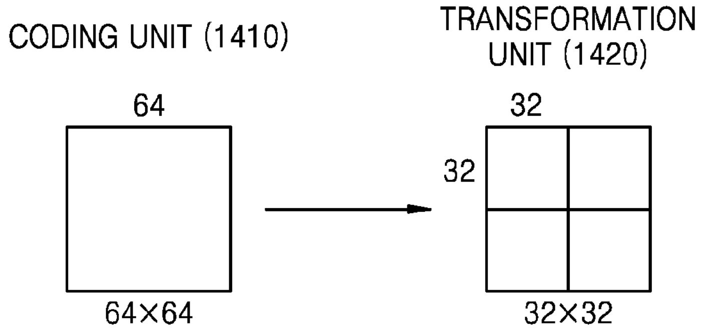
FIG. 14 illustrates a relationship between a coding unit and transformation units, according to various embodiments.

FIG. 14 illustrates a relationship between a coding unit and transformation units, according to various embodiments.

The video encoding apparatus 800 according to an embodiment or the video decoding apparatus 900 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 800 or the video decoding apparatus 900, when a size of the coding unit 1410 is 64×64, transformation may be performed by using the transformation units 1420 having a size of 32×32.

Also, data of the coding unit 1410 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
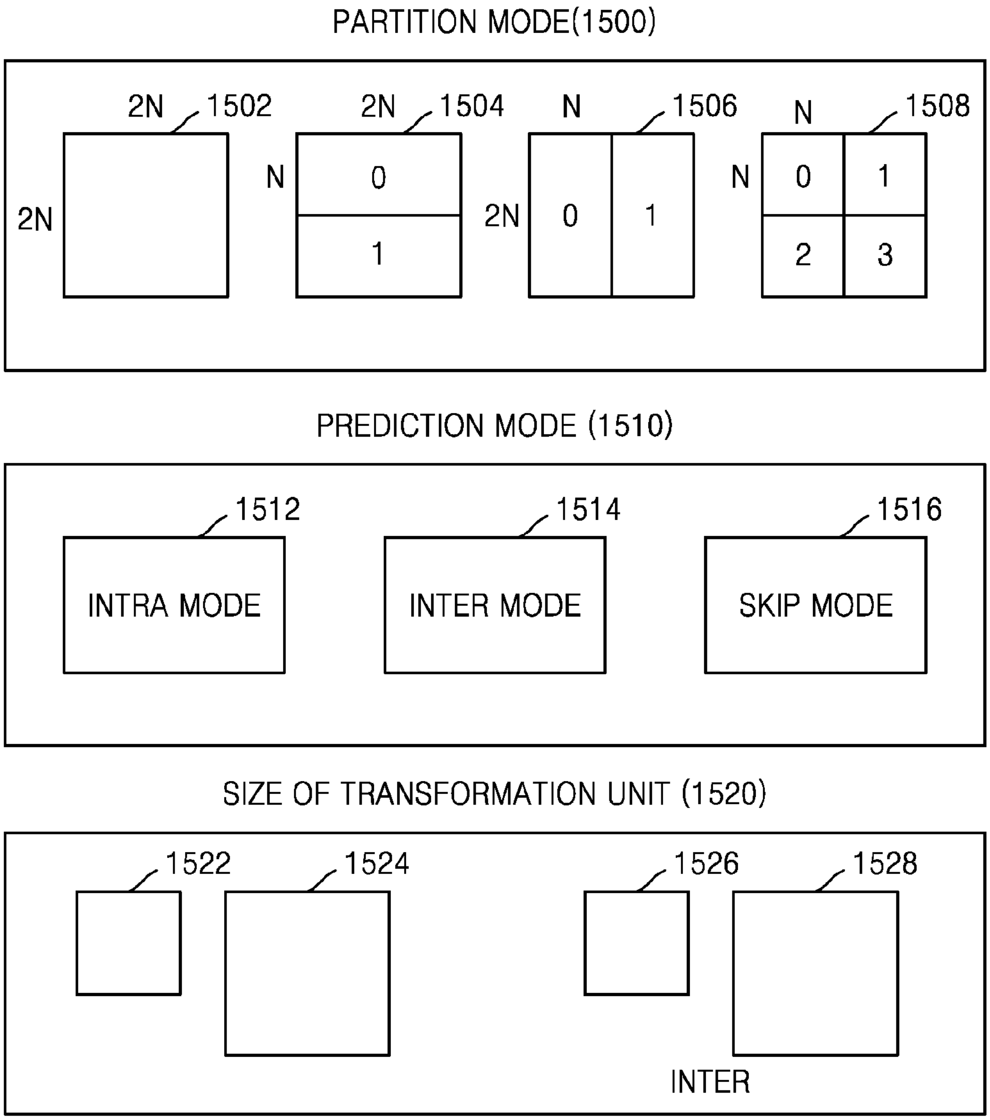
FIG. 15 illustrates a plurality of pieces of encoding information according to depths, according to various embodiments.

FIG. 15 illustrates a plurality of pieces of encoding information, according to various embodiments.

The output unit 830 of the video encoding apparatus 800 according to an embodiment may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. In this case, the partition mode information 1500 about a current coding unit is set to indicate one of the partition 1502 having a size of 2N×2N, the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 represents a transformation unit to be based on when transformation is performed on a current coding unit. For example, the transformation unit may be one of a first intra transformation unit 1522, a second intra transformation unit 1524, a first inter transformation unit 1526, and a second inter transformation unit 1528.

The image data and encoding information extractor 1610 of the video decoding apparatus 900 may extract and use the partition mode information 1500, the prediction mode information 1510, and the transformation unit size information 1520 for decoding, according to each deeper coding unit.

Figure 16:
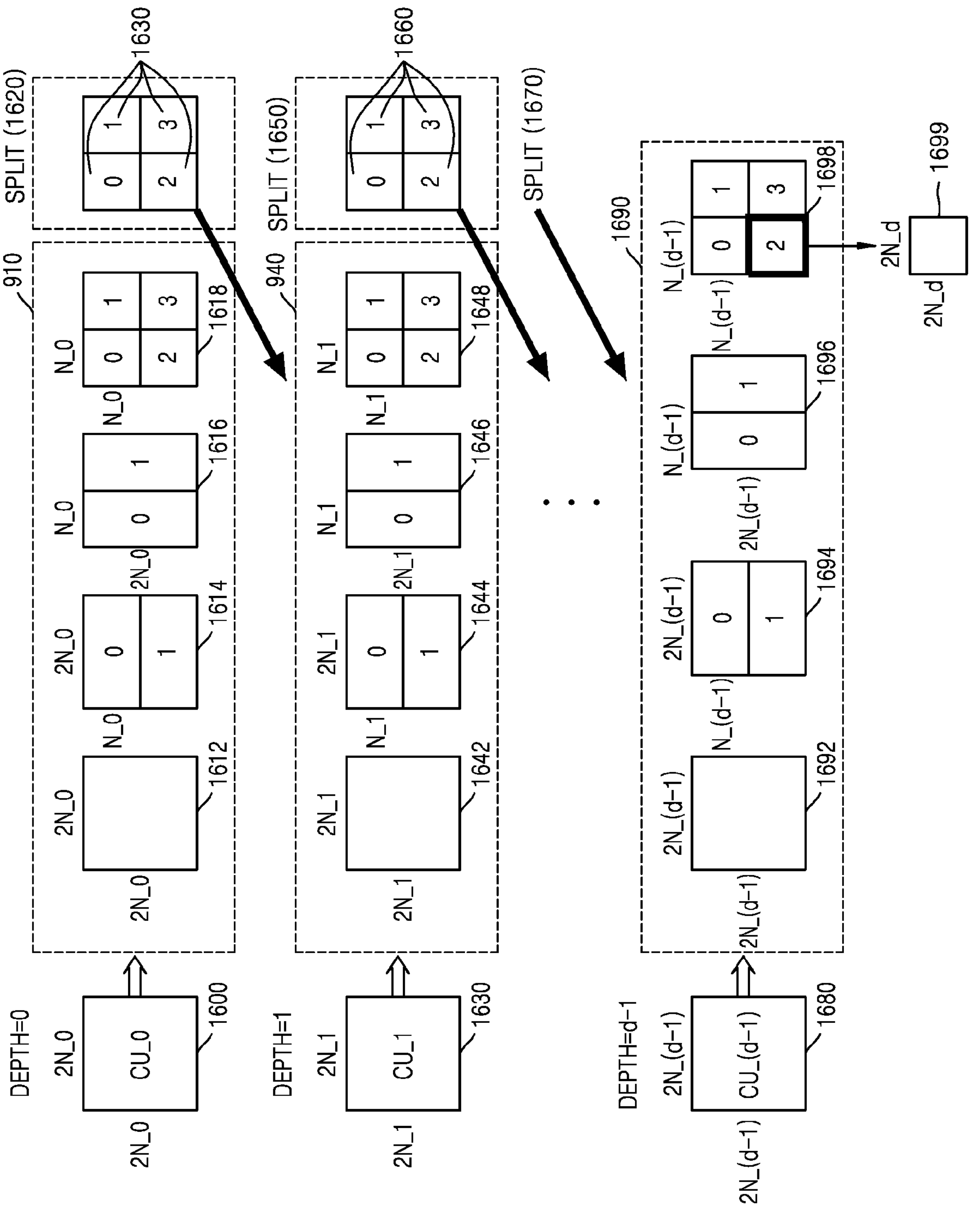
FIG. 16 illustrates deeper coding units according to depths, according to various embodiments.

FIG. 16 illustrates deeper coding units according to depths, according to various embodiments.

Split information may be used to represent a change in a depth. The spilt information specifies whether a coding unit of a current depth is split into coding units of a lower depth.

A prediction unit 1610 for prediction encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612, 1614, 1616, and 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 1612, 1614, and 1616 having the sizes of 2N_0×2N_0, 2N_0×N_0 and N_0×2N_0, the prediction unit 1610 may not be split into a lower depth.

If the encoding error is the smallest in the partition mode 1618 having the size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1630 for prediction encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having the size of N_1×N_1, a depth is changed from 1 to 2 and split is performed (in operation 1650), and encoding is repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 1670), a prediction unit 1690 for prediction encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition type 1698 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for a coding unit 1652 having a depth of d−1 is not set.

A data unit 1699 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth having the least encoding error by comparing encoding errors according to depths of the coding unit 1600 to determine a depth, and set a corresponding partition mode and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 920 of the video decoding apparatus 900 according to the embodiment may extract and use a depth and prediction unit information about the coding unit 1600 so as to decode the coding unit 1612. The video decoding apparatus 900 according to the embodiment may determine a depth, in which split information is '0', as a depth by using split information according to depths, and may use, for decoding, split information about the corresponding depth.

Figure 17:
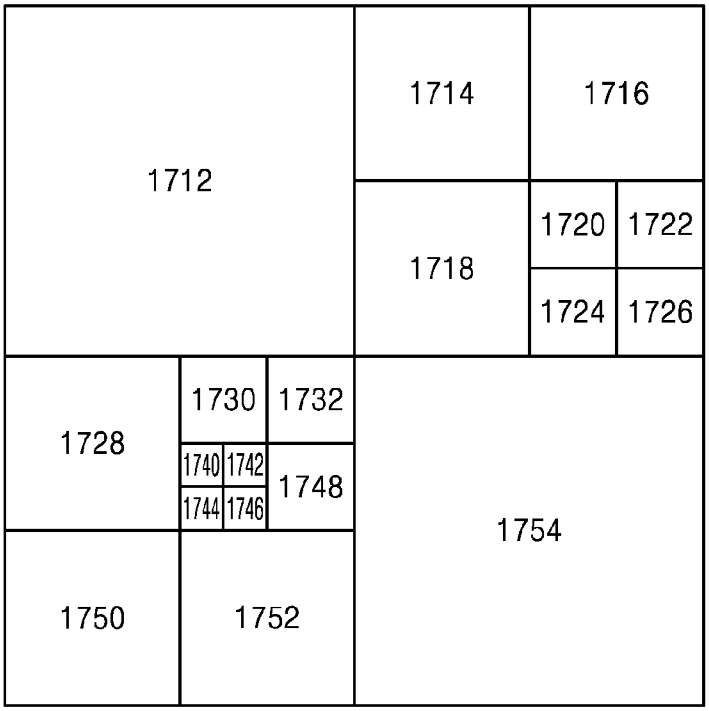
FIGS. 17, 18, and 19 illustrate a relationship between coding units, prediction units, and transformation units, according to various embodiments.
Figure 18:
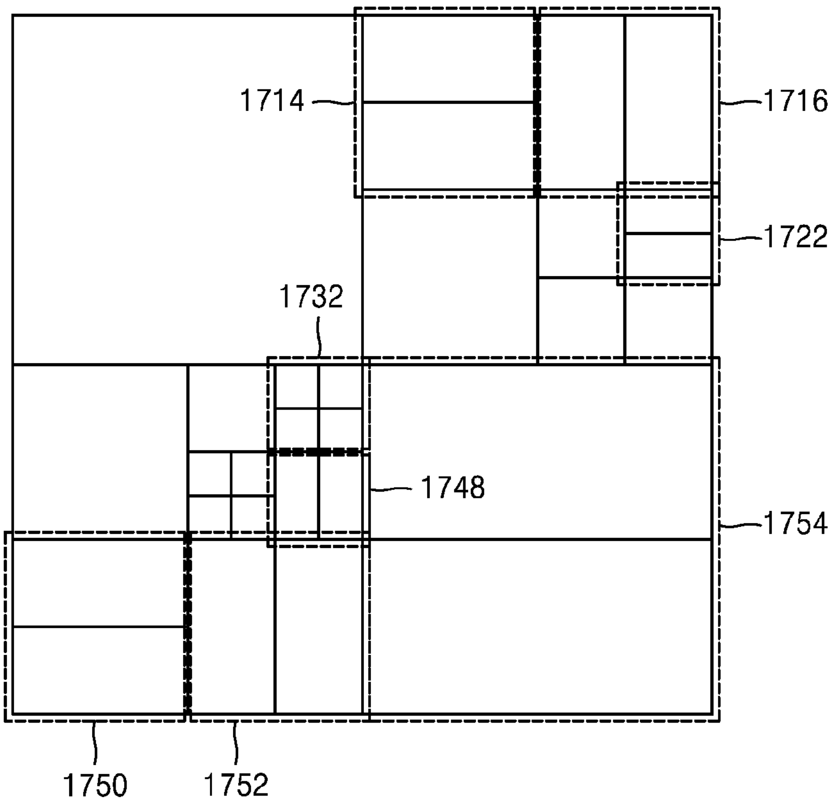
Figure 19:
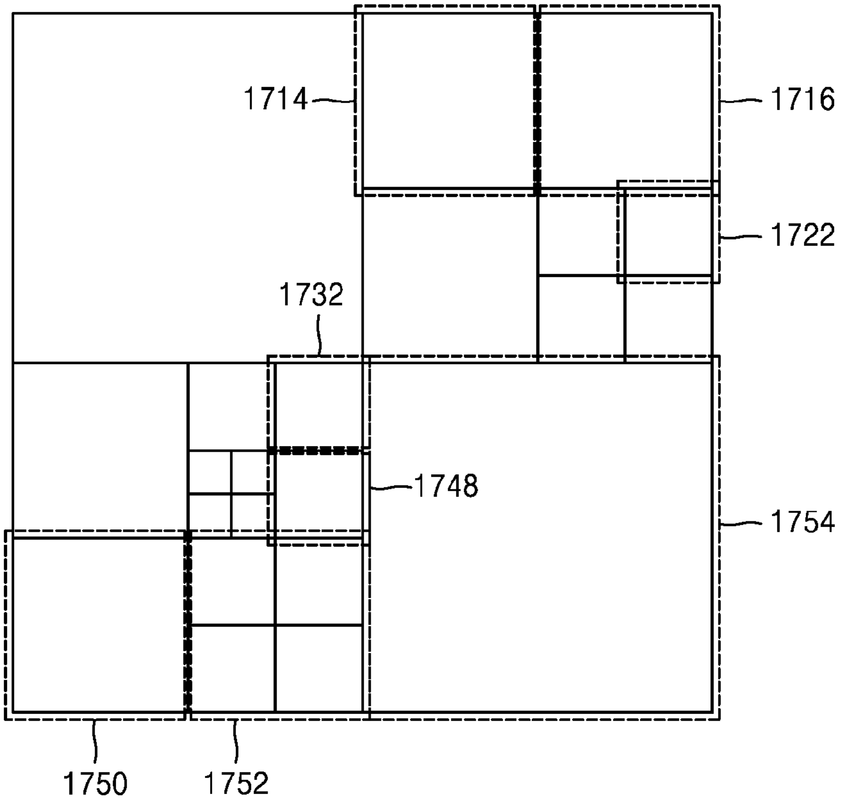

FIGS. 17, 18, and 19 illustrate a relationship between coding units, prediction units, and transformation units, according to various embodiments.

Coding units 1710 are deeper coding units according to depths determined by the video encoding apparatus 800, in a largest coding unit. Prediction units 1760 are partitions of prediction units of each of the coding units 1710 according to depths, and transformation units 1770 are transformation units of each of the coding units according to depths.

When a depth of a largest coding unit is 0 in the deeper coding units 1710, depths of coding units 1712 and 1054 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1760 are data units different from those in the prediction units 1760 in terms of sizes and shapes. That is, the video encoding apparatus 800 and the video decoding apparatus 900 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 5 below shows the encoding information that may be set by the video encoding apparatus 800 and the video decoding apparatus 900 according to the embodiments.

TABLE 5

| Split Information 0 (Encoding on Coding Unit having Size of 2N × 2N and Current Depth of d) | | | | | |
|---|---|---|---|---|---|
| | Partition Type | | Size of Transformation Unit | | |
| Prediction Mode | Symmetrical Partition Type | Asymmetrical Partition Type | Split Information 0 of Transformation Unit | Split Information 1 of Transformation Unit | Split Information 1 |
| Intra<br>Inter<br>Skip (Only 2N × 2N) | 2N × 2N<br>2N × N<br>N × 2N<br>N × N | 2N × nD<br>2N × nD<br>nL × 2N<br>nR × 2N | 2N × 2N | N × N (Symmetrical Partition Type)<br>N/2 × N/2 (Asymmetrical Partition Type) | Repeatedly Encode Coding Units having Lower Depth of d + 1 |

The output unit 830 of the video encoding apparatus 800 according to the embodiment may output the encoding information about the coding units having a tree structure, and the image data and encoding information extractor 920 of the video decoding apparatus 900 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit of a depth, a prediction unit, and a minimum unit. The coding unit of the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
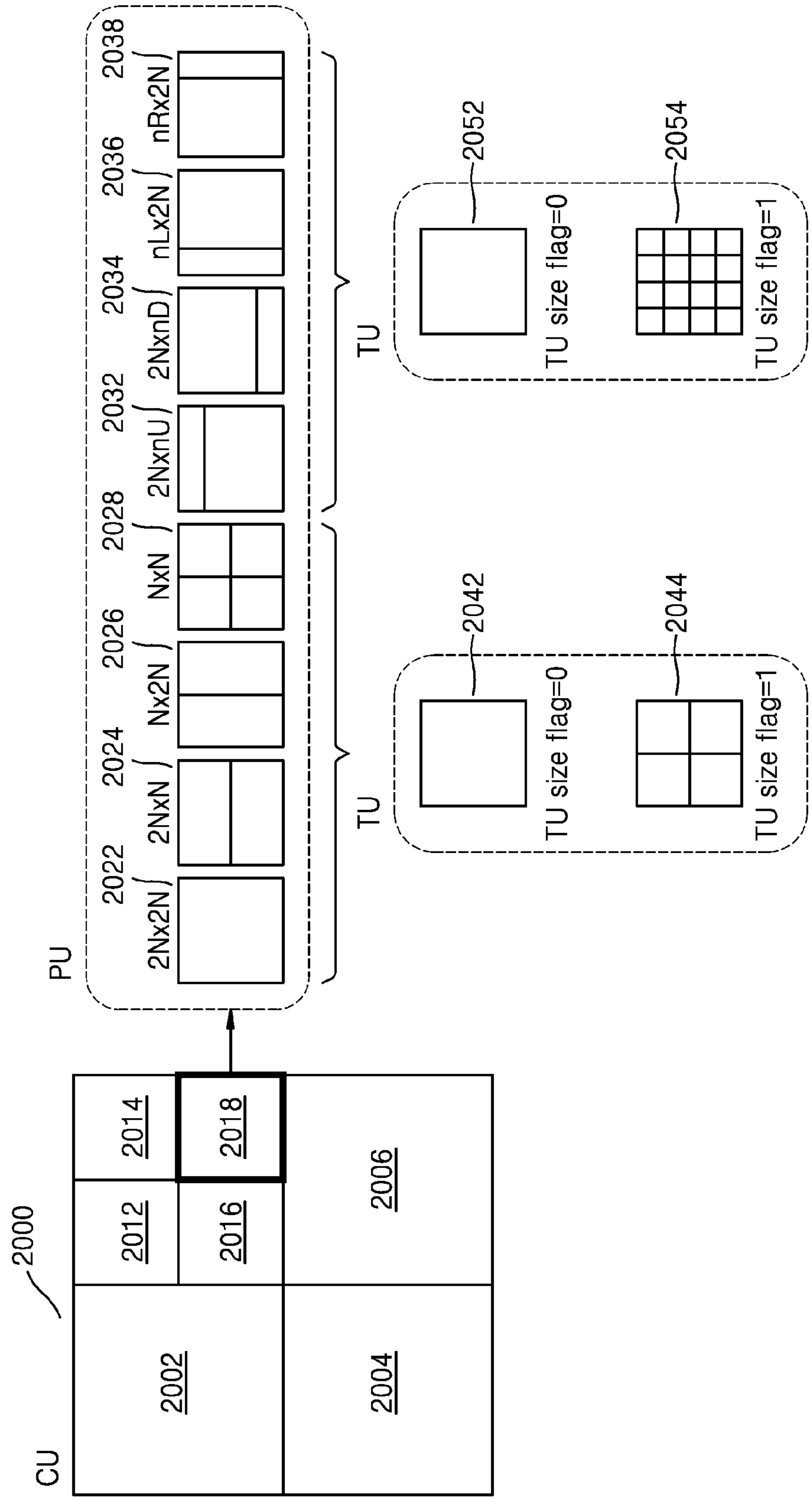
FIG. 20 illustrates a relationship between a coding unit, a prediction unit, and a transformation unit, according to encoding mode information of Table 5.

FIG. 20 illustrates a relationship between a coding unit, a prediction unit, and a transformation unit, according to the encoding mode information of Table 5.

A largest coding unit 2000 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a−1) then the size of a transformation unit may be 32×32 when a TU size flag is 0, (a−2) may be 16×16 when the TU size flag is 1, and (a−3) may be 8×8 when the TU size flag is 2.

As another example, (b) if the size of the current coding unit is 32×32 and a minimum transformation unit size is 32×32, (b−1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2\hat{\ }\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (I), 'RootTuSize/(2−MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2−MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The aforementioned embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the video encoding methods and/or the video encoding method, which are described with reference to FIGS. 1A through 20, will be collectively referred to as 'the video encoding method of the present invention'. Also, the video decoding methods and/or the video decoding method, which are described with reference to FIGS. 1A through 20, will be collectively referred to as 'the video decoding method of the present invention'.

Also, a video encoding apparatus including the video encoding apparatus, the video encoding apparatus 800 or the video encoder 1100 which are described with reference to FIGS. 1A through 20 will be collectively referred to as a 'video encoding apparatus of the present invention'. Also, a video decoding apparatus including the inter-layer video decoding apparatus, the video decoding apparatus 900, or the video decoder 1200 which are described with reference to FIGS. 1A through 20 will be collectively referred to as a 'video decoding apparatus of the present invention'.

The computer-readable recording medium such as a disc 26000 that stores the programs according to an embodiment will now be described in detail.

Figure 21:
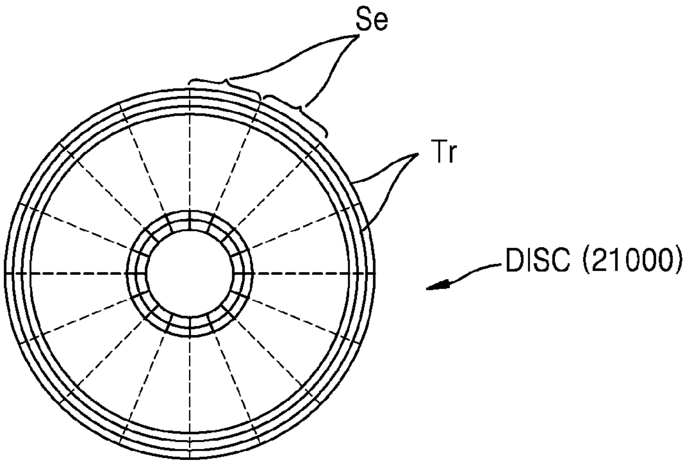
FIG. 21 illustrates a physical structure of a disc in which a program is stored, according to various embodiments.

FIG. 21 illustrates a physical structure of the disc 26000 in which a program is stored, according to various embodiments. The disc 26000 described as the storage medium may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using the storage medium that stores the program for executing the video encoding method and the video decoding method as described above will now be described with reference to FIG. 22.

Figure 22:
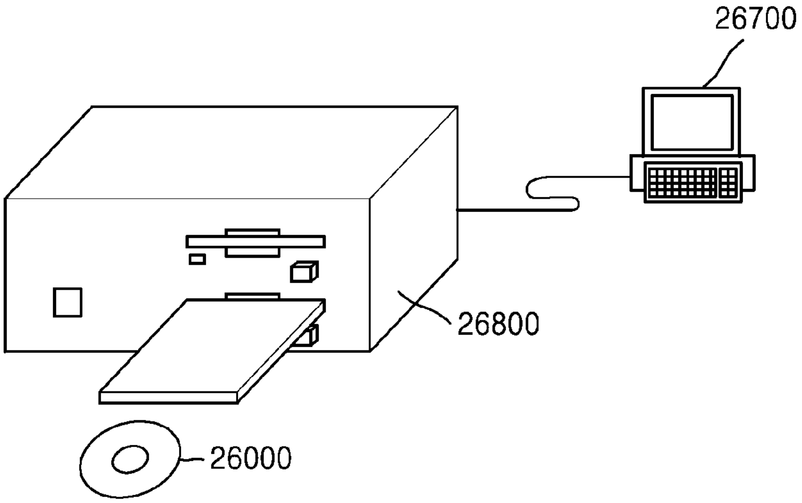
FIG. 22 illustrates a disc drive for recording and reading a program by using the disc.

FIG. 22 illustrates a disc drive 26800 for recording and reading a program by using the disc 26000. A computer system 26700 may store a program that executes at least one of the video encoding method and the video decoding method of the present invention, in the disc 26000 via the disc drive 26800. In order to run the program stored in the disc 26000 in the computer system 26700, the program may be read from the disc 26000 and may be transmitted to the computer system 26700 by using the disc drive 26800.

The program that executes at least one of the video encoding method and the video decoding method of the present invention may be stored not only in the disc 26000 illustrated in FIGS. 21 and 22 but may also be stored in a memory card, a ROM cassette, or a solid state drive (SSD).

A system to which the video encoding method and the video decoding method according to the embodiments described above are applied will be described below.

Figure 23:
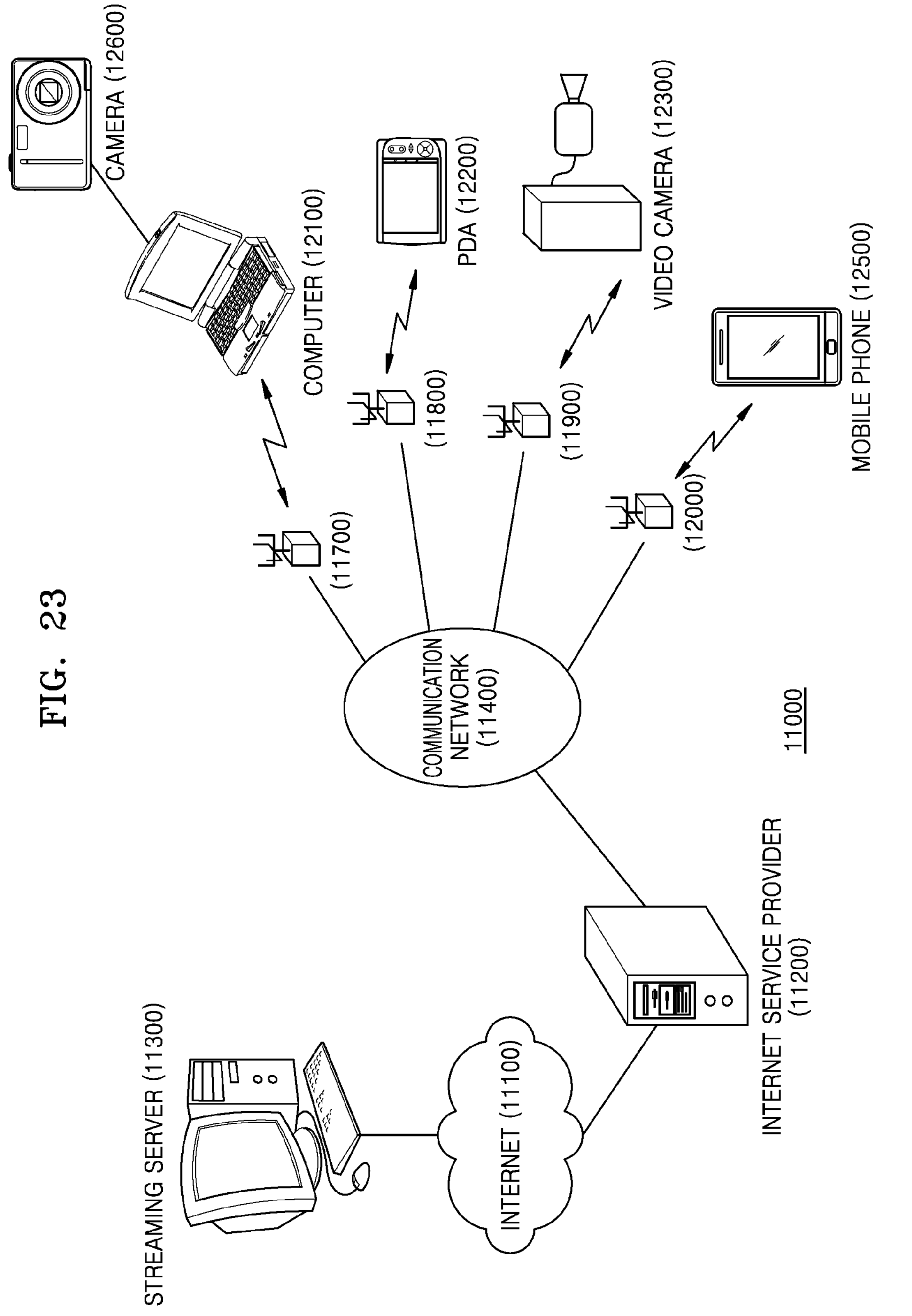
FIG. 23 illustrates an overall structure of a content supply system for providing a content distribution service.

FIG. 23 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
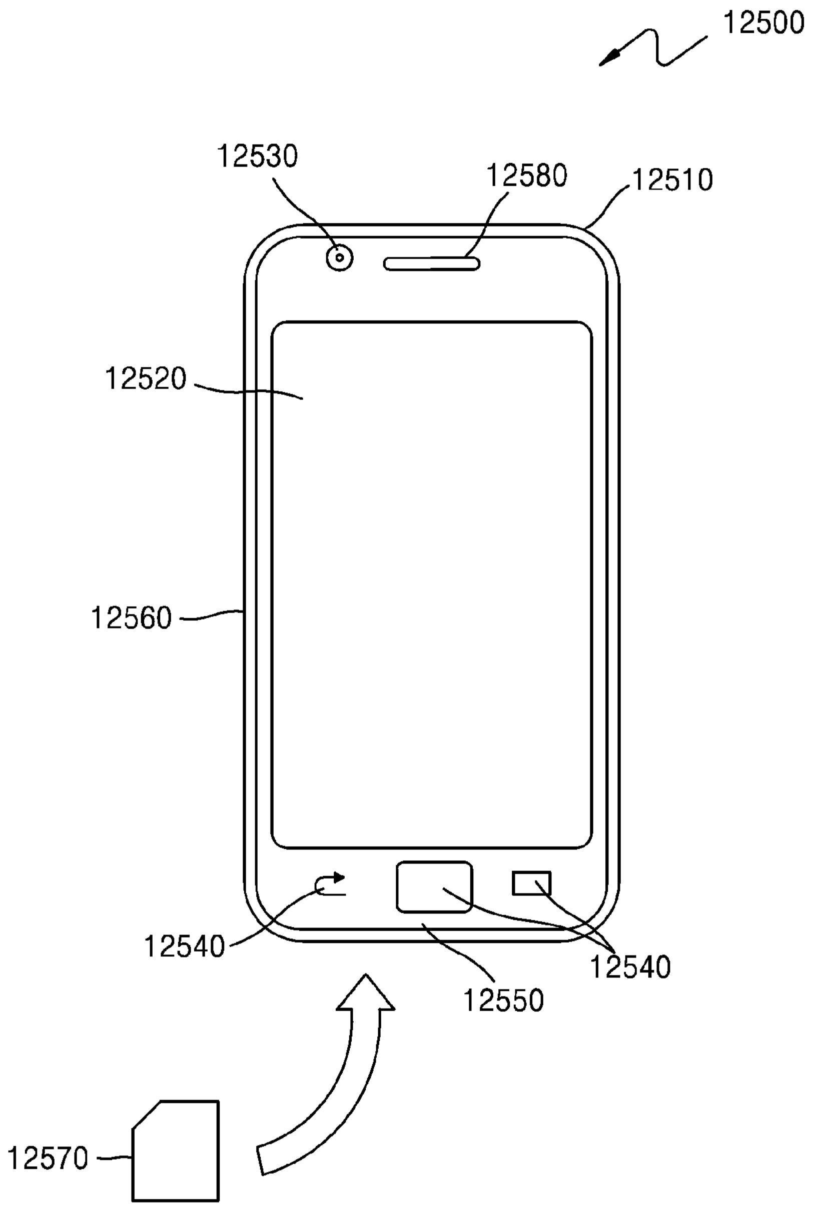
FIGS. 24 and 25 illustrate external and internal structures of a mobile phone to which a video encoding method and a video decoding method of the present invention are applied, according to various embodiments.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video is captured by a camera mounted in the mobile phone 12500, video data may be received from the mobile phone 12500.

The video data may be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

The video encoding apparatus and the video decoding apparatus of the present invention may be applied to encoding and decoding operations of the plurality of independent devices included in the content supply system 11000.

Figure 25:
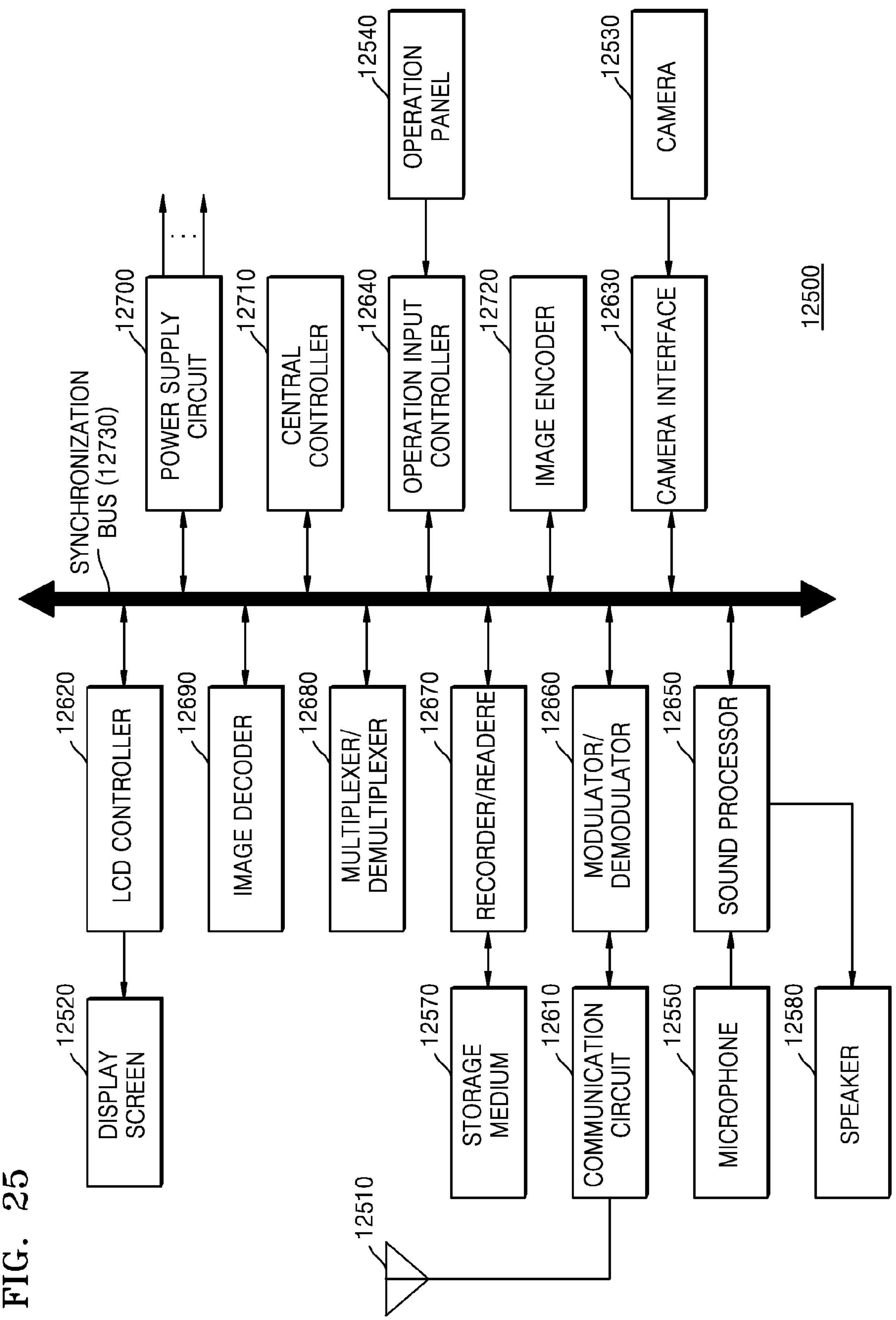

With reference to FIGS. 24 and 25, the mobile phone 12500 included in the content supply system 11000 according to an embodiment will now be described in detail.

FIG. 24 illustrates an external structure of the mobile phone 12500 to which the video encoding apparatus and the video decoding apparatus of the present invention are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control each of parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 by control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650 under control of the central controller 12710. The digital sound signal may be transformed into a transformation signal via the modulator/demodulator 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulator/demodulator 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulator/demodulator 12660 modulates a frequency band of the digital signal. The frequency-band modulated digital signal is transmitted to the image decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method of the present invention.

Thus, the video data of the video file accessed at the Internet website may be displayed on the display screen 12520. At the same time, the sound processor 12650 may transform audio data into an analog sound signal, and may provide the analog sound signal to the speaker 12580. Thus, audio data contained in the video file accessed at the Internet website may also be reproduced via the speaker 12580.

The mobile phone 12500 or another type of communication terminal may be a transceiving terminal including both the video encoding apparatus and the video decoding apparatus of the present invention, may be a transmitting terminal including only the video encoding apparatus of the present invention, or may be a receiving terminal including only the video decoding apparatus of the present invention.

Figure 26:
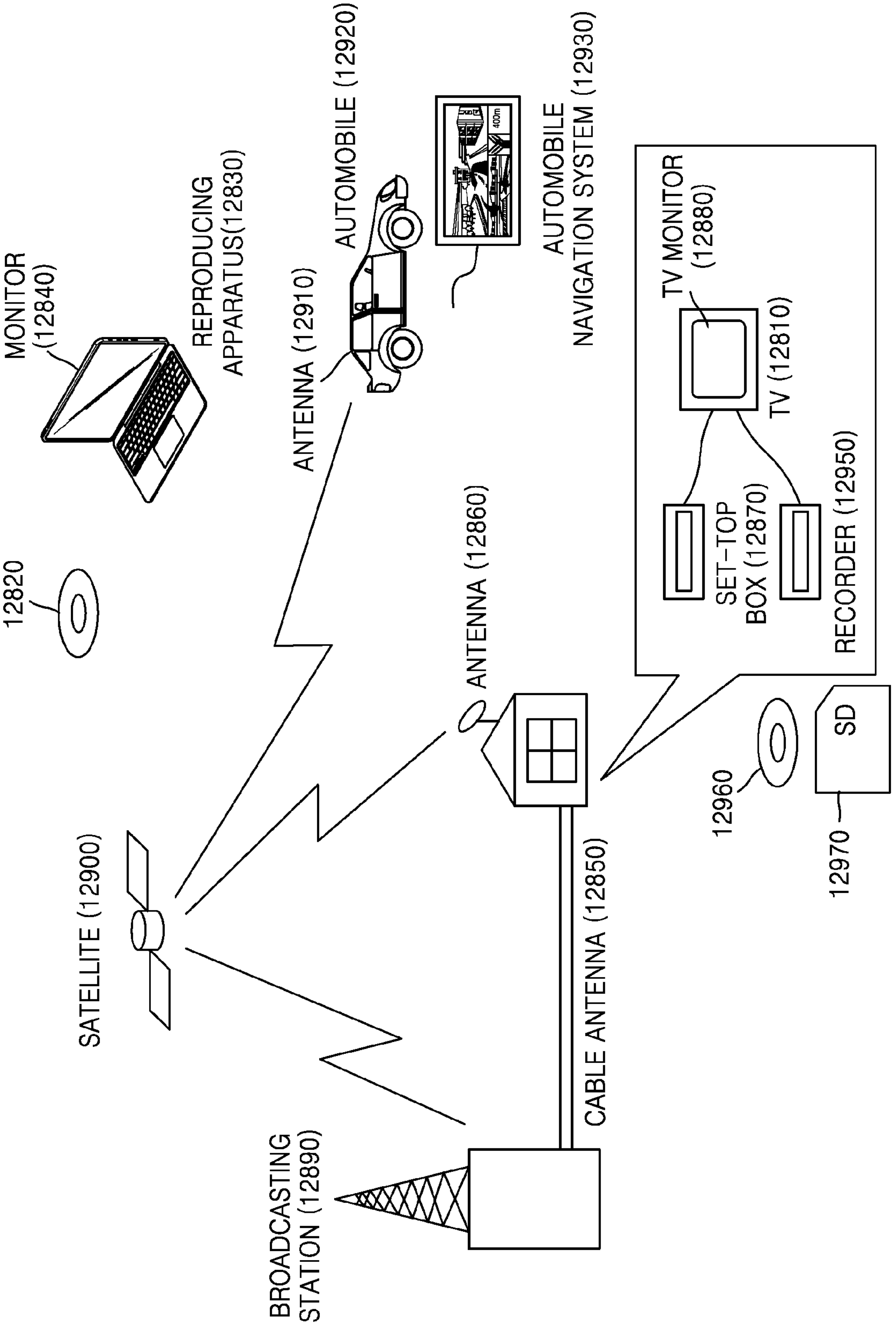
FIG. 26 illustrates a digital broadcasting system employing a communication system, according to various embodiments.

A communication system of the present invention is not limited to the communication system described above with reference to FIG. 24. For example, FIG. 26 illustrates a digital broadcasting system employing a communication system, according to various embodiments. The digital broadcasting system of FIG. 26 may receive a digital broadcast transmitted via a satellite or a terrestrial network by using the video encoding apparatus and the video decoding apparatus of the present invention.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present invention is implemented in a reproducing apparatus 12830, the reproducing apparatus 12830 may parse and decode an encoded video stream recorded on a storage medium 12820 such as a disc or a memory card so as to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present invention may be installed. Data output from the set-top box 12870 may also be reproduced on a TV monitor 12880.

As another example, the video decoding apparatus of the present invention may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present invention and may then be recorded to and stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

Figure 27:
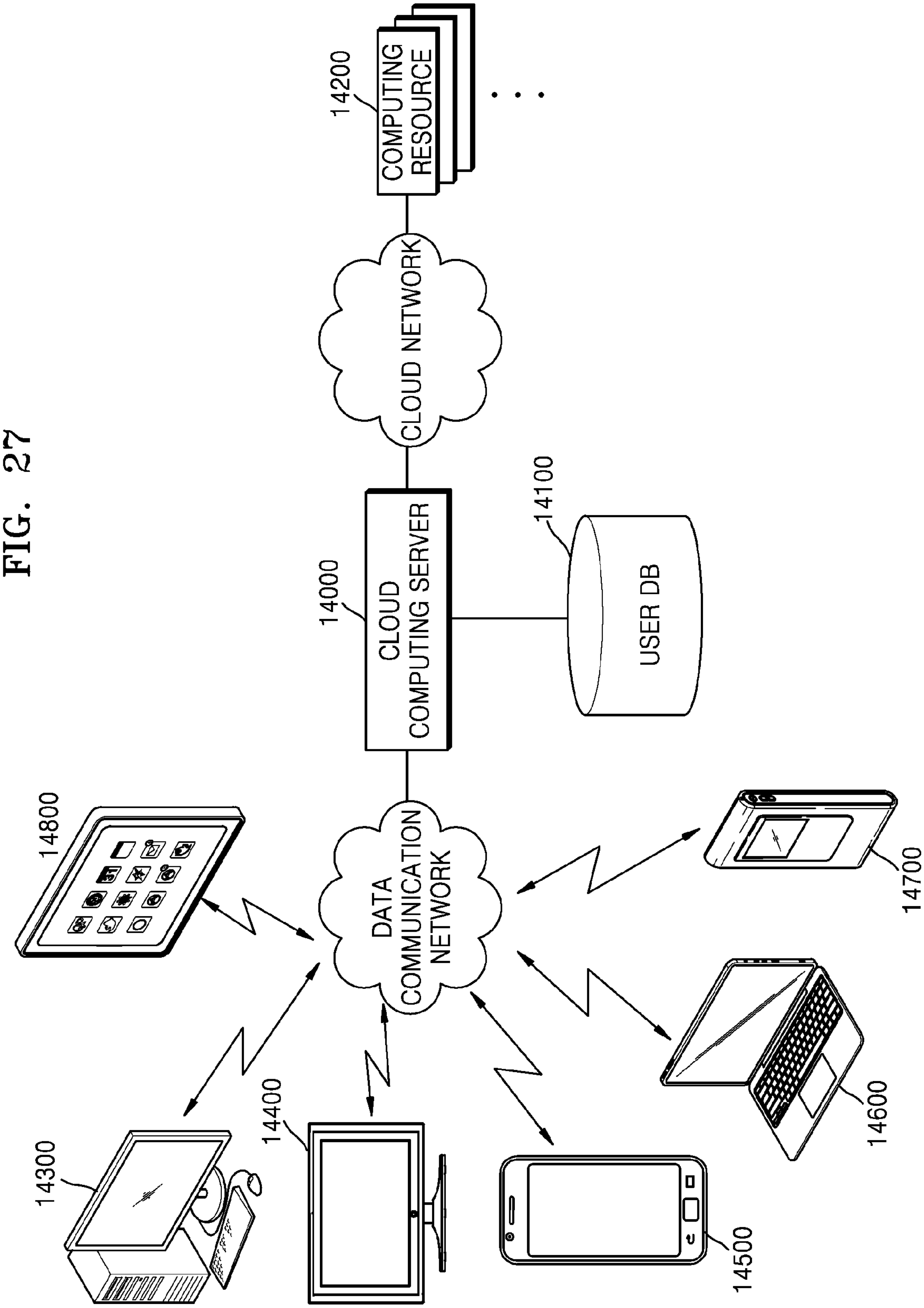
FIG. 27 illustrates a network structure of a cloud computing system using a video encoding apparatus and a video decoding apparatus, according to various embodiments.

FIG. 27 illustrates a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and may provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include log-in information, and personal credit information such as addresses, names, and the like. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

Here, the user terminal may include the video decoding apparatus as described above with reference to FIGS. 1A through 20. As another example, the user terminal may include the video encoding apparatus as described above with reference to FIGS. 1A through 20. Alternatively, the user terminal may include both the video encoding apparatus and the video decoding apparatus as described above with reference to FIGS. 1A through 20.

Various applications of the video encoding method, the video decoding method, the video encoding apparatus, and the video decoding apparatus described above with reference to FIGS. 1A through 20 are described above with reference to FIGS. 21 through 27. However, various embodiments of methods of storing the video encoding method and the video decoding method in a storage medium or various embodiments of methods of implementing the video encoding apparatus and the video decoding apparatus in a device described above with reference to FIGS. 1A through 20 are not limited to the embodiments of FIGS. 21 through 27.

The present invention can also be embodied as computer-readable codes on a computer readable recording medium. The computer-readable recording medium is any data storage device that can store programs or data which can be thereafter read by a computer system. Examples of the computer-readable recording medium include ROMs, RAMs, CD-ROMs, magnetic tapes, floppy disks, optical data storage devices, and the like. The computer-readable recording medium can also be distributed over networkcoupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the following claims. Therefore, the scope of the present invention is defined not by the detailed description of the present invention but by the appended claims, and all differences within the scope will be construed as being included in the present invention.

The invention claimed is:

1. A multilayer video decoding method comprising:

obtaining, by at least one processor, a multilayer video bitstream;

obtaining a flag which is included in a Video Parameter Set Network Abstraction Layer (VPS NAL) unit in the obtained multilayer video bitstream and indicates whether or not a predetermined reference type, in which each of the at least one layer is inter-layer predicted by using each of at least one reference layer, among a plurality of predetermined types, is used;

determining, based on the flag, whether or not the predetermined reference type, in which each of the at least one layer is inter-layer predicted by using each of the at least one reference layer, is used;

when it is determined that the predetermined reference type is used, obtaining an index indicating the predetermined reference type among the plurality of the predetermined reference types from the VPS NAL unit in the obtained multilayer video bitstream, wherein the plurality of predetermined reference types are based on inter-layer prediction; and determining the predetermined reference type among the plurality of the predetermined reference types, based on the obtained index;

when it is determined that the predetermined reference type is not used, obtaining each of direct reference flags which indicates whether each of first layers has a direct dependency of each of second layers and if each of the direct reference flags indicates that each of the first layers has the direct dependency of each of the second layer, obtaining each of indexes of reference types between each of the first layers and each of the second layers, wherein each of indexes of reference types indicates a reference type in which at least one of inter-layer motion prediction and inter-layer sample prediction is performed on each of the first layers by using each of the second layers;

determining reference types between each of the first layers and each of the second layers based on the obtained each of indexes of reference types between each of the first layers and each of the second layers;

inter-layer predicting each of the at least one layer by using each of the at least one reference layer according to the determined predetermined reference type among the plurality of the predetermined reference types or the determined reference types between each of the first layers and each of the second layers; and decoding, by the at least one processor, an image including the at least one layer, and wherein the predetermined reference type among the plurality of predetermined reference types which is indicated by the index is a reference type in which at least one of inter-layer motion prediction and inter-layer sample prediction is performed on at least one of predetermined layers among the first layers by using at least one of predetermined direct dependent layers among the second layers.

2. A multilayer video decoding apparatus comprising:

at least one processor configured to obtain a multilayer video bitstream, to obtain a flag which is included in a Video Parameter Set Network Abstraction Layer (VPS NAL) unit in the obtained multilayer video bitstream and indicates whether or not a predetermined reference type, in which each of the at least one layer is inter-layer predicted by using each of at least one reference layer, among a plurality of predetermined types, is used, to determine, based on the flag, whether or not the predetermined reference type, in which each of the at least one layer is inter-layer predicted by using each of the at least one reference layer, is used, to obtain an index indicating the predetermined reference type among the plurality of the predetermined reference types from the VPS NAL unit in the obtained multilayer video bitstream when it is determined that the predetermined reference type is used, wherein the plurality of predetermined reference types are based on inter-layer prediction, to determine the predetermined reference type among the plurality of the predetermined reference types, based on the obtained index, to obtain each of direct reference flags which indicates whether each of first layers has a direct dependency of each of second layers and if each of the direct reference flags indicates that each of the first layers has the direct dependency of each of the second layer when it is determined that the predetermined reference type is not used, to obtain each of indexes of reference types between each of the first layers and each of the second layers, wherein each of indexes of reference types indicates a reference type in which at least one of inter-layer motion prediction and inter-layer sample prediction is performed on each of the first layers by using each of the second layers, to determine reference types between each of the first layers and each of the second layers based on the obtained each of indexes of reference types between each of the first layers and each of the second layers, and to inter-layer predict each of the at least one layer by using each of the at least one reference layer according to the determined predetermined reference type among the plurality of the predetermined reference types or the determined reference types between each of the first layers and each of the second layers, and to decode an image including the at least one layer, and wherein the predetermined reference type among the plurality of predetermined reference types which is indicated by the index is a reference type in which at least one of inter-layer motion prediction and inter-layer sample prediction is performed on at least one of predetermined layers among the first layers by using at least one of predetermined direct dependent layers among the second layers.

* * * * *